US008250150B2

(12) United States Patent
Beck et al.

(10) Patent No.: US 8,250,150 B2
(45) Date of Patent: Aug. 21, 2012

(54) METHODS AND APPARATUS FOR IDENTIFYING AND FACILITATING A SOCIAL INTERACTION STRUCTURE OVER A DATA PACKET NETWORK

(75) Inventors: Christopher Clemmett Macleod Beck, Carlsbad, CA (US); Mark Franklin Sidell, Chapel Hill, NC (US); Thomas Knox Gold, La Mesa, CA (US); James Karl Powers, Carlsbad, CA (US); Charles Dazler Knuff, Palomar Mountain, CA (US)

(73) Assignee: Forte Internet Software, Inc., Carlsbad, CA (US)

( * ) Notice: Subject to any disclaimer, the term of this patent is extended or adjusted under 35 U.S.C. 154(b) by 536 days.

(21) Appl. No.: 10/888,612

(22) Filed: Jul. 9, 2004

(65) Prior Publication Data

US 2005/0198299 A1  Sep. 8, 2005

Related U.S. Application Data

(63) Continuation-in-part of application No. 10/765,338, filed on Jan. 26, 2004.

(51) Int. Cl.
*G06F 15/16* (2006.01)
(52) U.S. Cl. .................................. 709/206; 709/229
(58) Field of Classification Search .......... 709/204–207, 709/225, 229, 232, 246, 250; 715/753
See application file for complete search history.

(56) References Cited

U.S. PATENT DOCUMENTS

| | | | |
|---|---|---|---|
| 5,819,269 A * | 10/1998 | Uomini | 1/1 |
| 6,263,422 B1 * | 7/2001 | Wise et al. | 712/209 |
| 6,374,290 B1 * | 4/2002 | Scharber et al. | 709/205 |
| 6,389,467 B1 | 5/2002 | Eyal | |
| 6,549,922 B1 * | 4/2003 | Srivastava et al. | 707/205 |
| 6,912,564 B1 * | 6/2005 | Appelman et al. | 709/204 |
| 6,983,371 B1 * | 1/2006 | Hurtado et al. | 713/189 |
| 7,035,942 B2 * | 4/2006 | Daniell et al. | 709/246 |
| 7,069,308 B2 | 6/2006 | Abrams | |
| 7,110,983 B2 * | 9/2006 | Shear et al. | 705/55 |
| 2001/0004739 A1 * | 6/2001 | Sekiguchi et al. | 707/100 |

(Continued)

FOREIGN PATENT DOCUMENTS

EP  1043671 A  10/2000

(Continued)

OTHER PUBLICATIONS

Fraser, Simon. "MT-NW Manual". Archived by the Internet Archive on Feb. 23, 2002: <http://web.archive.org/web/20020223141512/www.smfr.org/mtnw/docs/ToC_Normal.html>. pp. 1-208.*

(Continued)

*Primary Examiner* — Christopher Biagini
(74) *Attorney, Agent, or Firm* — Donald R. Boys; Central Coast Patent Agency, Inc.

(57) ABSTRACT

A software suite for managing the publishing and consumption of information and payload data across one or more transport protocols supported by a data-packet-network includes a posting application for publishing the information and payload data, and a consuming application for accessing and consuming the information and payload data. In a preferred embodiment the posting application enables posting of information that is consumable separately from the payload data wherein the information richly describes the payload data including provision of instructions for sampling the payload data before consuming the payload data.

10 Claims, 28 Drawing Sheets

U.S. PATENT DOCUMENTS

| | | | | |
|---|---|---|---|---|
| 2001/0051991 | A1* | 12/2001 | Beyda et al. | 709/206 |
| 2002/0010803 | A1* | 1/2002 | Oberstein et al. | 709/318 |
| 2002/0049738 | A1* | 4/2002 | Epstein | 707/1 |
| 2002/0130904 | A1* | 9/2002 | Becker et al. | 345/753 |
| 2002/0156691 | A1* | 10/2002 | Hughes et al. | 705/26 |
| 2003/0004961 | A1* | 1/2003 | Slothouber et al. | 707/100 |
| 2003/0110227 | A1* | 6/2003 | O'Hagan | 709/206 |
| 2003/0131060 | A1* | 7/2003 | Hartselle et al. | 709/206 |
| 2003/0172067 | A1* | 9/2003 | Adar et al. | 707/7 |
| 2004/0001498 | A1* | 1/2004 | Chen et al. | 370/401 |
| 2004/0054736 | A1* | 3/2004 | Daniell et al. | 709/206 |
| 2004/0068471 | A1* | 4/2004 | Kato | 705/51 |
| 2004/0177359 | A1* | 9/2004 | Bauch et al. | 719/313 |
| 2005/0198299 | A1* | 9/2005 | Beck et al. | 709/226 |
| 2005/0257159 | A1* | 11/2005 | Keohane et al. | 715/752 |
| 2006/0053077 | A1* | 3/2006 | Mourad et al. | 705/51 |
| 2006/0230343 | A1* | 10/2006 | Armandpour et al. | 715/517 |

FOREIGN PATENT DOCUMENTS

WO    2004043029 A    5/2004

OTHER PUBLICATIONS

Kantor, Brian et al. "Network News Transfer Protocol". RFC 977, IETF. Feb. 1986.*
Horton, M. et al. "Standard for Interchange of Usenet Messages". RFC 1036, IETF. Dec. 1987.*
Freed et al. "RFC 2046: Multipurpose Internet Mail Extensions (MIME) Part Two: Media Types." IETF, Nov. 1996. pp. 1-44.*
U.S. Appl. No. 10/765,338, Beck et al.
Forte Internet Software, NZB File Format Disclosure. Version 1.0a. Updated Jul. 6, 2004, pp. 1-9.
NBDOCS, NZBSpecification, http://docs.newzbin.com/NZBSpecification, Jul. 7, 2004, pp. 1-4.

* cited by examiner

*Fig. 3 (ER diagram zone structure)*

Fig. 11 *(Zone Host Architecture)*

*Fig. 12 (software layers/components)*

METHODS AND APPARATUS FOR IDENTIFYING AND FACILITATING A SOCIAL INTERACTION STRUCTURE OVER A DATA PACKET NETWORK

CROSS-REFERENCE TO RELATED DOCUMENTS

The present invention is a continuation in part to a U.S. patent application Ser. No. 10/765,338 filed on Jan. 26, 2004 entitled "Methods and System for Creating and Managing Identity Oriented Networked Communication". U.S. patent application Ser. No. 10/765,338 was disclosed as part of the document disclosure program and given document disclosure number 534495. Both documents are included herein at least by reference.

FIELD OF THE INVENTION

The present invention is in the field of network-based communication including digital transactions and file transfers and pertains particularly to methods and apparatus for identifying and facilitating a social interaction structure based on user and contact identity information and digital markup techniques.

BACKGROUND OF THE INVENTION

With the advent and development of the Internet network, including the World Wide Web and other connected sub-networks; the network interaction experience has been continually enriched over the years and much development continues. In a large part, network users, both veteran and novice have a basic human commonality in that they all share three basic desires that materialize into behavioral traits when engaging in network-enhanced interaction. These behavioral traits are the desire for communication with others, the desire to collect and/or acquire digital content, and the desire to collaborate with others to help solve some problem or to resolve an issue. As behavioral traits, these basic needs can be expanded into many sub-categories. Communication includes interaction over channels such as Instant Messaging (IM), email, posting boards, chat, voice over Internet protocol (VoIP), analog voice, etc. Collection includes collecting art, knowledge, music, photographs, software, news, and so on. Collaboration includes group discussions, task fulfillment, and any other collective efforts to solve a problem or perform a function. In basic form communication, collection, and collaboration are very tightly intertwined as basic desires.

Software providers have long recognized the need to fulfill these basic desires by providing the capabilities in a single interface and have provided many well-known communication applications that provide access to casual and business communication as well as collaboration and file transfer capabilities. Programs like Net-Meeting™ and ICQ™, among many others attempt to aggregate these capabilities into a single accessible interface some times integrating separate communications applications for single point launching.

Users generally belong to a variety of communities and social organizations that may or may not be tightly structured or organized. For example, a user may have family and friends in their on-line address book along with work associates from the job (two communities that should be separated). The same user may belong to a church group and a golf group, or some other sports group. The same user may also volunteer at a wildlife rehabilitation center. However loosely formed and organized, these separate groups often have a central Web presence, for example, a Web site, posting board, or the like. Likewise many of the group members or associates also have individual on-line capabilities like ISP accounts, email addresses and so on.

A user associated with more than one group logically has varying personas or faces that he or she presents to each group. Moreover, the user may logically be willing to share only varying degrees and depth of information with these separate groups largely restricted to the subject matter(s) appropriate to the group. For example, the user's family members and close friends would not share the same type and depth of information as the user's work associates, or the user's wildlife rehab associates. It may be desired by a user, and in fact is logical to conclude that in association with these different groups that group boundaries should be respected with reference to communication channels and formal as well as informal information sharing.

A drawback to virtually all of the available communication channels whether they are separate channels or integrated into a communication application, is that a user may have to provide a basic permanent identity and profile for these programs to work successfully. For example, an email account generally requires a permanent email address that the user may have to maintain unless the account is to be abandoned. Using more than one email address generally requires more than one email account for a given user. Likewise instant message applications may require a standard email account and identity.

A software application is known to the inventor and referenced in the cross-reference section of this specification as "Methods and System for Creating and Managing Identity Oriented Networked Communication". The software enables services for managing routing of communiqués across one or more communication channels supported by a data-packet-network. The software includes one or more workspaces for segregating communication activity; one or more unique user identities assigned per workspace; and one or more contact identities assigned to and approved to communicate with a workspace administrator of the one or more workspaces using the assigned user identities. In a preferred embodiment the application enforces a policy implicitly defined by the existing architecture of the workspaces and associated user and contact identities. The software enables contact identity and user identity pairing in management of the routing of a communiqué to a particular workspace. The identities are applicable to the supported communication channel or channels used in the communication.

One problem inherent to social interaction over a network is that it is often very strictly defined, highly organized, and largely proprietary in nature meaning that those collaborators who are part of a hosted networking group are typically bound to use certain applications and protocols as part of some proprietary framework for communication provided by a service host over other applications and protocols that might also be available.

Many socially active and interactive groups are, by definition, loose knit and therefore not highly structured, organized, or otherwise defined to an extent that would warrant such inflexible over-network collaboration provided by a typical collaboration host or intermediary. One exception to this general rule is Usenet described in some detail with reference to the U.S. patent application identified in the cross-reference section of this specification. The ubiquitous and loosely governed structure of Usenet provides a suitable spawning bed for forming loose knit, often temporary groups for social interaction that is inclusive of communication, collaboration, and digital collection.

User groups or Web communities who engage in group discussion, collaboration and digital collection activities using news group services, mailing lists, and other like facilities fall in at the opposite end of the scale from highly defined and structured proprietary services. For example, Usenet supports group interaction but does not provide any mechanism for the group to evolve into a more structured social group with a common purpose or common set of goals.

Both proprietary networking services and unstructured group interaction facilities tend to be more document-centric than identity-centric in different ways. For example, the proprietary framework of a service host may limit a VIP network of users, for example, to using selected protocols, applications, and security regimens according to defined and explicit rules and methods. Unstructured interaction services may lack the structure of security and rules of engagement in addition to an absence of variety in the types of applications and protocols supported.

Therefore, what is clearly needed is a method and apparatus that would enable social interaction over a network in a way that solves the problems stated above.

SUMMARY OF THE INVENTION

A software suite is provided for managing the publishing and consumption of information and payload data across one or more transport protocols supported by a data-packet-network. The software suite includes a posting application for publishing the information and payload data, and a consuming application for accessing and consuming the information and payload data. In a preferred embodiment, the posting application enables posting of information that is consumable separately from the payload data wherein the information richly describes the payload data including provision of instructions for sampling the payload data before consuming the payload data.

In a preferred embodiment, the data-packet-network is the Internet network. In one embodiment, the posting application is used to post a binary series comprising the payload data and the transport protocol is network news transport protocol (NNTP).

In a preferred embodiment, the consuming application is a network newsreader adapted with a collector component for finding and collecting the posted payload data using the NNTP protocol. In this embodiment, the information is a binary series index message describing the contents of the payload data and further providing instructions for sampling the data. Also in this embodiment, the payload data is one of or a combination of pictures, movies, sound files, applications, or text documents.

In one embodiment, the consumer application is divided into two separate components, that of a newsreader for consuming text and that of a collector for consuming multimedia. In one embodiment, the binary series index message is an XML-based message. In one embodiment, the transport control protocols include but are not limited to network news transport protocol, file transport protocol, rich site summary protocol, universal discovery description and integration protocol, lightweight directory access protocol, multipurpose Internet mail protocol, post office protocol, simple message access protocol, Internet mail access protocol, and hypertext transport protocol.

In a preferred embodiment, the information includes XML-based description of one or more of a host server identity, a poster identity, a newsgroup identity, and one or more contact identities. In a variation to this preferred embodiment, the software suite is integrated with an identity oriented management firewall. In one embodiment, the data-packet-network is part of a peer-to-peer network hosted by a service provider.

In a preferred embodiment, payload description includes but is not limited to message count, message size, media type, file size, file count, play duration, picture resolution, file name, file date of creation, number of accesses, indication of sample files, indication of poster commentary, indication of commerce-related data, reference to classification parts and indication of file priority for sampling.

In one embodiment, the collector component manages files stored locally on the station of the consumer using the information as a base for file organization and presentation. In this embodiment, the information is reused for reposting a consumed series. Also in one embodiment, the software suite is provided as a browser plug-in. In one aspect of the invention, the information and payload data published is consumable only by consumers approved for consumption.

According to another aspect of the present invention, a language model for defining social interaction conducted over a data-packet-network between two or more network clients is provided. The language model includes, in a preferred aspect, a first portion for defining a group of interactors engaging in the social interaction, a second portion depending from the first portion, the second portion for defining communications services allowed for the group interactions, a third portion depending from the second portion, the third portion for defining media types allowed during group interactions, a fourth portion depending from the third portion the fourth portion for defining media and message payload content transferred between interactors during the social interaction, and a fifth portion depending from the second portion, the fifth portion for identifying each of the interactors. In a preferred embodiment, the language model is expressed on the network as one or a set of markup language documents portions of which may be propagated over the network transparently between stations of the interactors, the documents packaged and embedded in an application service layer of the network using relevant and existing transport protocols supported on that network.

In a preferred embodiment, the data-packet-network is the Internet network. In one embodiment, the portions are integrated and expressed as a single markup language document using an XML based language. In one embodiment, the first and second portions further define one or more subject matters lending to group purpose and rules of engagement between group interactors. Also in one embodiment, rules of engagement include required security protocol.

In one embodiment, the language model is used to define a social interaction group and its activities practiced over network news transport protocol using a news server as a base of interaction. In another embodiment, the language model is used to define a social interaction group and its activities practiced over file transport protocol using a file transfer server as a base of interaction. In still another embodiment the language model is used to define a social interaction group and its activities practiced over a peer-to-peer network using a peer-to-peer server as a base of interaction. In yet another embodiment, the language model is used to define a social interaction group and its activities practiced over one or more message transport protocols using a message server as a base of interaction.

In the just-mentioned embodiment, the language model of claim 26 wherein the message transport protocols include but are not limited to post office protocol, simple message transport protocol, multipurpose Internet mail extension protocol, Internet mail access protocol, Instant message protocol, file transfer protocol, and presence protocol.

In one embodiment, the first and second portions further identify and define an inbox that is shared among the interactors. In this same embodiment or in another embodiment, the fifth portion further includes identity recognition capability through syncing of white lists and incorporating new identities provided by interactors.

According to yet another aspect of the present invention, a method is provided for publishing a series of media files for consumption over a data-packet-network using a mark-up language generator. The method includes the steps of (a) initiating a publishing task from an application adapted for publishing the media files of type; (b) identifying the media files for publishing; (c) confirming attributes for publishing the series; (d) optionally, adding user commentary associating said commentary to relevant files or to the series; and (e) invoking the markup language generator to produce the files or messages published.

In a preferred application, the data-packet-network is the Internet network. In one aspect, in step (a), the application is a poster operable over the Internet using network news transport protocol. In this embodiment the media files are one or a combination of pictures, movie segments, sound files, text documents, or applications. In a preferred aspect, in step (b), identification involves dragging the media files into a workspace window, or simply mapping the location of each file included.

In a variation to the just-mentioned aspect, in step (b), the publishing is a repost of a series and the series BSI is used to identify the media files for publishing. In a preferred aspect, in step (c), attributes include those that are automatically detected and those that may be manually entered. In this aspect, in step (c), attributes include at least file attributes, publishing destination attributes, author identity attributes, commerce related attributes, and publishing style attributes. In one aspect, attributes further include intended consumer identity attributes.

In one aspect, in step (d), user commentary may be added and associated to the series and to individual series files. In a variation to this aspect, keystroke method may be used to add pre-defined commentary. In one aspect, in step (e), invocation of the markup language generator causes all of the information to be expressed in the form of a number of XML documents that may be used to perform the posting action. In this aspect, in step (e), the XML documents contain all of the information and instruction for posting the series including a binary series index expressed as a single XML document that described the series.

In a preferred aspect, in step (e), the markup language generator automatically loads the markup language into a task manager and dispatcher that finishes the posting with no other user input or action required. In this aspect, in step (e), invocation of the markup language generator completes the posting operation.

In one embodiment with respect to the language model described further above, the social interaction is conducted between interactors and a machine wherein the machine is a voting machine. In another embodiment with respect to the language model, part of the social interaction includes synchronizing a shared contact directory among the interactors, the synchronizing process governed by trust-metrics.

BRIEF DESCRIPTION OF THE DRAWING FIGURES

DESCRIPTION OF THE PREFERRED EMBODIMENTS

According to a preferred embodiment of the present invention, a software suite is provided for managing network communication and digital collection activities according to user and contact identities. The methods and apparatus of the present invention are described in enabling detail below.

Figure 1:
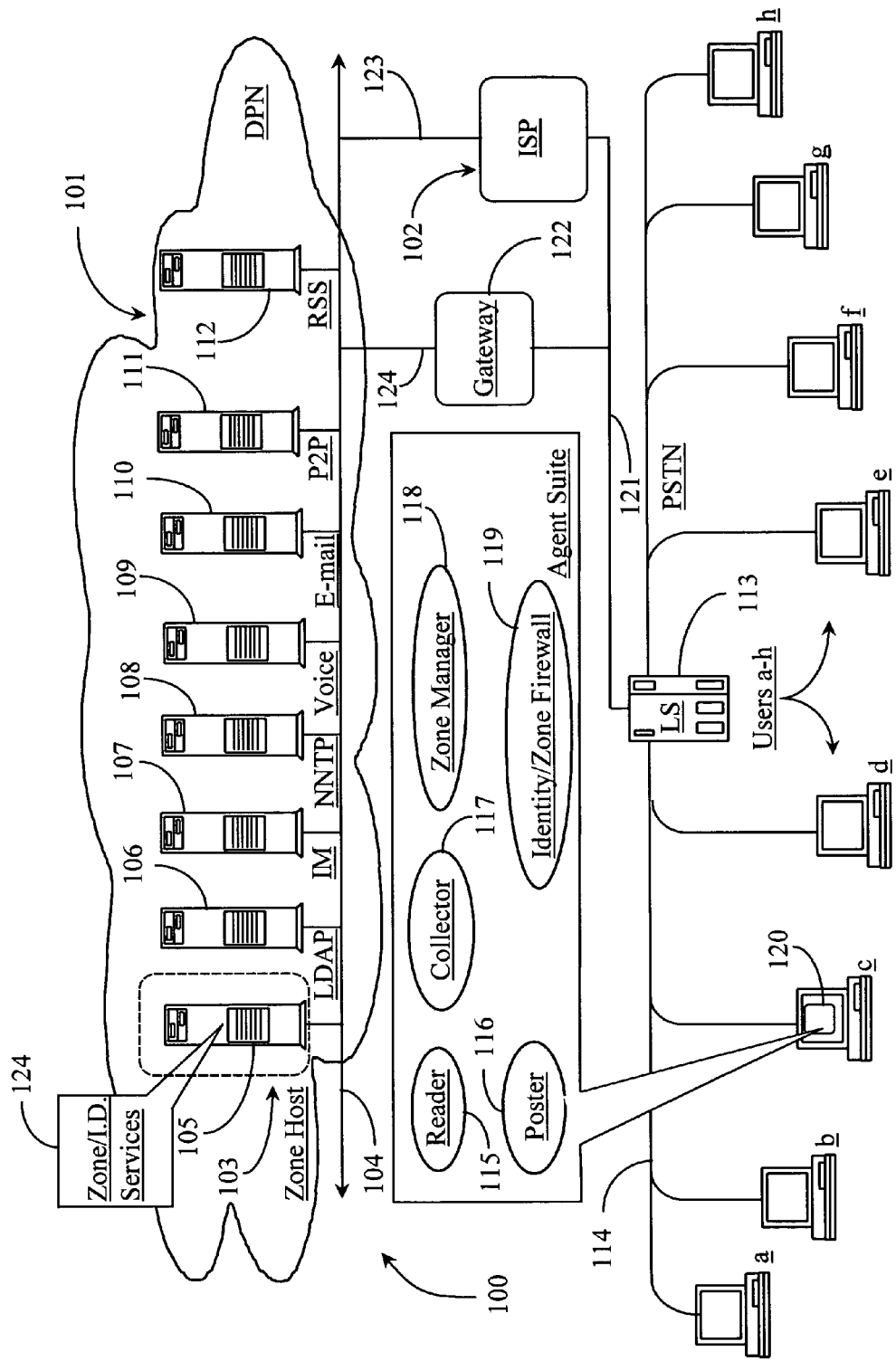
FIG. 1 is an architectural overview of a communications network for practicing identity and zone-managed communication and digital collection according to an embodiment of the present invention.

FIG. 1 is an architectural overview of a communications network 100 for practicing identity and zone-managed communication and digital collection according to an embodiment of the present invention. Communications network 100 encompasses a data-packet-network (DPN) 101 and accessing users a-h.

DPN 101 is the well-known Internet network in a preferred example, which includes any sub-networks that might be connected thereto such as an Ethernet network, an Intranet network, or any other compatible data networks. The inventor chooses the Internet as a preferred example because of a characteristic of unlimited public accessibility.

Users a-h are illustrated in this example as an array of desktop computer icons representing computer stations capable of Internet access and interaction. One with skill in the art will appreciate that there are a variety of computer station types known as well as a variety of Internet-access methods known. For exemplary purposes users a-h are shown connected to Internet network 101 through a public-switched-telephony-network (PSTN) represented herein by telephony connectivity network (114,121), which provides access through an illustrated telephony switch 113 to an Internet service provider (ISP) 102. Telephony switch 113 is a local switch (LS) local to particular user group a-h.

In this example, the Internet connection method is simple dial-up services through an ISP as is common in the art. Other Internet access conventions such as cable/modem, digital subscriber line (DSL), integrated services digital network (ISDN), and more recently developed wireless conventions can also be used.

ISP 102 connects to an Internet pipeline or backbone 104, which represents all of the lines, connection points, and equipment that make up the Internet network as a whole. Therefore, taken into account the known ranges of the Internet and PSTN network, there are no geographic limits to the practice of the present invention.

A gateway 122 is illustrated in this example and represents a gateway between Internet 101 and PSTN (114, 121) such as the well-known Bell core standard of SS7, for bi-directional transformation of telephony signaling and data-packet-streams for communication over the respective networks. Gateway 122 may also be a wireless application gateway into network 101 without departing from the spirit and scope of the present invention. Gateway 122 is connected to backbone 104 by an Internet line 124.

Internet 101 represented in breadth by backbone 104 has a plurality of electronic data servers illustrated therein and adapted individually to provide some form of communication services or other network services. A Lightweight Directory Access Protocol (LDAP) server is illustrated as connected to backbone 104 and adapted to provide access to users analogous to users a-h to directory services. LDAP is a software protocol that enables any user to locate any other user, organization, resources file, or network connected device. In this example, LDAP server 106 may play a roll in providing access to loose social groups whose members use identity-oriented routing of messaging and zone management for communication and collaboration with each other and fringe associates that may not have client software used by group members as will be described in more detail later in this specification.

An instant message server 107 is illustrated within Internet 101 and connected to backbone 104 for communication. IM messaging is an asynchronous form of communication comprising routed messages. A goal of the present invention is to enable routing of IM messages according to identities and zones. IM server 107 represents any of the widely available and known instant message services like AOL™, Microsoft™, ICQ™, and others including those that leverage presence protocols.

A network news transport protocol (NNTP) server 108 is illustrated within Internet 101 and connected to backbone 104 for access. NNTP is the predominant protocol used by software clients like Agent and servers for managing notes and files posted to Usenet groups. NNTP protocol replaced the original Usenet protocol Unix-to-Unix-Copy Protocol (UUCP). NNTP servers manage the global network of collected Usenet newsgroups and include servers that provide Internet access. An NNTP client may be included as part of a Web browser or, in the case of this example, a separate client program called a newsreader described further below. An NNTP sever is accessed for the purpose of browsing messages, posting messages, and for downloading messages and files. As described further above with reference to the background section of this specification, NNTP servers also can be dedicated to storing binaries (music, movies, pictures, games, etc.), available for downloading and allowing Usenet patrons to post binaries to the server.

A goal of the present invention is to provide routing of Usenet messages and binaries according to identities and zones as described further above. As described further above with reference to the background section of this specification, the inventor is aware of and has developed the newsreader application known as Agent. The present invention relates to novel enhancements to the prior-art version of the application, the enhancements enabling identity oriented routing and message management according to created zones.

A voice server 109 is illustrated within Internet 101 and connected to backbone 104 for access. Voice server 109 is analogous to a Voice over Internet Protocol (VoIP) server capable of storing and forwarding voice messages or of conducting real-time voice session between two or more parties connected to the network including connection from a remote analog network via telephony gateway. Although methods of the present invention deal largely with asynchronous communication, one goal of the present invention is to enable network-hosted interaction services that use identities of sender and receiver in the concept of created identities that are zone specific to route live voice interactions sourced from either network 101 or PSTN 114,121. Voice server 109 may also be assumed to represent an analog counterpart held within the PSTN network in terms of functionality.

An email server 110 is illustrated within Internet 101 and connected to backbone 104 for access. Server 110 represents a typical email server having a port for post office protocol (POP), a port for simple message transport protocol (SMTP), and a port for Internet mail access protocol (IMAP), which is a Web-based service that allows users access to email from any browser interface. A goal of the present invention is to enable routing of emails according to created identities and zones managed by a unique firewall application described further below.

A peer-to-peer server (P2P) 111 is illustrated within network 101 and connected to backbone 104 for access. P2P server 111 is analogous to any source or relay server of digital music, movie, or picture files that can be downloaded there from by users. Server 111 can be a proxy server that accesses individual desktop computers to retrieve content from a "shared folder" adapted for the purpose, as is the general practice of well-known music download services.

A really simple syndicate (RSS) server 112 is illustrated within Internet 101 and connected to backbone 104 for network access. RSS is a format for syndicating news and the content of news-like sites, including major news sites like Wired™, news-oriented community sites like Slashdot™, and personal Weblogs. An RSS server can handle other formats besides news formats. Any topic that can be broken down into discrete items can be syndicated using RSS, for example, the history of a book. When a subject matter is presented in RSS format it is delivered as an RSS feed to an RSS-enhanced reader, which can periodically check or monitor the feed for any changes and react to the changes in an appropriate way. An RSS enhanced reader can be thought of as a news aggregator that alerts the user to any new items in the RSS feeds. It is a goal of the present invention to enable identity oriented routing of RSS feeds using created identities and managed zones.

It will be apparent to one with skill in the art that the plurality of servers illustrated in this example represent differing types and forms of communication and interaction including "digital collection" interaction. One goal of the present invention is to enable fast sampling of digital postings of binaries and downloaded collections thereof in a more efficient and identity oriented manner, including routing downloads of such materials into appropriate user zones based on identity and content-related information.

Users a-h may be assumed to be operating an Agent software suite 120 shown in display on user computer c in this example. It may be assumed that all users a-h have SW 120 resident on their workstations or at least a portion of suite 120 operational and locally executable. SW 120 is expanded in illustration from display on station c to reveal several application components. These are a reader application 115, a posting application 116, a collector application 117, a zone manager application 118, and a identity/zone firewall application 119.

As a software suite (120), applications 115-119 may be provided having various levels of integration and standalone functionality without departing from the spirit and scope of the present invention. The inventor illustrates the functional portions or applications of suite 120 separately for the purposes of describing separate functions and capabilities and in actual practice some of applications 115-119 may be provided as standalone applications that can be installed separately from each other the whole of which when installed work together as a functional and integrated application suite.

Reader application 115 encompasses functionality for accessing and browsing news servers like NNTP server 108 for sampling and subscribing to news groups and message boards. In this example, reader 115 is enhanced (RSS plug-in) for navigation to an RSS server like RSS server 112 for the purpose of sampling and subscribing to news feeds and other informational feeds. Reader 115 may be assumed to contain all of the former functionality of the Agent newsreader described with reference to the background section and which is available to the inventor. Reader 115, for example, allows a user to read and download messages and to monitor message threads of certain users that have posted to a server. Reader 115 can also monitor news feeds and alert a user when new feed content is available.

Reader 115 may be assumed to include a graphical user interface (GUI not illustrated) that includes capabilities of navigation to different online news servers and other typical browser functions. Reader 115, in preferred embodiment, has interactive GUI linking capability to and is, in various capacities, integrated with posting application 116, collector application 117, zone manager 118, and firewall application 119. In one embodiment, a single main GUI is provided that interlinks access to the functions provided by all of applications 115-119. In this embodiment a partial suite 120 not including all of applications 115-119 would have GUI icons that represent the missing components, however such icons might be "grayed out" or otherwise caused to indicate that one or more applications of suite 120 is not installed. In a preferred embodiment application 119 is provided as a default component of suite 120 because it provides the basis for identity-oriented routing of messages and interactions.

In another embodiment, separate GUIs are provided as standalone GUIs for each functional application wherein appropriate GUI links are provided for navigation from one interface (functional application control) to another. There are many possible design possibilities.

Posting application 116 encompasses the capability to post (upload) messages and binaries to NNTP servers, FTP servers, and posting boards. Poster 116 has an interface, not illustrated, for creation and upload of created postings, which include text-based postings and binary postings. Poster 116 is RSS-enhanced as was described with reference to reader application 115. In this way a posting user can create news and informational feeds upload them to RSS server 112, for example, for other users to download.

Collector application 117 enables digital sampling and collection of binaries from NNTP sever 108 and in some configured cases from P2P (server 111). Collector application 117 enables identity-oriented tracking and sampling of posted materials. Collector 117 is provided as a dedicated application, in a preferred embodiment, however it may also be integrated with reader 115 and poster 116 without departing from the spirit and scope of the present invention. In one embodiment collector 117 may be integrated with other applications as well such as a music jukebox application, media server applications, content management applications, and streaming content applications.

Zone manager 118 is a utility for enabling a user to create special identity-oriented (IO) workspace zones (not illustrated) that may have one or more associated identities. By default, a certain generic set of IO zones might be provided with suite 120, however a user may create as many IO zones as is required to comfortably manage messaging according to identity. The policies of IO zones are enforced by firewall application 119. The concepts of IO zones will be detailed later in this specification.

Firewall application 119 is a utility for enforcing IO-routing of messaging and interaction according to policy related to active zones. Firewall 119 provides a single security and message routing solution that can be used to handle incoming and outgoing email, IM interactions, and interaction associated with other media channels including voice channels using multiple identities and of various accounts.

In practice of the present invention, suite 120 enhances prior-art functionality associated with standalone newsreaders, messaging clients, and digital collecting utilities by first providing a single or series of linked interfaces through which all of the activities can be accomplished and secondly by providing new and novel capabilities of managing interactions and work-related tasks according to one or a combination of user and sender identities, including contact identities. IO zones are firewall-protected (firewall 119) containers of content and workspace having a specified and implicit relationship to the overall activity and workflow generated by suite 120. Several advantages of identity-oriented zone-management capabilities will be described according to various exemplary embodiments detailed later in this specification.

Figure 2:
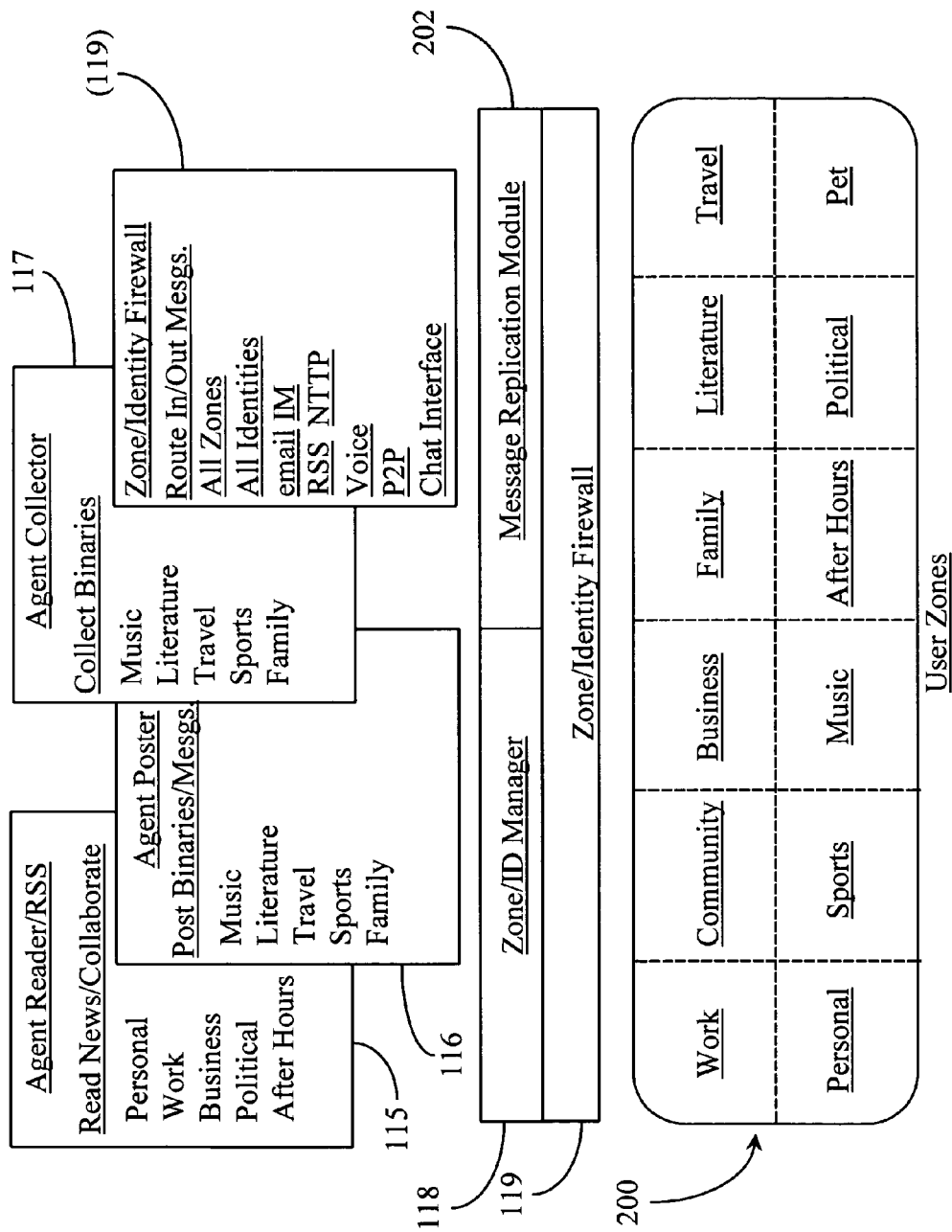
FIG. 2 is a block diagram illustrating software applications and system components of an Agent software suite according to an embodiment of the present invention.

FIG. 2 is a block diagram illustrating software applications and system components of an Agent software suite according to an embodiment of the present invention. Agent software applications include Agent Reader application 115, Agent Poster application 116, and Agent Collector application 117 as described with reference to FIG. 1 above. Firewall 119 is illustrated as a block 119 to preserve hierarchy in description and also in expanded form (119) to show supported routing function and supported communications channels. Firewall 119 is in a preferred example, a resident and self-configurable part of agent suite 120 and is minimally adapted to direct final destination routing of incoming messages and to provide zone and identity policy violation alerts to users when user or external contact behavior might trigger such alerts.

Agent Reader application 115 includes a plug-in for disseminating RSS feeds as previously described. Reader 115 is adapted to enable a user to subscribe to NNTP news groups and to collaborate using messaging and posting in conjunction with Agent Poster 116. In a preferred embodiment of the present invention, a user has identity oriented zones (200), which are segregated from one another and may include separate identities associated thereto each separate identity belonging to the same user and administrator of the zones.

In this example, reader 115 lists the exemplary user zones 200 reading from top to bottom within block 115 as a personal zone, a work zone, a business zone, a political zone, and an after hours zone. Each zone is adapted for material segregation and messaging according to the differing identities of the user enforced by firewall application 119. For example, the personal zone would be used in routing all of the user's correspondence messages and subscribed-to materials that are of a personal nature or considered personal such as messages to and from personal friends, family members, and trusted individuals. A personal zone has at least one user identity (contact parameter) that the user is willing to share with personal friends, family, and other trusted individuals.

A work zone is adapted for correspondence and collaboration between the user and those associates related to the user's employment. The user identity associated with his or her work zone may be shared only with those individuals associated with the employment environment of the user. All correspondence associated with the work environment of the user is routed to and from the work zone.

A business zone is exemplary of a zone adapted with a user's business identity. Perhaps a user has a separate business he or she is conducting separately from work. All correspondence then that relates to the user's business is routed to and from this zone. The identity (contact information identifying the user) associated with the business zone is the identity that the user leverages in correspondence to all those related to the business.

A political zone contains the user's political identity and segregates the user's political correspondence and activities from other zones. Political fund-raising activities, campaign work, political correspondence, letter writing, and so on is contained within the political zone.

An after hours zone contains the user's after hours identity that he or she is willing to share with related organizations, Web-sites, and so on. The user may be single and belong to one or more dating services. The after hours identity then would be used to correspond with other singles of the same service for example. The user's after hours identity is separate from all other zone-specific identities and no one has this identity of the user except those authorized to correspond with the user along any subject falling within the after hours zone policy.

It will be apparent to one with skill in the art that the zones listed and associated with Agent Reader 115 are exemplary and may be of different titles and number than are illustrated in this embodiment without departing from the spirit and scope of the present invention. It is also noted herein that different activities enabled by different portions of the Agent suite may be associated with different zones as evidenced by the listing of only some of zones 200 within block 115. Different portions of the Agent suite may also utilize the same zones without departing from the spirit and scope of the present invention.

In one embodiment of the present invention, certain generic zones common to most users like personal zone and work zone for example are pre-configured and provided for a user. A user may configure new zones and identities as needed or desired. When an existing zone encompasses subject matter that begins to vary within the context of the zone, a user may split the zone into two new zones having separate identities if desired. There are many possibilities.

Agent poster 116 is used to post information (messages and binaries) to Usenet groups, posting boards, and other supported venues. Reader 115 and Poster 116 are in a preferred embodiment integrated and accessible through a common interface. However, poster 116 may also be provided with its own interface as a standalone application packaged separately without departing from the spirit and scope of the present invention.

The active or configured zones 200 listed within Agent Poster 116 include, but are not limited to a music zone, a literature zone, a travel zone, a sports zone, and a family zone. It is noted again here that the actual zones used may be entirely different than the one listed in this example. The inventor provides certain zone description in this example for discussion purposes only.

A music zone is associated with a user's music identity and governs all of the user's posting activities with music services, and music binary servers such as may be subscribed to by the user through Usenet or a similar platform. For example, a user's binary collection of MP3 files might be accessible for posting through the music zone interface.

A literature zone is associated with a user's literature interests and might govern a collection of pieces of literature that a user will post to a certain newsgroup for download by others. The zones travel, sports, and family govern materials appropriately associated therewith. For example, the travel zone would contain information about the user's travels, vacation information, and so on. Using poster 116, the user may post information to others related to travel opportunities or experience the user has had. Perhaps a user might post some e-tickets to a certain destination for others to view and perhaps purchase or download. A user might post e-tickets to a basketball game through the sports zone. The same user might post homemade movie files and picture albums through his or her family zone. All correspondence with the user related to such activity is conducted to and from the identity appropriate zone.

It is noted herein that along with segregated user identities attributed to each user zone, zones also have separate contact identity lists identifying those entities that have firewall access to the user through a particular zone and which are allowed to have and know the zone specific identity. All of the activity conducted in zone specificity is managed by firewall 119.

Agent collector 117 is used to find and download binaries posted on Usenet binary servers using NNTP protocols, or other supported Web-storage servers like FTP servers. In the case of FTP (file transfer protocol) sites, both the poster and collector application would be adapted to work with FTP protocols. It is noted that the same zones listed in Agent Poster 116 are also listed in Agent Collector 117. These represent zones that support binary collections in terms of collecting, posting, and viewing.

It is noted herein that poster 116 and collector 117 may be integrated using one common interface without departing from the spirit and scope of the present invention. It is also noted herein that collection of binaries can be practiced in conjunction with use of reader 115 without departing from the spirit and scope of the present invention. Furthermore, the zones listed in reader 115 may also govern posting and collection activities conducted under the identities associated with the appropriate zones. For example, if a user subscribes to a newsgroup server that aids his or her employment and that server allows posting and download of binaries, then the work zone would also be visible or at least accessible from poster 116 and collector 117. Agent Collector 117, like Agent Poster 116 might also be provided as a separate and standalone plug-in to the overall Agent suite.

Identity/Zone firewall 119 provides zone and identity policy enforcement through implicit adherence to the most current zone configuration and identity states. Application 119 may be thought of as a final destination router for incoming messages, interactions and downloads. Similarly, application 119 controls outgoing correspondence insuring that zone and identity policies are not inadvertently violated.

Firewall 119 enforces routing of all incoming and outgoing messages according to zone policy. Firewall 119 may be configured for any or all zones and for any or all identities. For example if a user attempted to email a contact listed in a specific zone while working in a zone where the contact is not supported then firewall 119 would generate an alert describing a zone policy violation and display it for the user before sending of the message would be allowed.

Application 119 directs final destination routing or sorting of all incoming messages and materials according to current zone policy. This may include structured Web-browsing in a zone specific manner. In a simple example of messaging, email directed to specific user identities would be filtered according to appropriate zone inboxes. Other interaction types including RSS, IM, NNTP, Voice, P2P, and Chat may be supported for final destination routing according to zone policy in different ways appropriate to the communication channels supported.

In one example an instant message addressed to a zone-specific user identity causes firewall application 119 to dress the IM interface with an icon or skin that identifies the appropriate zone that the message relates to. If the user is currently messaging with another contact related to another zone then a new IM window reflecting the zone of the new message may pop-up. Similarly, if a user attempts to IM a contact supported by a specific zone using a generic IM interface, then firewall 119 might change the interface to reflect the appropriate zone that supports the contact. If more than one zone supports the contact then firewall 119 might display a message to the user stating that the contact is common to, for example, your work zone and your sports zone. The user may then select the appropriate zone for the communication.

Zone/ID manager 118 described with reference to FIG. 1 above enables configuration of the physical zones and provides update and identity creation services. Zone/ID manager 118 has a user interface or configuration form (not illustrated) that supports zone and identity creation. The exact configuration of a set of zones and associated identities provides implicit rules for firewall application 119 to use in enforcement of zone policy. Additionally, zone manager 118 allows for creation of explicit rules that firewall application 119 can use. An explicit rule can be a permanent rule or a temporary rule and can include a zone, an identity, and a communication channel alone or in combination.

A message replication module 202 is provided and adapted for the purpose of replicating incoming messages to multiple pre-assigned zone inboxes if applicable. In one example using message replication, a user might replicate an incoming email message specific to a user zone to other zones of the user account or other user accounts held on one computer or computer network for example. In this case the user might be an administrator of more than one identity oriented managed account.

Zone manager 118 and message replication module 202 as well as IO firewall 119 may be, in one embodiment, provided as proxy Web-based services that enable interaction routing and Web-based workflow management for users accessing and, in some cases interacting in real time with the system through a Web-based portal. In another embodiment, a user may configure and manage zones and identities locally with minimal or no Web-based service support. A Web-based example of identity-oriented-management (IOM) services is described in detail further below.

Firewall 119 as described above is provided and adapted to provide security services for each zone and associated identities and contacts according to zone policy so that no zone cross routing or cross-communication is allowed if it is not desired. Firewall 119 uses zone, identity and contact configuration as implicit policy for managing communication related to each separate zone. In this way an incoming message that should be routed to a user's work zone for example is not routed to any other zone inbox.

Communication activity is governed chiefly by identity/contact pair (sender and receiver identities) enforced by firewall 119. A specific contact listed for a zone-enabled user might exist and may have the same parameters listed for more than one user zone if the contact has only one identity (email address for example). However the destination address (user's zone-specific identity) the contact chooses for email correspondence is preferably specific to only one user zone. For example if a co-worker john@iwork.com sends an e-mail to a zone-specific identity frank@iwork.com and john@iwork.com is associated only with a work zone, then that message would be routed to the associated work zone inbox. Identities are generated for zone management purposes.

However, it is possible that John only has one contact identity and in addition to being a co-worker also is a trusted family friend that has knowledge of a user identity specific to the family zone, perhaps frank@family.net. If John uses family.net as the destination address in the To: line of the email message then the email message is automatically routed to the family inbox instead of the work inbox according to identity.

In the above-described routing example, John could inadvertently send a work-related mail to the family inbox if he types or inserts the family identity into the destination address by mistake instead of the work identity if he is privy to both identities. However, the fact that the identity visibly suggests to John that this is a family-related identity might alert him of the mistake before send. In actual practice, John will most likely have a work and a home email address even if he does not use the system of the invention. The contact information for John can be strictly managed so that the work zone does not support John's home email address and the family zone does not support John's work email address. More simply stated, if John mistakenly sends a message to the family identity from work firewall 119 will catch the mistake and alert the user of an incompatible identity-contact pair.

In one embodiment an appropriate media handler adapted for a specific message of type can parse subject lines and content of an email message, for example, for an indication of zone specificity. It might be that John has only one identity that is shared as a same contact parameter across more than one user zone. In this case if John's subject line reads, "project management report" for example, but the destination address of the message is the family zone identity, firewall 119 will designate the work zone as the appropriate destination instead of the family zone according to subject line interpretation. In this case it is assumed that a list of keywords and phrases would be provided that are zone specific for parsing to work successfully. If the subject line is blank or otherwise not recognized firewall 119 may intervene with a user alert to manually select which of the zones listing john@iwork.com the message from John should be routed to.

It is noted herein that if John of the above example is operating from an interface of the present invention to collaborate with Frank, then John will likely have separate identities for his own work zone and family zone, the identities listed as contacts in Frank's respective work and family zones. In this case, zone-to-zone collaboration is performed seamlessly with no errors due to synchronization of identity/contact parameters. More detail and specific examples of message routing according to identity/contact pair will be provided later in this specification.

All zones of a user may be configured on the user's desktop and some or all of them can be replicated at a network portal if the user has subscribed to network hosted services. Such services may be offered through zone host 103 described with reference to FIG. 1 above.

Exemplary zone list 200 is illustrated in this example and includes the zone descriptions work, community, business, family, literature, travel, personal, sports, music, after hours, political, and pet. Zones 200 are exemplary only as any one user may have fewer or more zones. List 200 simply exemplifies the possibilities of different zone types that might be created. It is also noted that not all of the existing zones in this example are necessarily configured for posting and collecting activities. However, it may be assumed that all created zones support at least messaging and news group association. In this particular case, the user may have 12 different identities, one for each illustrated zone.

Figure 3:
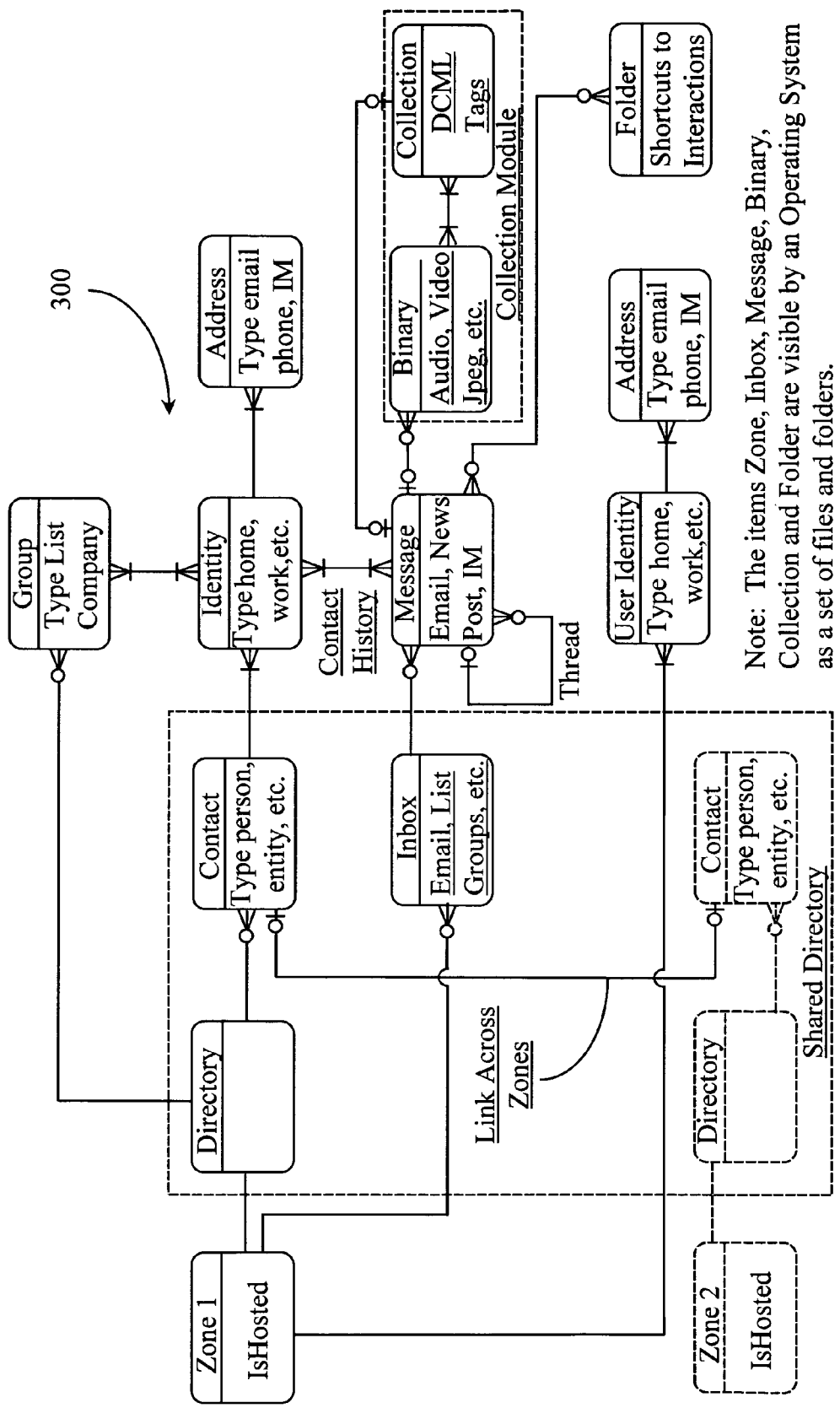
FIG. 3 is an entity relationship diagram illustrating structure of a zone according to an embodiment of the present invention.

FIG. 3 is an entity relationship diagram 300 illustrating structure and function of a zone according to one embodiment of the present invention. Zone structure 300 illustrates the existence of certain zone objects and their relationships in a zone object hierarchy. A first zone or Zone 1 is illustrated herein with an indication that the zone is hosted (IsHosted). This means that the zone in question including all associated objects thereof is managed by proxy by a network-based service that keeps track of message routing and replicates activity to desktop systems when user's log in to access the system. In one embodiment, zone 1 might not be network hosted.

Zone 1 has a Directory, which is adapted to list one or more Contact(s) that are approved for that particular zone. Contact can be of Type person or entity. Directory may also list one or more Group(s), which may be of Type List or Company. List or Company implies a generic contact parameter that is associated with more than one possible final destination. For example, a Group might be labeled Machine World and might be of Identity Business, which has an Address of Type email=sales@machine.com and a message sent there might be routed to one of a number of possible sales agents.

Contact has an Identity that can be of type home, work, etc. A contact Jim might include Jim's work identity="Jim at work" or his home identity="Jim at home". Jim might also have an Identity=Jim mobile (not at work or home). Identity has an Address, which can be of Type email, telephone number, IM address, etc. For one zone it is typical that a contact specific to that zone would have one identity and only one of each supported address per supported communication channel. For example if zone 1 is a family zone then Contact=person, Identity=home, and Address=email and telephone number would be a logical configuration. The email address and telephone number identifies the channels and destination parameters used to reach Contact at Home.

Zone 1 has a User Identity, which may be of Type home, work, etc. Like a contact, User Identity has an Address of Type email, telephone, IM, etc. User Identity might=Frank at Home and have an Address of Type email=frank@myhouse.com and a home telephone number, and an IM address=frank@hotmail.com. User Identity identifies the zone owner or administrator.

A user identity is specific to a zone and identifies the owner of the zone in a manner specific to the zone adaptation. For example an identity can be a home identity, a work identity, an after hours identity and so on. If the identity is a work identity then the zone it is associated to will be a work zone. A user identity has an address where mail is routed (email) and may also include a telephone number, an IM address, and other communications address information if desired. For example a user identity for a work zone will include a work telephone number whereas a user identity for a home zone will include the home telephone number. That is to say if telephone contact information is included.

A directory may, in one embodiment, physically include the zone identity (user identity for zone) along with listed contacts but may be segregated and not explicitly identified as a contact but as the identity of the user for that zone. In this example, User Identity is not illustrated as included within Directory but is a separate attribute of Zone 1. A user identity might also be expressed as a "Group" identity although the possibility is not illustrated in this diagram. A group identity might include a number of separate users all having administrative access at one time or another to the same zone wherein the sum of users are expressed as a single group identity=Maple Church, for example, wherein a list of church zone-authorized members might be aggregated together under an Address or Type email=congregation@maplechurch.com. There are many configurable possibilities. The case of group user identity implies administrative equivalence among the listed individuals sharing the zone.

Zone 1 has at least one Inbox, which may include an email box, a voice mail box, a box holding subscribed-to mailings from a list server, a box for newsletters or notices from subscribed-to news groups, RSS Feed, etc. Inboxes are flexible according to supported channel. For example, an inbox might be provided to take incoming communication or materials coming in over any supported communication channel.

In one embodiment there will be a single inbox set up for each supported communication form. For example an email inbox specific to the email address of the user identity is provided to contain incoming emails sent to the particular email address specifying the user identity of the zone. For example, all mail incoming to John@iwork.com goes into the email inbox of that zone. An inbox may include an interaction logging function, for example, to record message or call details of incoming and outgoing activity In one embodiment only a single inbox is provided within a zone and adapted to accept all supported communications addressed to the user identity for that zone. For example, if a user has a private telephone number that is specific to the zone and published to approved contacts then all calls to that telephone number wherein the sender identity of the caller matches one in the zones contact directory will be routed to the zone message inbox as voice messages.

Inbox may contain one or more Message(s), which can be email messages, newsletters, Internet postings, Instant messages, etc. Likewise any message can be part of a message thread such as an ongoing email correspondence. In one embodiment Identity, an attribute of Contact may have a Contact History of kept messages that can be reviewed as a thread. In this case messages that are part of correspondence with a certain contact can be sorted serially or by other methods and isolated as correspondence records attributed to that contact. Message(s) can be sorted to one or more Folder(s) setup within an inbox for sorting messages appropriately according to folder type such as "message threads", "newsletters", "chat transcripts" and so one. In this case a user may click on an appropriate folder to view any new messages that have been filed since the last inbox access. Folders may also include a Spam folder, or a folder for unsorted messages.

Message(s) is linked to Collection, which is an activity attribute of a Collection Module that includes a Binary attribute. Binary files, which may be audio files, video files, picture (Jpeg) files and so on may be sampled and collected (downloaded) through inbox architecture. Collection includes sampling available files that are marked or tagged with a digital collection markup language (DCML), which is a convention provided by the inventor to enable more structure in sampling and tracking digital content that may be posted for example, in a binary server.

When posting material with an application adapted for the purpose, a poster may use DCML tags to summarize and identify posted materials. A user looking for posted materials has use of a DCML reader that can find and interpret DCML tags. In this way a user can more effectively and efficiently obtain materials from servers and from P2P networks. In this case a binary server for zone 1 might be a listed contact (entity) and might have an identity of "collection". It is noted herein that Folder is also an attribute that is applicable to Binary and Collection where digital content may be sorted and kept in specified folders accessible through inbox architecture.

Zone 1 is associated in this example to a second Zone 2 at the level of directory. In one embodiment a directory might be shared between two separate zones as illustrated by a dotted rectangle labeled Shared Directory. The attribute Contact of Zone 1 is linked to Contact of Zone 2. This indicates that certain contacts of Zone 1 are also approved and available from the directory of Zone 2 while working from Zone 2. In this sense, both directories share one or more common contacts. The level of contact linking across two or more zones is a matter of design and sharing can be configured such that the shared contacts may be the same only in abstract identity but may exhibit differing attributes with respect to actual contact parameters.

As described further above, the concept of hosted zones as illustrated in ER diagram 300 relates to a unique service for routing and managing zone specific interaction wherein zone owners have unique identities that the outside world sees and wherein contacts approved to interact within a user zone are the only entities capable of interaction with the user in a particular zone. In a hosted embodiment, the user subscribes to a portal service that provides routing services that are identity and zone specific as described further above. In this regard a portal page is provided for the user to check and view zone activity from any network-capable device. In a hosted embodiment a user may synchronize with the Web-service updating zone structure and content between a local computer and the server hosting the zones. The zone-hosting service is especially useful for a person or a group of persons having many zones and identities to manage. A person having only two zones for example may not require host services. If more than one user or a user group shares a zone then zone hosting may be more likely.

Identity oriented management then may encompass all interactions between a zone owner (zone ID) and outside entities in a secure manner such that no disapproved contacts become privy to zone identities and similarly wherein no created user identities are provided inadvertently to disapproved contacts. In one embodiment a user may elect that no zones are hosted and may manage all of his or her zone-specific communication and archiving on his or her own computer. In either case of hosted or non-hosted zones, the structure is essentially the same and zone policy is enforced in both cases by a zone firewall (119, FIGS. 1 and 2) that will be described in yet more detail later in this specification.

It will be apparent to one with skill in the art that ER diagram 300 may include more or fewer attributes and may be extended to provide additional component types and different associations between components without departing from the spirit and scope of the present invention.

In one embodiment of the present invention, a user may have an IP telephony application configured to be accessible from the well-known PSTN network through normal telephone dialing for example. In this case a telephone number may be mapped to an IP application and specified to a particular zone so that live voice sessions may be conducted in a zone-specific manner. Any incoming calls that do not include information of the caller that matches a contact in the zone directory would be automatically rejected or sent directly to voice mail as a zone policy violation by firewall 119. Instant messaging and other application-based sessions like P2P file sharing can be conducted as well in a zone-specific manner. Outbound campaigns specific to media types such as voice or email may also be conducted in an identity oriented manner.

In one embodiment, the message attribute of Inbox can identify an interaction thread (chain of correspondence) with one or more contacts having access to the zone identity for communication. Such interactions can include, but are not limited to voice messages or transcripts, email correspondence chains, chat transcripts, message board or Usenet postings and reply threads specific to contact/user identity pairs, and so on. These correspondence histories or threads may be stored as separate interactions in one or more folders adapted to contain them.

Folders can be identified in any number of ways. For example, in a pet zone there may be a folder labeled after a news group topic alt.showdogs wherein the messaging history is recorded as an ongoing interaction between the user identity and one or more approved contacts participating in the group. In this sense, all of the related communiqués posted by the specified contacts (newsgroup members) listed in the zone directory would be automatically downloaded and stored in the folder as an ongoing interaction. Further, the system can alert users by any one of various communication protocols of any new updates to interaction threads maintained in any of various sub-folders that might be created.

As previously described, folders may be provided to segregate materials that are received in a zone inbox or inboxes. Folders are shortcuts to data and can be navigated in typical OS fashion wherein opening of a folder reveals the files contained therein. Each inbox may have one or more folders associated with it. A Zone and its navigable components including Inbox, Message, Binary, Collection, and Folder typically reference folders that are visible to an operating system of a host computing device as a navigable tree of files and folders.

It is noted herein that interaction may also involve downloading, posting, or even sharing binaries (via P2P, NNTP, email or IM) that belong to a user's binary collection. For example, if the zone is a music zone and there are contacts in the contact directory that are authorized for content sharing, then binaries that are posted by those contacts can be detected and downloaded to the appropriate zone specific inbox.

In one embodiment a zone can support P2P contacts that can be listed in a zone directory and can be given access to a zone interaction folder for the purpose of uploading content there from or depositing content thereto using an application similar to a file sharing application or an FTP application. In traditional P2P networks there is a proxy server that accesses a user's computer on behalf of another requesting user that is looking for a specific file to download such as a music file. In this case, the service might be network hosted by the zone host described with reference to FIG. 1 above and members may be prevented from accessing a file unless they are added to a zone directory list of authorized content sharers.

Figure 4:
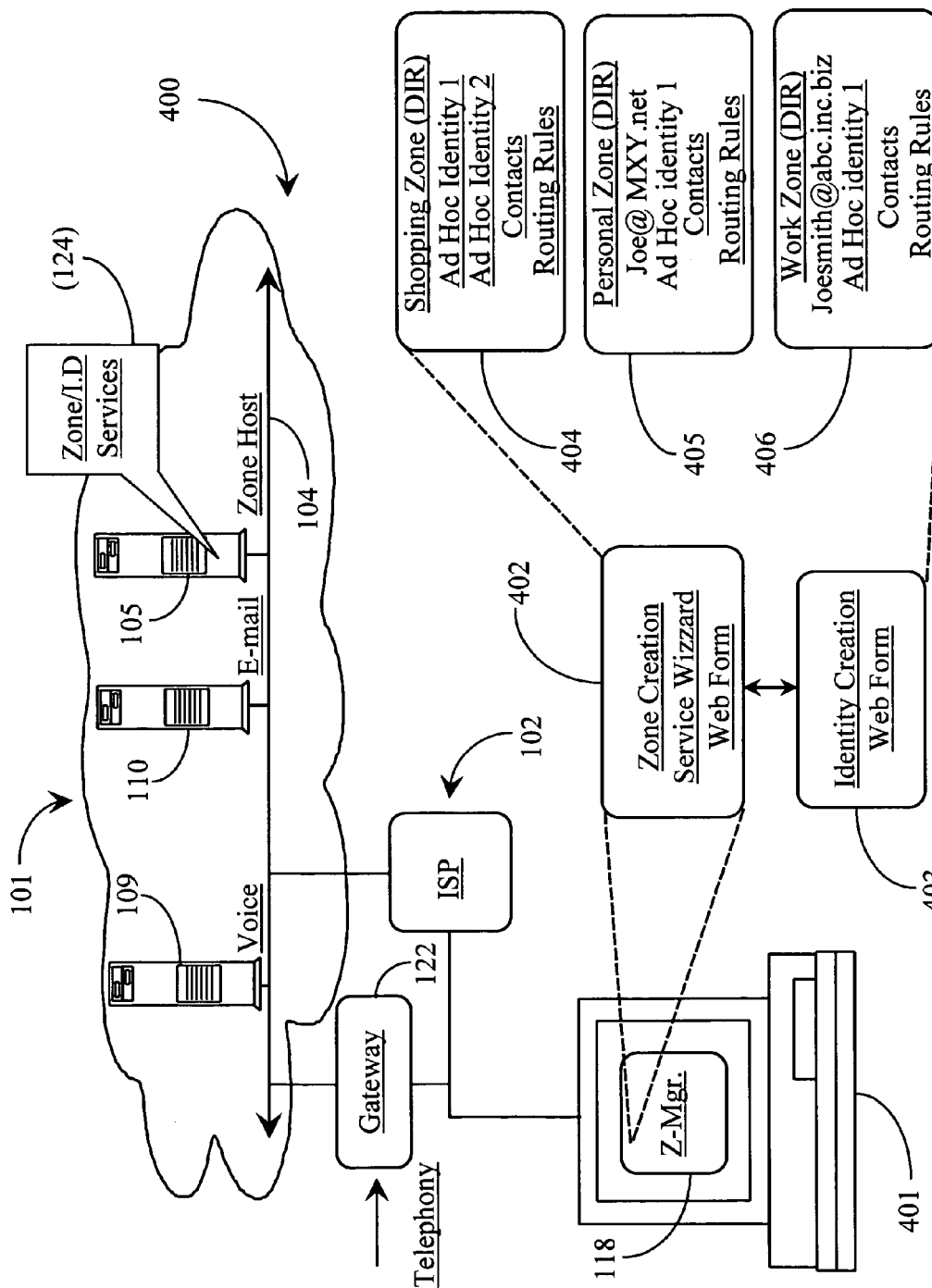
FIG. 4 is an architectural view of a user interacting with Web-based zone creation services according to an embodiment of the present invention.

FIG. 4 is an architectural view 400 of a user interacting with Web-based zone and ID creation services (124) according to one embodiment of the present invention. Zone-host server 105 provides zone-hosting services represented herein by zone/ID services software 124. Zone host 105 is represented logically herein as a single server, however one with skill in the art will recognize that as an entity providing zone management and firewall/routing services, there may, in actual practice, be more equipment associated with the function. The inventor represents host 105 as single server herein for simplicity in illustration only. A more detailed example of zone-host architecture according to one embodiment of the invention will be provided later in this specification.

As previously described above, zones uniquely identify a genre and a user. Hosted zones enable server-based activity and local computer-based activity with synchronization of the two. A user 401 has an instance of zone wizard or manager 118 executed and running on a local computer for the purpose of creating zone architecture and zone IDs.

User 401 has computer connection on-line through ISP 102 to backbone 104 and zone-host server 105 offering Zone/ID services 124. In this case, server 105 thereafter hosts the zones created by the user and wizard 118 is served in this example as a series of Web-forms 402, for creating zone architecture, and 403 for creating identities specific to created zones.

In this example there is a zone 404, a zone 405, and a zone 406 all created with the aid of Web-forms 402 and 403. In a one embodiment zones are first created and then identities are created for each zone. Shopping zone 404 has a directory for including zone-approved contacts. Contacts may be added singularly or selected and imported from other applications. The contacts added to a zone will be privileged with the user identity and contact parameters attributed to that zone for enabling correspondence between the zone owner and the approved contact. Contacts may also be added to zone contact lists implicitly as a result of workflow activity, if a rule is configured for the purpose.

It is noted herein that shopping zone 404 does not have a permanent identity associated with it. Rather it has one or more, in this case two ad hoc identities, ad hoc identity 1 and ad hoc identity 2. This might be because the particular user does not wish that any sales or service organizations he or she might purchase from over the network has access to any permanent contact information. The user in this case prefers to use a temporary email address for example as the only means of contact with an organization.

To illustrate a simple example, identities for shopping zone 404 could be temporary email addresses used to conduct online transactions with selected organizations that then would be listed as approved contact entities for zone 406. Zone-host server 105 through an identity creation service provides the temporary email addresses. In actual practice the host owns a domain and sub-domain for enabling users to apply for ad-hoc identities that can be used until such time a user no longer requires the address. In one embodiment a generic email address domain can be provided to all subscribers to use when applying for an ad-hoc identity wherein the user creates the identity portion or name portion for each address.

Ad-hoc identities enable users to keep consumer related mail segregated from their other identities used for personal correspondence, work-related correspondence, and other correspondence where wading through sales-related adds, service offers, and so on is not desired. An ad-hoc identity facilitates correspondence with a service organization, for example, until the user no longer desires or requires communication with that particular contact. At that the time the ad-hoc identity can be expired from service leaving the contact with no simple way to reach the user. Similarly, the contact can also be purged from the contact directory if desired, or the next time correspondence is desired with the particular contact a new ad-hoc identity can be created. Another advantage for using ad-hoc identities is that if the contact compromises the identity by providing it to third parties then the user can simply expire the identity.

Personal zone 405 has a user identity of joe@MXY.net used for personal correspondence with friends and other trusted contacts. Zone 405 also has an ad-hoc identity that can be used for example in correspondence with some contact entities like a dating service for example, where the user will correspond with a contact for a period before letting that contact have access to the users permanent identity.

Work zone 406 contains the users work identity joesmith@abc.inc.biz used for work correspondence. An ad-hoc identity is similarly acquired for temporary work relationships where it is not desired that the contact or contacts have permanent access to the user. All of the users work associates would be listed in the contact directory for zone 406.

In typical application for zones where there is at least one permanent identity and at least one ad-hoc identity, the contacts listed in the directory would be associated with one or the other appropriately so that outgoing messages do not provide the wrong contact with the wrong identity. It is also noted herein that zones 404-406 each have at least one inbox. Inboxes for the illustrated zones may include identified folders and sub-folders that are specific to certain messages or message threads involving correspondence with certain contacts as described above with respect to FIG. 3.

In typical practice of network hosted zone management, after a user has created zones, server 105 functions as a store and forward server that can receive correspondence addressed to the hosted zone identities and route the messages to the appropriate inboxes and folders based on identity of user (recipient) and contact (sender) enforced by firewall. Server 105 becomes the user's email server; phone message server; IM server; and voice server. User 401 may connect to server 105 and view stored messages through a portal page user interface (UI) dedicated to and personalized for that user. Several different views can be presented and the user may delete, download, or view messages and can reply to and send messages from the same portal interface.

If the user has a personal email account at email server 110, server 105 can be designated as a forward destination for all email activity addressed to the original account. The forwarded email may be sorted according to zone policy and may be retrieved using computer 401. Likewise, server 105 can be configured as a routing destination for voice calls (VoIP, etc.) coming in through gateway 122 to voice server 109. The user may create telephone numbers to give to contacts and may have calls to his or her own static personal numbers (cell, landline) forwarded to server 105 for voice message routing into appropriate zone inboxes for voice messages. If user 401 maintains an open-line connection to server 105 for a definitive period such as a work period, the user operating a computer-based telephony application may take live calls filtered through appropriate zones.

If a user desires, he or she may turn off zone-host services for a period of time and receive and send messages directly without inserting server 105 into the routing paths. In any case, zone configuration, contacts, and messages may be synchronized between server 105 and station 401. Synchronization between the server and a remote user station is not required however to practice the invention.

Figure 5:
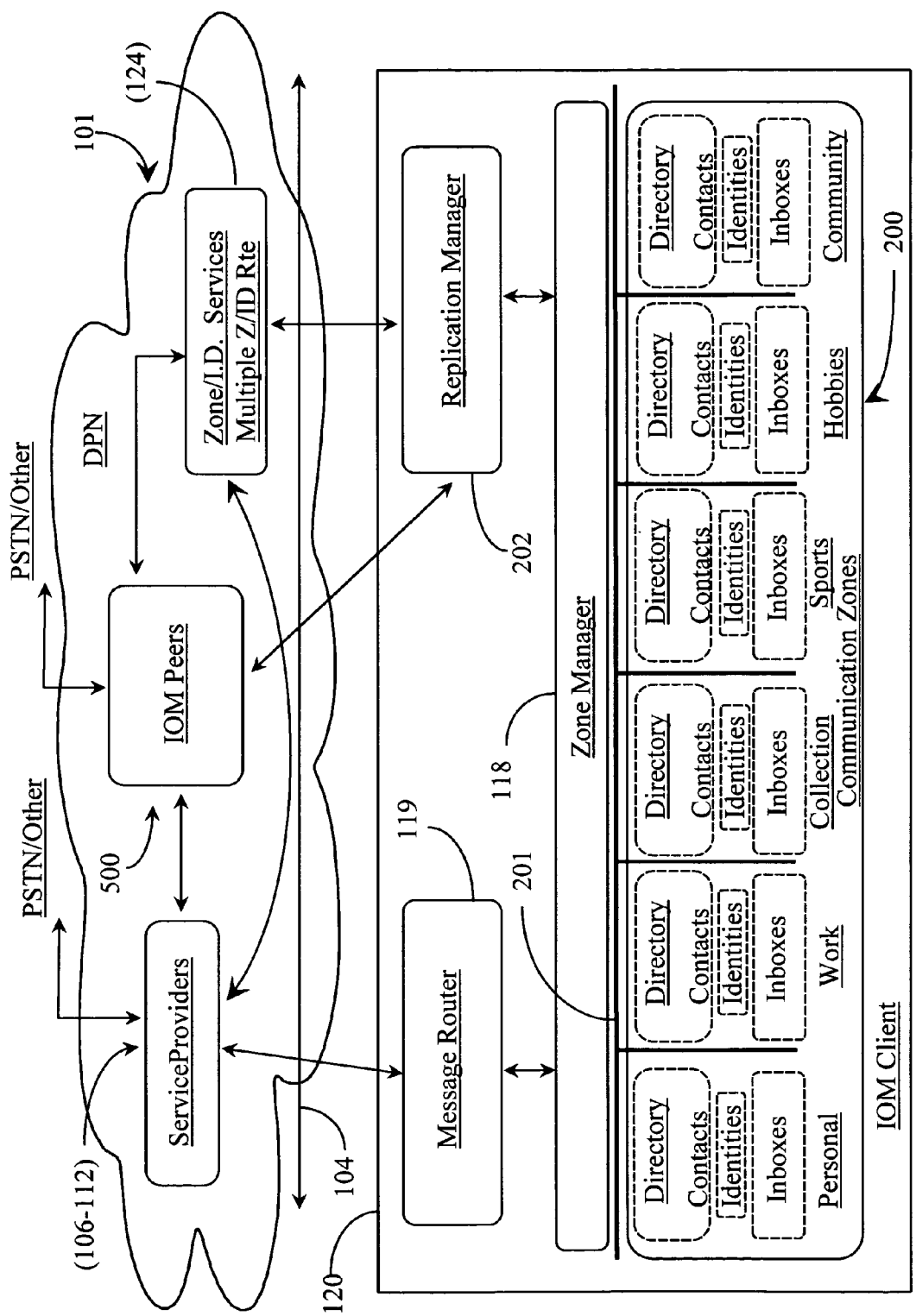
FIG. 5 is a block diagram illustrating interaction paths between an IOM client and network peers and services according to an embodiment of the present invention.

FIG. 5 is a block diagram illustrating possible interaction paths between an IOM client, network peers and service providers according to an embodiment of the present invention. IOM client 120 contains identity-oriented firewall 119, replication manager 202, zone manager 118, and configured communication zones 200. Client 120 might run locally on a user desktop computer, a laptop computer, and in light versions, on other network-capable computing devices having a means of display and input.

The network side of this example (within the domain of network 101) contains service providers 106-112 introduced with respect to FIG. 1 above, a zone host implementation (124) and IOM peers 500, which encompass other users operating all or a portion of an instance of client 120.

In this example, IOM client 120 has numerous zones 200 set up for communication. Zones 200 reading from left to right in zones 200 include a personal zone, a work zone, a collection zone, a sports zone, a hobbies zone, and a community zone. One with skill in the art will recognize that the number and label of zones 200 configured for client 120 may vary widely. In one embodiment, typical zone suggestions like work, personal, family, etc, might be provided and to some extent already set up for a user. A user may build upon the model by adding more zones as required. Although contacts and even identities can be shared between zones if desired, directories for each zone may also be zone specific. Each zone might have one or multiple inboxes including private and shared inboxes.

If zones 200 are hosted zones then the functions of zone manager 118, firewall 119, and replication manager 202 are performed at network level and do not specifically have to be provided locally although they may be. In a zone-hosted embodiment synchronization between on-line and desktop data may be ordered for downloaded/uploaded materials and messages. In this case zone architecture (zones 200) is duplicated at both locations. In this way a user may view or access data on-line using any supported network-capable device including a normal telephone in some IVR-assisted embodiments. In the event of non-hosted zones 200, then the replication, zone management, and firewall functions are all performed within client 120 where they are illustrated in this example.

Any of service providers 106-112 identified with respect to FIG. 1 above might interact directly over the network with client 120 in the case of non-hosted zones 200. Firewall 119 cooperates with replication manager 202 to ensure that messages requiring local replication and local distribution to appropriate zone specific inboxes occurs. For example, if an email from a family member is assigned to an inbox within the personal zone it may also be replicated to another inbox within the same or even different zone if zone policy allows the replication.

It is noted herein that service providers 106-112 and peers 500 may connect from a network other than local Internet 101. For example, one service provider may be a telephony integration provider or carrier through which an interaction or event that will be routed to IOM client 120 is sourced from the PSTN network or another communications network such as a wireless network and carried through network 101. Similarly, peers 500 may be connected to the PSTN (telephone) or another network and interact with client 120 through network 101.

Zones 200 may not all belong to a same user for a given IOM client 120. It is possible to allocate zones to other users. For example a zone administrator may control the personal zone, while a different family member may own the hobbies zone. A replication rule may be set up by the administrator to replicate email assigned to a specific inbox within the hobbies zone to a designated inbox within the personal zone. Such a replication rule would be an explicit rule that may override contact/identity policy thus overriding firewall protection.

IOM peers 500 represent other users that are operating with the software of the present invention and therefore have their own client versions installed, which may be hosted or not hosted. Peers 500 would interact directly with specific service providers 106-112 (depending on communication form) to communicate with the user through firewall 119 in application 120, which actually forms the final zone-specific sorting or routing. In one embodiment where a message is replicated to more than one inbox as part of a collaboration workflow, and the message requires a reply from only one of the involved parties, one user may reply to the message, the action causing notification to the other users that they need not reply to the message.

Alternatively if zones 200 are hosted, then peers 500 and service providers 106-112 would interact directly with services software 124 to propagate text messages, voice messages, and so on. In this case, the server associated with routing an interaction would publish the IP address, telephone number, Enum number, etc. of the client domain maintained by the server. Enum is a known protocol for assigning contact parameters to any networked device or application and renders that device or application accessible from the same or connected networks.

In the case of hosted zones it is noted that when a user connects to the service (124) from a client-enhanced, network-capable device, synchronization may be automated meaning that all messages that have been routed to service-side inboxes and folders are simply synchronized with the user's resident zone architecture if present. In the case of access with a non-client enhanced device, interaction and management can still be performed, as is the case with Web-based email programs for example wherein a user may view mail and download copies without erasing the server-based messages. It is also noted herein that when a user is connected live to services 124 then real time interaction is possible.

Figure 6:
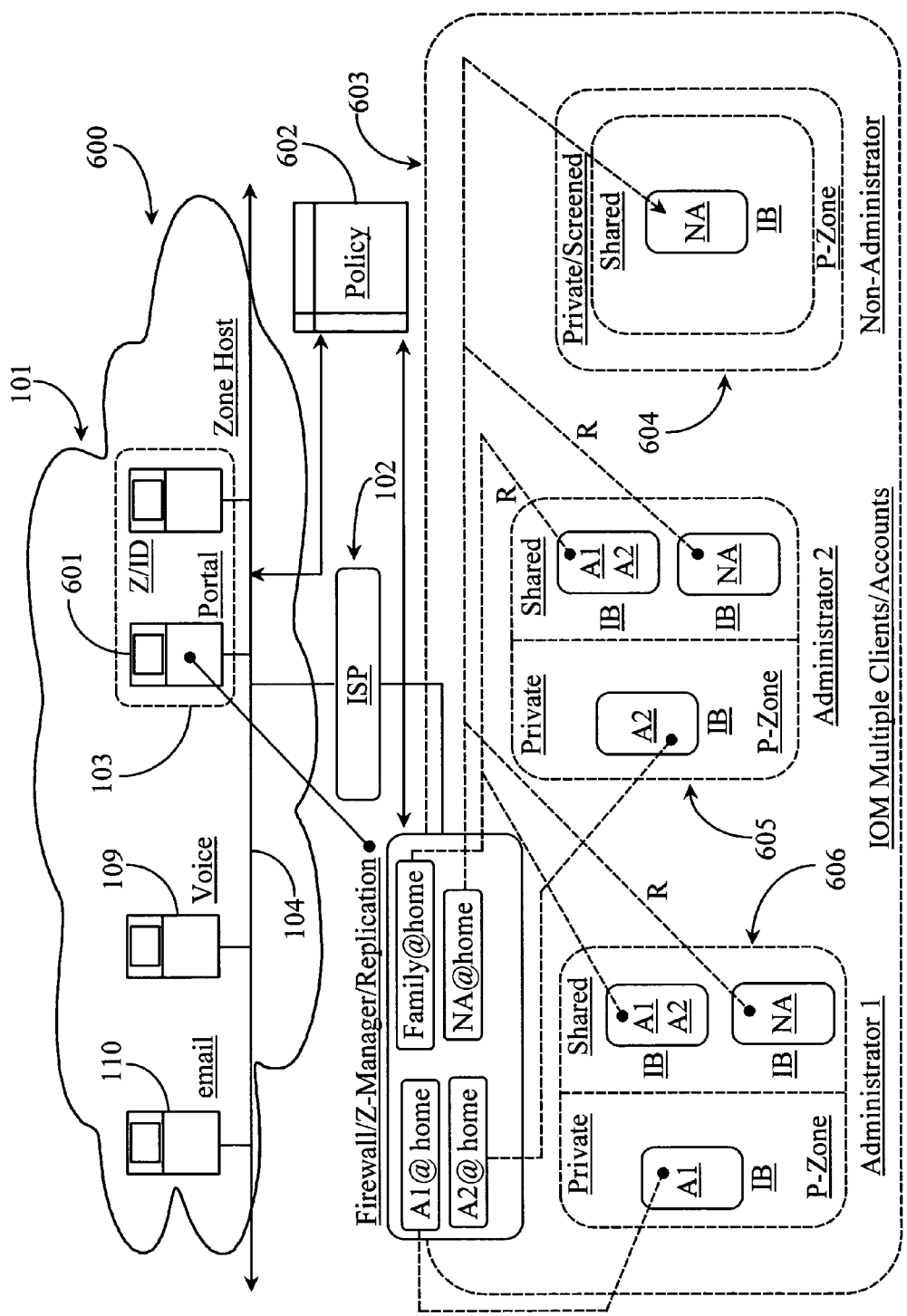
FIG. 6 is an architectural overview illustrating an example of replication of messages according to an embodiment of the present invention.

FIG. 6 is an architectural overview 600 illustrating an example of replication of messages according to an embodiment of the present invention. Overview 600 encompasses Internet 101 and an exemplary IOM client domain 603. Domain 603 may represent one IOM client having multiple accounts or it may represent more than one separate IOM client account resident on one machine. In the case of separate accounts (3 in this case), they may be distributed to more than one networked machine wherein each machine shares a same and active Internet connection such as a DSL connection.

In this example according to one embodiment of a single client having multiple accounts, IOM client 603 is integrated for more than one user. An administrator 1 is illustrated within client 603 and is represented herein by a dotted rectangle 606. An administrator 2 is illustrated within client 603 and is represented herein by a dotted rectangle 605. A non-administrator is illustrated within client domain 603 and is represented herein by a dotted rectangle 604. Assuming for example that IOM client 603 is used by a family, then administrator 1 (606) might logically be a father, administrator 2 (605) might logically be a mother, and non-administrator (604) might logically be a son or daughter, the aggregate comprising a family sharing one IOM client.

In this case, replication of messages is governed by zone policy, with replication ordered across the included user accounts. This case can exist regardless of whether zones within client 603 are hosted or not. It may be assumed for purpose of discussion that zone host 103, which is accessible to client 603 through ISP 102 and backbone 104, hosts the illustrated zones. In the zone-hosted embodiment, all firewall routing, zone management, and replication is performed at server-side. Within zone host 103 is illustrated a portal server 601, which is analogous in a logical sense to server 105 described with reference to FIGS. 1 and 4 above. Server 601 serves as a Web interface to, in this case users 604-606. Another server icon is illustrated within zone host 103 and represents any other included equipment that might be provided to perform services such as routing, zone management, zone configuration, and so on.

Zone host 103 has a zone policy base 602 that is partitioned per client, and may be further partitioned if more than one user is classed as one client. Policy base 602 contains zone policy and certain zone management options available to, in this case, administrators of IOM client 603.

It is noted herein that administrator 606 has a personal zone (P-Zone) that is divided into a private portion and a shared portion. Administrator 605 has a personal zone similarly divided into a private portion and a shared portion. Non-administrator 604 has a personal zone that is divided into a shared portion and a private/screened portion. There may be other zones attributed to each account however only a personal zone for each account is illustrated for purpose of discussion.

Administrator 606 has a private inbox IB where only mail addressed to the appropriate identity (A1) for that zone is deposited. Administrator 606 has 2 inboxes (IB) in the shared area or portion of the personal zone. One shared inbox accepts all messages addressed to family@home. The remaining shared inbox of administrator 606 accepts messages addressed to the identity of non-administrator 604, the messages deposited there by rule. Administrator 605 (A2) has a personal zone with 3 inboxes set up identically as that described above accept for the private inbox has the identity of A2 @home attributed thereto, the at-home identity of administrator 2. Non-administrator 604 has one illustrated inbox where all messages to NA@home are deposited.

In a zone-hosted embodiment, Firewall routing, Zone management, and Message replication for the emails addressed to A1, A2, Family, and NA are functions performed within zone host 103. However for purposes of simplicity in illustration the 4 mentioned zone identities are illustrated in a rectangular box logically representing function performed in this case at portal 601.

Assume that email server 110 has forwarded (SMTP) an email addressed to A1@home to portal 601 for routing. The message A1@home is private (not to be shared) and is routed to the private inbox of A1 personal zone as illustrated by logical a routing path (dotted line). Note there are no replication rules that apply and no replication is performed. Similarly, a message addressed to A2@home is routed to the associated private IB of administrator 605 with no replication.

For email messages addressed to the family identity=family@home, A1 and A2 have access to a copy of the email through a replication rule. The rule might state that for the identity=family@home, replicate to P-Zone (A1), shared Inbox (A1, A2), and to P-Zone (A2), shared IB (A1, A2). Following a hierarchy of administrative power, the message may be routed originally to administrator 1 and then replicated (R) to administrator 2. In this example, any email messages routed to non-administrator 604 (NA @home) are replicated to another shared inbox set-up in both P-zone A2 and identically in P-zone A1. IB NA then is a monitored Inbox that enables administrators 606 and 605 to see messages routed to non-administrator 604.

In a family situation, the above-described feature represents a parental control feature. Contact (sender) identities for those entities corresponding with NA@home are kept in a directory generic to P-zone 604 (non-administrator). The contacts being monitored may be replicated to the directories of P-zone A1 and P-zone A2 as "monitored contacts". After some given period of monitoring, either A1 or A2 may delete the contact from the appropriate contact list to nullify replication to that zone of emails to NA@home from the specific contact. Provided that both "parents" delete the contact being monitored from their directory future emails with that "approved" contact will be routed to a private/screened IB in the P-zone of NA.

In one embodiment a sub-rule may also be provided that replicates a deletion action performed to delete a contact whereupon if either A1 or A2 deletes a contact related to emails routed to NA then the contact deletion will replicate to the contact list of the P-zone directory of the non-initiating parent. In this sense, zone-specific policy rules may be created based on identity/contact pairs or on identities or contacts separately. For example, if a contact sending mail to NA@home is to be banned, then instead of deleting the contact from a list of monitored contacts, it is moved to a contact blacklist. In this case the list is replicated back to the zone hosting service and published, for example, in policy base 602. Subsequent messages from that contact may be blocked or "killed" by the zone firewall regardless of client identity. Moreover, a contact may also be placed under partial ban. For example, A1 may decide that messages from a contact banned for P-zone of NA are still appropriate for sending to P-zone A2. For example, if a newsletter about drugs is periodically sent to identities A1, A2, and NA@home from the same contact then messages from the contact to NA@home (contact/identity pair) are the only ones blocked by firewall.

It will be apparent to one with skill in the art that zone architecture can be shared by more than one user and replicated for more than one user without departing from the spirit and scope of the present invention. In a case where there are multiple separate client applications distributed to machines or workstations on a LAN, for example, then integration and control by one or more administrators is still possible through policy-based administration. A separate integration tool may be provided for the purpose of integrating multiple client instances on separate machines that function, for example as a service business or the like.

Figure 7:
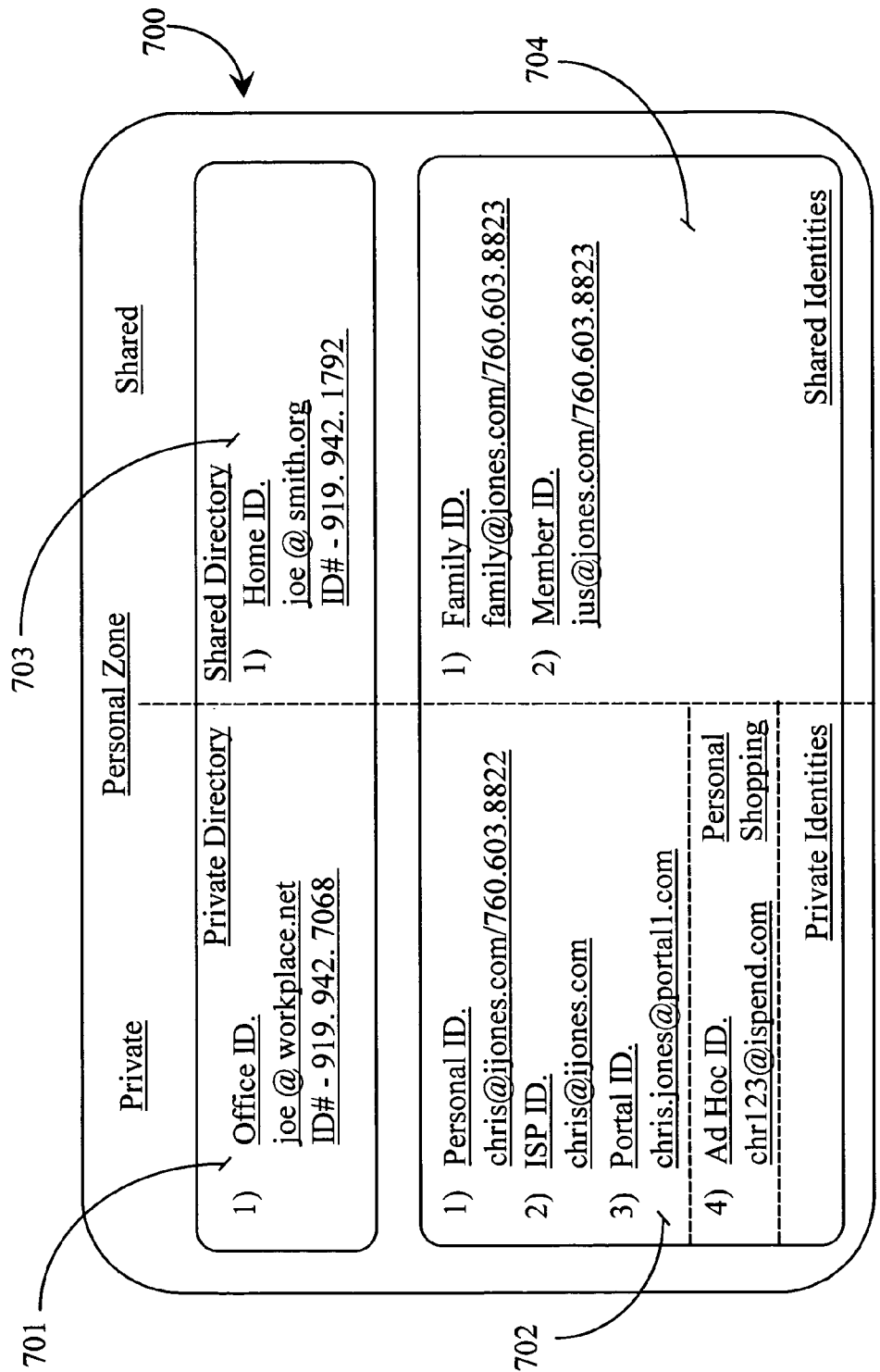
FIG. 7 is a block diagram illustrating architecture of a personal zone according to one embodiment of the present invention.

FIG. 7 is a block diagram Illustrating architecture of a personal zone 700 according to one embodiment of the present invention. Personal zone 700 has a private directory 701 and, in this example, a shared directory 703. In one embodiment, private directory 701 and shared directory 703 are part of a physical single zone directory with designation of shared for the entries that are shared. In another embodiment, a separated shared directory may be provided.

Private directory 701 contains all of the contacts that have firewall access to the user's personal zone 700 where no other user has firewall access to view that portion of zone 700. Contacts may have a number of actual contact parameters attributed thereto. In this case 1 contact is illustrated as an office ID for a contact Joe Smith. Joe's office email address is joe@workplace.net. Joe's ID# for work is his workplace telephone number of (919)-942-7068. In one embodiment some number other than a telephone number may be provided as a contact ID number.

Joe, in this example, is an associate at work and also a family friend. Therefore, shared directory 703 lists Joe with respect to his home ID. Contact parameters listed for Joe's home ID are an email address joe@smith.org and a telephone ID#919-942-1792, which is a number for reaching Joe at his home. Personal zone 700 is analogous to personal zone 606 described above with reference to FIG. 6. It may be assumed that there are two inboxes associated with zone 700, a private inbox and a shared inbox.

Messages incoming to zone 700 from joe@workplace.net may be considered private to the user and therefore are routed to a private inbox. The fact that the private email contact for Joe is a work email may indicate that the collaboration between Joe and the user is private and not to be viewed by any other persons. However, in order for messages from Joe to be routed to the private inbox of the user, in one embodiment, he has to have access to one of the user's identities that are set up for the personal zone 700.

In this example, in private identities 702 there are 3 personal IDs set up for zone 700. In some embodiments there may be only one personal ID set up for zone 700. Personal ID#1 is chris@ijones.com with an ID# (telephone) of 760-603-8822. It is noted in this example that a second ID for Chris is the same email contact parameter as the personal ID.

In this case the user's ISP email account is the same as his personal zone ID. In this case all email messages addressed to chris@ijones.com are replicated to the personal inbox of Chris as long as the sender is listed in private directory 701. Chris may import trusted contacts from is ISP account and paste them into directory 701 and in some cases into a replication directory (not illustrated).

A third private ID for zone 700 is listed as a portal ID chris.jones@portall.com. All messages addressed to chris.jones@portall.com will make it through to the private inbox so long as the senders are listed as contacts in private directory 701 and in some cases, in a replication directory. A replication directory contains contacts approved for replication to inboxes other than default account inboxes.

In a zone-hosted embodiment, the service entity can intercept email sent to various and unrelated email accounts held by Chris and can replicate only those emails where the sender is listed in directory 701 so that Chris may access all trusted email from one interface. However, in another embodiment zone 700 may be set up with a single identity that is unique such as chris@mypersonalinbox.com. In this case Chris may elect to physically "share" this identity with trusted contacts that normally send email using one of Chris's other identities by sending the contact an email where the identity is listed in the from field of the message.

If the contact chooses to use the identity but he or she is not listed in directory 701 then the firewall application might alert Chris that a non-listed contact has your identity. An option may be then presented for enabling Chris to add the sender address to directory 701. Moreover, a contact might be added virtually without giving the contact knowledge of a zone identity just for the purpose of having emails from that contact routed to the private inbox of zone 700 for viewing. In this case a special rule might be set up that directs all emails from a specific contact addressed to a generic identity (other account) to be routed to or replicated to the private inbox of my personal zone 700. This can be accomplished by equating identities. When replying to messages received from the contact the generic email interface would automatically be called up and the from address listed would be the email account address of the specific email account and not the personal identity of zone 700. There are many possibilities.

A fourth ID listed in private identities list 702 is an ad hoc identity. An ad hoc identity allows Chris to temporarily correspond with contacts through zone 700 where the contacts are not granted firewall access to a permanent zone identity. In this case, the ad hoc identity is chr123@ispend.com. This ad hoc identity allows Chris to do personal shopping, for example, from private zone 700. Chris may share the ad hoc identity with outside entities by sending them email using the identity such as when shopping. The entities receiving an email from the ad hoc identity perceive the identity to be the email address of Chris Jones and will correspond with Chris using that email address. Such entities will, temporarily, be added to private directory 701 with a constraint to the ad hoc identity (temporary contacts). At such a time when the life of the ad-hoc identity expires, the entities no longer have firewall access to Chris and are then purged or archived from directory 701. In this way, Chris may correspond with non-trusted contacts for any purpose without divulging a permanent email identity for example.

Zone 700 in this example has shared identities 704 and thus, presumably, a shared inbox. Shared identities 704 are identities that are also provided to one or more zones other than zone 700. A first listed identity in shared identities 704 is family@jones.com with an ID #760-603-8823, which may be the family telephone line accessible to anyone in the family.

This identity may be a single identity for a family zone that is, in this case shared with zone 700. All emails addressed to family@jones.com are routed to the family zone. Certain ones or all of those messages may be replicated to a shared inbox of zone 700 provided the senders of those messages are listed in shared directory 703.

joe@smith.org with ID#919-942-1792 is a family contact whose messages sent to the family ID from the contact ID are routed to the family inbox and replicated, in this case to a shared inbox of personal zone 700. In this case joe@smith.org is listed in the directory for the family zone and in directory 703 (shared across zones). A second ID listed in shared identities list 704 is a family member ID jus@jones.com. with an ID # of 760-603-8823. This ID belongs to a family member Justin, for example, and might be a single ID for Justin's inbox of his personal zone. Certain contacts sending email to Justin are replicated to a shared inbox of personal zone 700 provided those contacts are listed in directory 700.

In this case, if Joe sends an email to Justin using jus@jones.com, that message will be replicated to zone 700, perhaps in a shared inbox adapted for the purpose. In this way Chris has access to all emails sent to Justin by Joe. If Chris decides that he no longer needs to see email from Joe sent to Justin he may simply delete joe@smith.org from shared directory 703. However, it may be that Chris also corresponds with Joe regularly using the contact identity joe@smith.org. In this case, the identity joe@smith.org would be retained in private directory 701. In this way messages from Joe to Justin would not be replicated because jus@jones.com is not a private identity in list 702.

In one embodiment, all email addressed to Justin's inbox might be initially replicated to a shared inbox accessible to Chris with the sender addresses automatically added to shared directory 703. After some monitoring, Chris may delete any of the contact listings thereby flagging that contact listed in Justin's personal zone directory so that further email from that contact is not replicated. Similarly, the deleted contacts may later be reactivated to directory 703 if Chris desires to resume monitoring email messages addressed to Justin sent from the deleted contacts.

Zone policy is what determines final routing of all messages. In one embodiment telephone numbers can be similarly treated. For example, all telephone calls from Joe at 919-942-7068 can be routed to 760-603-8822 even if Joe dialed 760-603-8823, which is the family telephone. In this case a rule may exist that specifies that all calls from Joe at his office should be private and should ring the private line of Chris (8822). This can be accomplished either at the level of the network (hosted zones), or by an in-home routing application integrated with a home computer network. Telephone routing may also include computer-based telephony applications as well without departing from the spirit and scope of the present invention.

Figure 8:
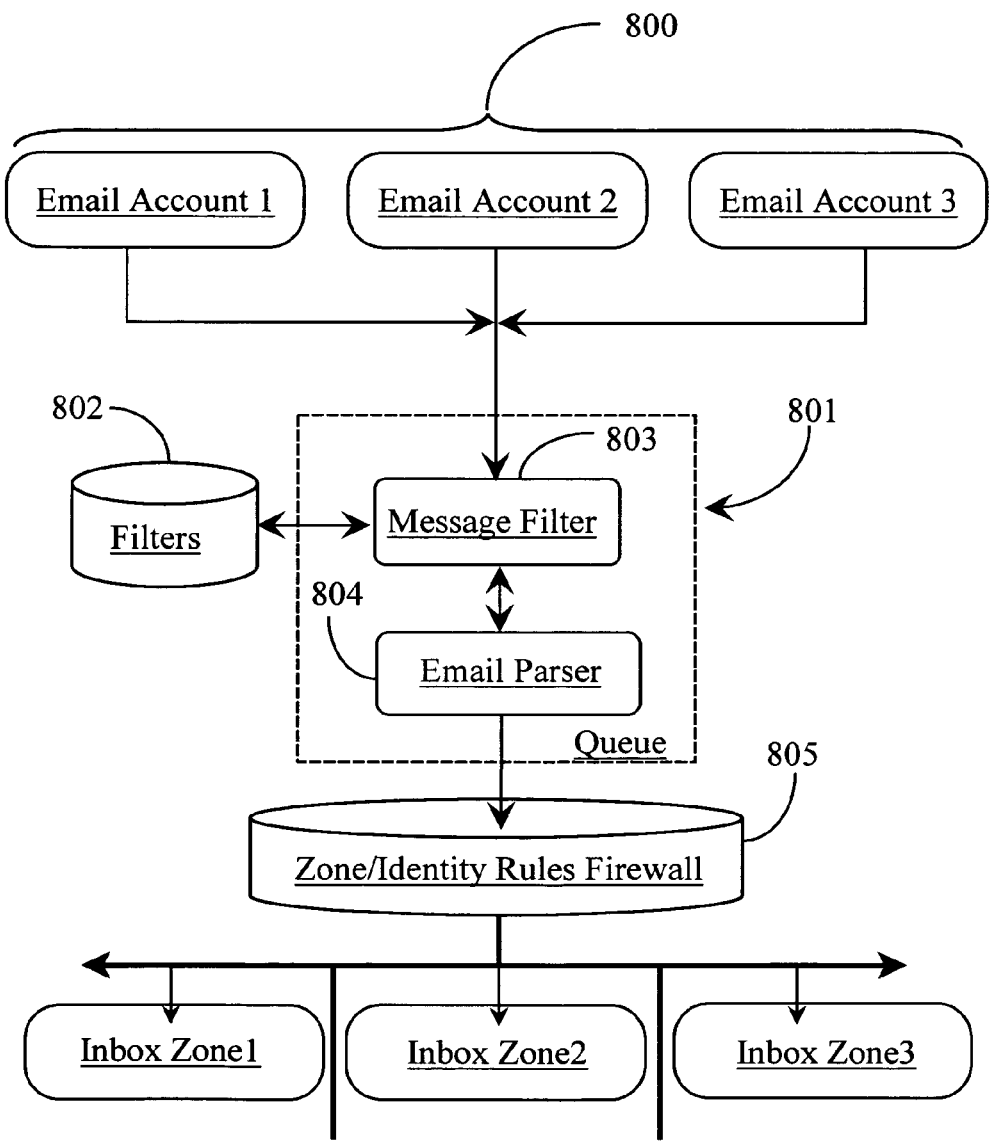
FIG. 8 is a block diagram illustrating a hosted email account firewall application according to an embodiment of the present invention.

FIG. 8 is a block diagram illustrating a hosted email account firewall application according to an embodiment of the present invention. In this example a user has three separate email accounts 800 set up according to normal protocols. These are an email account 1, an email account 2, and an email account 3. It is assumed for purpose of discussion that email accounts 1-3 have separate user email addresses associated therewith.

According to one embodiment of the present invention, activity related to all three accounts can be aggregated through a single interface using one method of the present invention in a zone-hosted embodiment.

At the bottom of this exemplary diagram there are three zone inboxes illustrated. By label, these are Inbox Zone1, Inbox Zone2, and Inbox Zone3. A user may elect that the service of the present invention intercept email from designated email servers of accounts email 1-3 wherein the senders of the intercepted emails are listed in directories of inboxes 1-3, which are zone specific. Contacts that have sent email to the user using a To: address associated with any of accounts 1-3 can be listed in any of directories associated with zones 1-3. Zones 1-3 might, in one embodiment, be adapted with any of email addresses from accounts 1-3 as user identities.

In such a case of hosted zones, the service accesses each of the email servers attributed to the user through accounts 1-3 and retrieves all email messages stored for the user that exhibit the sender identities listed as contacts in zone directories. These email messages may then be deposited in a message queue 801 provided for the user at the network service portal hosting the zones on behalf of the user.

A message filter 803 using may provide message filtering such as virus filtering and the like using a variety of known filters 802. This process may be optional in one embodiment because it might be assumed that since the user has listed the contacts in zone directories they would be those contacts that are trusted.

An email parser 804 then checks each email message for sender address (contact) and sends the information to firewall application 805. Firewall application 805 is analogous to firewall 119 described further above. Firewall application 805 may then check the sender address of a message against zone/identity rules to determine which zone inbox to route the message to. In a simplest case the rule is simply the zone that has the address listed. In this embodiment only the contacts that are listed in a specified zone directory can send messages that are redirected or replicated from email servers to the appropriate zone inboxes. In this case the user may open a zone and see all of the email from the listed contacts and can reply to those contacts from the zone inbox transparent to each contact.

In another embodiment zones 1-3 have single unique identities and do not include generic user email addresses attributed to other user accounts. In this case the user can import those trusted contacts into zone-specific directories and can send them email from a single interface containing the user identity for the zone that the user wants the contact to have firewall access to. If a contact chooses then he or she can send email directly to a granted identity address thus addressing the email server of the system, which then uses sender/identity pair matching to ensure that the email is routed to the appropriate inbox.

Firewall 805 is adapted to alert a user, for example, if a user identity has been compromised (zone policy violation alert). If a listed contact has shared a unique user identity with another user who then sends an email message to the user using the identity, the firewall alerts the user of a zone policy violation (correct user identity; non-listed contact). The user has an option of adding the non-listed contact or revoking the identity privilege of the contact that compromised the identity if that contact can be identified from a list of one or more contacts that had firewall access to the compromised identity. Email history might be useful in identifying such a contact. For example, the non-listed contact might be a CC or BCC of a message previously sent to the user from the contact that compromised the identity. Another option might be to simply blacklist the non-listed contact for future reference. Still another option might be to create an ad hoc identity and reply to the non-listed contact using the identity informing the contact that the old address is being replaced with a new one.

In this case the non-listed contact may adopt the new email identity, which can be revoked at a later time.

In a preferred embodiment only trusted contacts have firewall access to any of the user's resident zone identities for email or other correspondence. In this respect all specific zone email identities are paired to email contacts that are granted firewall access to them. Firewall protections ensure that no messages are improperly routed. Outgoing messaging is also protected by firewall 805 in a preferred example. Zone identities in the case of email for example are all associated with a single email account that is useable with all of the created zone identities. A user can work from within a zone to send and receive email where the contact list is specific to that zone. A user may also work outside of a zone initially when sending email, however if the user types a contact or selects on from a contact list, the action by default causes zone identification by some graphic indication such as the appearance of a zone-specific icon or skin in the interfaces the user is working with.

Figure 9:
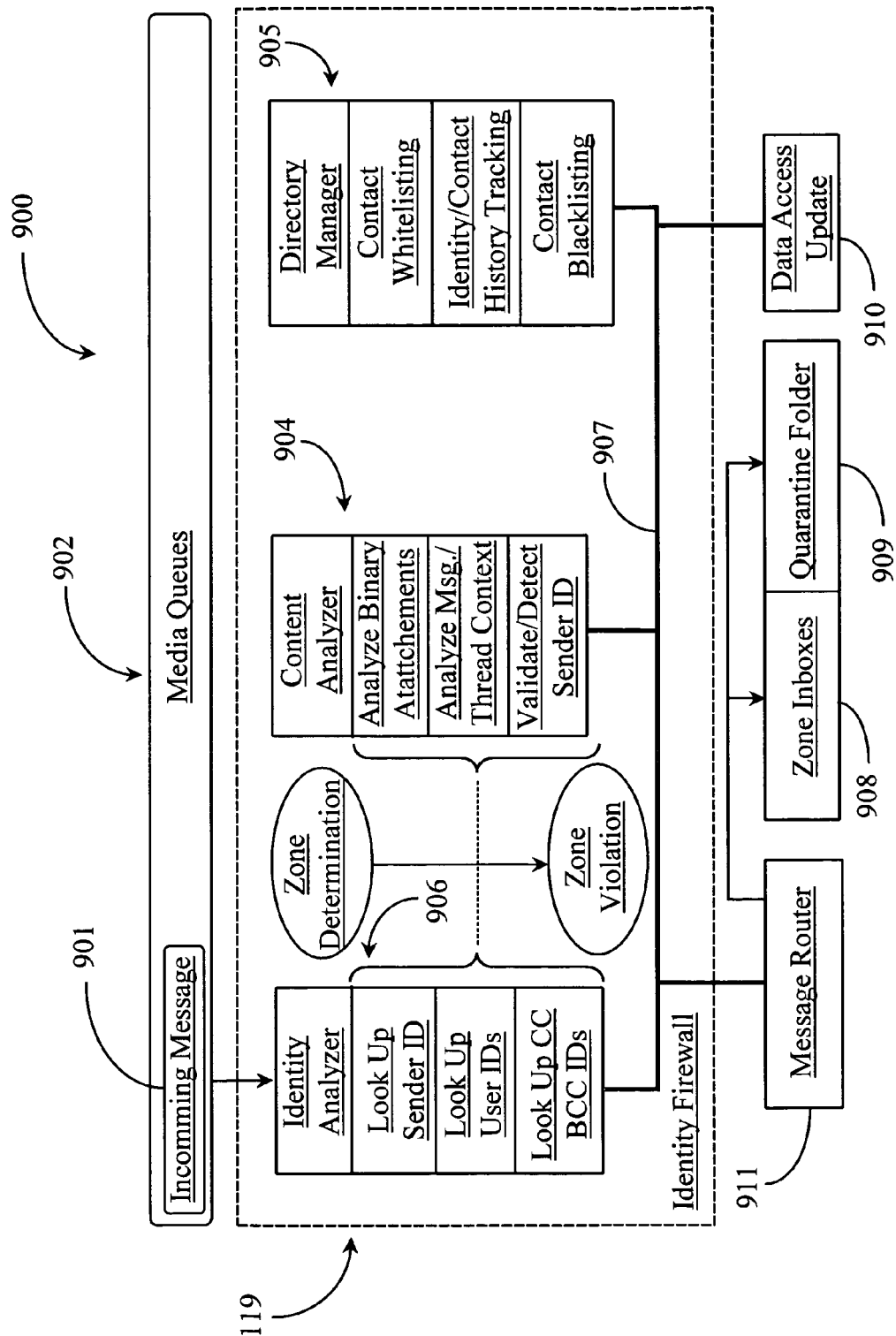
FIG. 9 is a block diagram 900 illustrating components and function of an identity oriented firewall application 119 according to an embodiment of the present invention.

FIG. 9 is a block diagram 900 illustrating components and function of an identity oriented firewall application 119 according to an embodiment of the present invention. In a preferred embodiment of the present invention, IO firewall 119 controls interaction flow in both zone-hosted and non-zone-hosted embodiments.

In this example, a plurality of interaction or media queues 902 are provided to queue incoming interactions. Queues 902 can include, but are not limited to an email queue, a voice mail queue, a newsletter queue, a telephony queue, a presence queue (IM etc.) and so on. A media handler (not illustrated) may be provided, in one embodiment, for each distinctly different type of media supported by the system. A media handler may be adapted to recognize any supported interaction of media type and to ensure that the correct media type enters the correct queue type according to zone policies enforced by firewall 119.

In one embodiment of the present invention, queues 902 can be implemented with a single interaction queue that sorts and prioritizes all incoming interactions. In a live embodiment where a user is connected for communication, queues can be adapted to queue live calls waiting and so on.

Firewall 119 is the main application between any sender of a media interaction and the final user destinations for the interactions whether they are live interactions or queued messages or the like. Firewall 119, in this example, has an identity analyzer 906, a content analyzer 904, and a directory manager 905. An incoming message 901 is illustrated waiting to be processed in queue(s) 902.

Identity analyzer 906 is a software component that attempts to determine the identities associated with any incoming or outgoing message. For example, identity analyzer begins processing an incoming message by looking up the sender identity or ID of the entity responsible for sending the interaction. Identity analyzer also looks up the user identity, which is the destination ID for message 901. In many instances all of the information required for firewall 119 to successfully route message 901 might be determined by identity analyzer 906. However, content analyzer 904 can be consulted in an event that more information is required to successfully route message 901.

In an example of email, message 901 should have a sender ID and a user ID (destination of message). The unique sender ID and user ID combination may define a specific zone inbox, illustrated herein as inboxes 908, as an appropriate destination for message 901. In this case the user ID is the zone-specific ID and the sender ID is listed in the approved contact list in the particular directory for that zone. Firewall 119 determines which zone or zones is appropriate for message routing and determines if there are any zone violations.

If the sender ID is not correct for the user ID found in message 901, for example, then firewall 119 attempts to further analyze message 901 before triggering a zone policy alert, or an outright zone violation. One additional step is to check CC and BCC identities in the message. If these identities are listed as approved contacts for a particular zone, then a zone policy alert (short of a violation alert) may be sent to the user asking the user for permission to ad the new sender to the contact list for the zone. In this case, the new sender was given the user's identity either directly or indirectly and the user is asked to arbitrate routing of the message. If the user is not available then the message may be filed, after a period of time into a quarantine folder of the inbox. Likewise, if a sender approved as a contact for a particular zone, but uses a user ID of another zone firewall 119 attempts to resolve the issue by checking if the user is a contact in the other zone. If not, then there may be a zone policy alert. It is noted herein that a fact of a sender being listed as a contact for a particular zone may by default enable routing of the message to the zone if there are no other possibilities.

In one embodiment message 901 may have more than one user ID listed as a destination. In this case, firewall 119 will check sender ID against zone directories of each zone and if found in a particular zone directory then that zone receives the message. It is important to note herein that in some cases with some media types may result in no detectable sender ID such as a blocked telephone number. However, a user ID for a zone might include a telephone number with a unique extension identifying the zone. In any case, a user ID parameter must be present in order for a message to reach queue(s) 902 to be processed for further routing.

If for some reason zone policy cannot be determined because identity analyzer 906 cannot determine sender ID, then content analyzer 904 may be called to help determine origin of the message. For example, a reply related to an ongoing communication between several parties might be allowed if through content analyzing, it is determined that the message belongs to a particular message thread specific to a particular user zone and the user wishes to accept all content generated by the thread.

In one embodiment where binary attachments are involved such as those that might be taken from a binary news server then content analyzer can be called on to verify content of the attached file as content that the user is interested in or has subscribed to. In this case, a zone violation might occur if a content poster identity is found in a zone directory as an approved contact but the content does not fit an approved profile of content allowed for download. It might be that a malicious user has compromised the poster's identity and is attempting, disguised as the legitimate poster, to post undesirable material. In a case where a user might download content of any kind, content analyzer might be called by default to verify content against a content profile accepted by the user for a particular zone.

In some cases, a contact might be detected and/or validated as legitimate for a zone according to content analyzing. For example, if a contact is not listed for a particular user zone according to use of user ID, but the content analysis shows that the attachment could only have come from the approved contact then the correct contact information for the specific zone can be implied beyond reasonable doubt. Encryption keys, digital signatures, and other forms of validation can be associated with a particular contact so that if the contact uses an unlisted or otherwise unknown parameter, the contact may still be determined and validated.

In a preferred embodiment of the present invention, content analyzer 904 functions as a back-up component to identity analyzer 906. However, in some embodiments, content analyzer 904 is called by requirement where binary attachments are concerned such as to verify legitimacy of a contact listed as a news group contact, for example.

In this example, directory manager 905 controls contact whitelisting, contact blacklisting, and manages identity contact history tracking. For example, new identified contacts that have been validated for a zone, but not previously listed in a zone contact directory can be added to a zone directory and provided as a whitelisted contact. Similarly, contacts found to have compromised a zone identity or found to be responsible for undesirable content can be deleted from zone directories and added to a blacklist.

Identity analyzer 906, content analyzer 904, and directory manager 905 are connected in this example by a logical bus structure 907. A message router 911 represents routing function for all interaction. Router 911 represents final destination routing caused by firewall 119, more particularly zone determination and inbox specification. It is noted herein that router 911 may represent different routing applications according to various embodiments. For example, in a zone-hosted environment there my be one or more physical routers involved in interaction routing depending on design and media types supported. In a non-hosted environment like, for example, a desktop implementation, routing applications normally in use or set-up for a specific media type may be supported. In all cases however, final zone and inbox sorting is enforced by firewall application 119.

In practice of the present invention message flow generally follows a path beginning with identity analysis then content analysis (if required) followed by directory management (if ordered). Messages that are zone policy violations, including spam and other rejected messages may be sorted accordingly. In this example, each zone has a quarantine folder 909 provided therein and adapted to receive messages that otherwise cannot be successfully filed according to zone policy. A data access and update module enables a user, through an interface, to view and edit current zone policy and to add any explicit zone policy rules that may be created to override certain policy issues.

One with skill in the art will recognize that in the case of firewall 119 identities that make up contact or sender information and user or zone-specific information will take the form of normal contact parameters of the media types supported. Email identities will be of the form of email addresses for example while telephone identities will be in the form of a telephone number. All routable media types can utilize zone specific variations for user identities and in the case of a peer using the software of the present invention, sender identities (contact identities from the user perspective) may be as varied as user identities further aiding in identity pair management.

Figure 10:
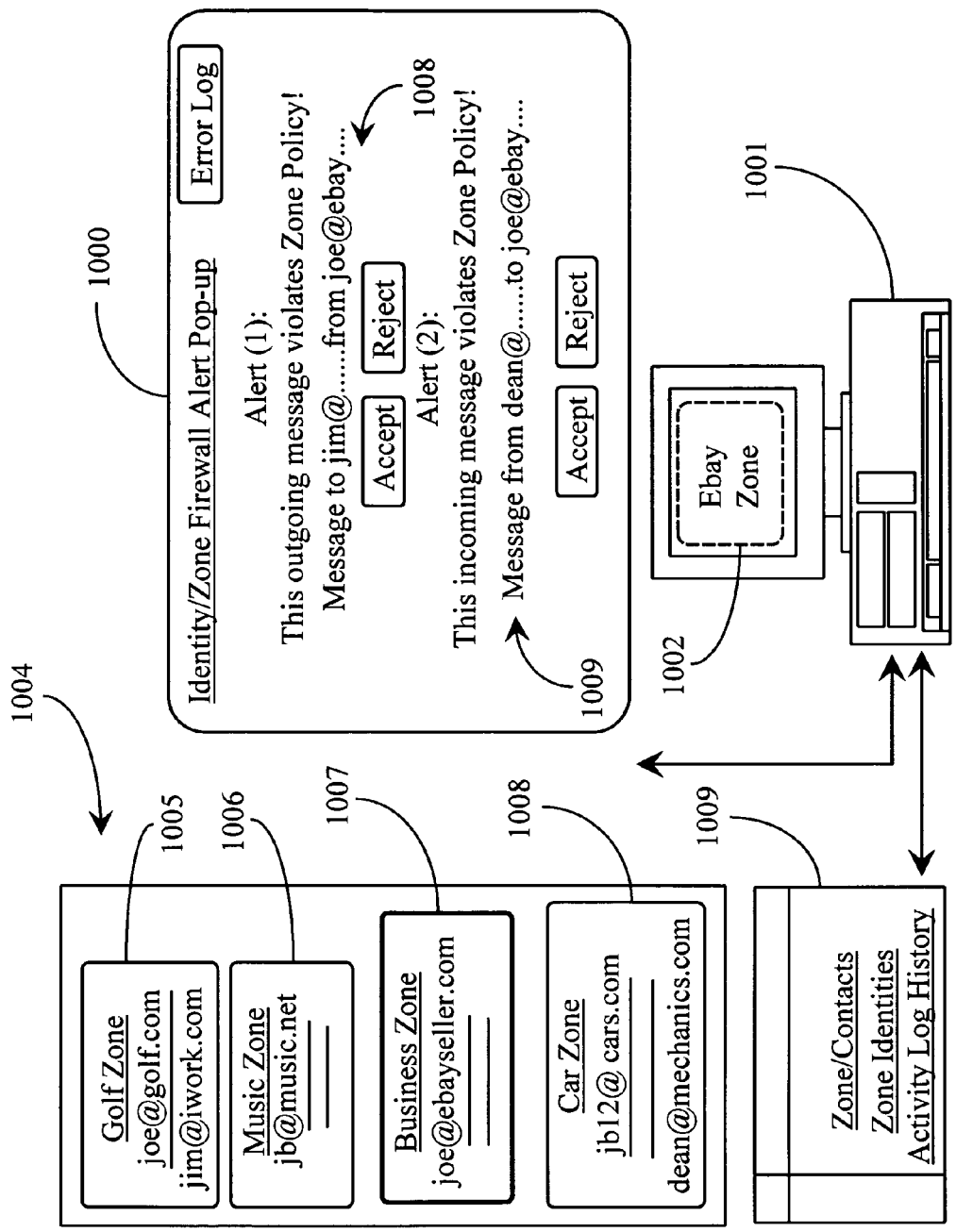
FIG. 10 is a block diagram illustrating firewall alert features according to an embodiment of the present invention.

FIG. 10 is a block diagram illustrating firewall alert features according to an embodiment of the present invention. A user 1001 (computer icon) may accept messages in a zone-specific manner and may send messages in a zone-specific manner according to identity oriented zone policy enforced by firewall.

In this example, user 1001 is working from within an exemplary zone 1002 labeled Ebay, which for discussion purposes has an email identity of joe@ebayseller.com. In this example, email is one of communication media types supported and sender/user Ids are of the form of email parameters.

A collection of exemplary zones 1004 belonging to user 1001 is illustrated at left in the diagram and contains a golf zone 1005, a music zone 1006, a business zone (Ebay) 1007, and a car zone 1008. User 1001 has contact directories for each zone and identities for each zone. Business zone 1007 is the zone currently being used. This example is of a desktop implementation of the software of the invention that is not zone-hosted.

A data store 1009 is provided to contain all of the actual zone data and activity history. Data store 1009 can be provided in dedicated fashion from memory resources generic to the computer of user 1001. The data may be provided, for example, as a dedicated portion of the user's hard drive. In this case, firewall implementation is on the computer. In another embodiment the firewall application and data may be hosted on an appliance or peripheral, perhaps a physical router and may not be present on a PC.

Each of the zones owned by user 1001 has a user identity, which is some form of joe i.e. joe, jb etc. A user identity for a zone may be permanent (lasting the life of the zone) or temporary as in an ad hoc identity. For example a user identity for golf zone 1005 might be joe@golf.com. A user identity for music zone 1006 might be jb@music.net. The identity for business zone is joe@ebayseller.com as described above. The identity for zone 1008 might be j12@cars.com. These identities are one that user 1001 is willing to share with certain contacts on a permanent or, in the case of ad hoc, temporary basis.

A pop-up alert 1000 represents an identity/zone firewall alert pop-up that may be sent to alert user 1001 of any violations. Pop-up alert 1000 may be displayed at any time of need or convenience on the display of user 1001. In this case, pop-up alert 1000 contains more than one alert for discussion purposes. Typically one alert may only contain reference to a single violation of zone policy.

Because user 1001 is working from within zone interface 1002 (email) of zone 1007, his interface has some graphic representation of the specific selected zone. Alert 100—contains two alerts illustrated. These are an outgoing message alert 1008 and an incoming message alert 1009. Alert 1008 (also labeled alert 1) reads that a message user 1001 is attempting to send violates zone policy. This may be because the user is attempting to send email to a contact not listed in a directory. The firewall breach is based on a non-listed contact. More particularly, joe@ebayseller.com has attempted to send an email to someone that is not listed in a directory of zone 1007. Pop-up 1000 can immediately be generated because the system knows that Joe is already working within zone 1007.

In this case Joe sends a message to a contact jim@iwork.com, which is not listed in a directory for business zone 1007. Before the email message is queued for send, alert 1008 is displayed and has an option of accepting the email as addressed or rejecting the email and re-selecting a proper contact or zone for emailing the message. If user 1001 accepts the message as addressed then jim@iwork.com might be added to a directory specific to business zone 1007 for future reference.

If user 1001 rejects the message as written then further options are provided accordingly. For example, user 1001 may have intended that Jim is the correct recipient. In this case preserving Jim as the contact in the message may cause the interface to change graphically to represent golf zone 1005 listing Jim as a contact. If golf zone and one other zone list Jim as a contact using he same email identity then a zone list may be presented so that user 1001 may select the appropriate zone, hence user identity for the message.

Zone alert 1009 also labeled alert 2 reflects an incoming message violation where a message is received from dean@mechanics.com that is addressed to joe@ebayseller.com. The violation here is that Dean is not listed in a directory for business zone 1007. User 1001 may arbitrate the violation by adding Dean to a contact directory for business zone 1007 or the message can be rejected.

If the offending message is rejected in this case, a problem still remains as to how the contact dean@mechanics.com became aware of the user identity joe@ebayseller.com. CC or BCC records on any activity history conducted with the address dean@mechanics.com through zone 1008 may shed some light if a contact found in CC or BCC records is one that is also listed in the directory of business zone 1007. It is possible that the contact may have shared the user identity information with the owner of dean@mechanics.com. One option is to send an email to dean@mechanics.com directing the recipient not to use the identity or be blacklisted from all zones. Also, the contact identified as a possible source for the identity leak can be contacted and if uncooperative, blacklisted. In case the contact that compromised the user's Ebay identity cannot be distinguished from other contacts listed in business zone 1007 using communication history records, then the user still has an option of changing the identity for the zone.

In all embodiments of the present invention, a contact cannot reach a user through any zone wherein the contact identity used in the media type to gain firewall access is not listed in a contact directory of the zone. Other than explicit rule such as for example "replicate all messages from user@abc.net to all inboxes", firewall 119 adheres to implicit identity rules existing according to current zone directories and identities.

It is noted herein that contacts using shared identities reach user facilities like email servers and the like directly. However contacts that do not have firewall access to zone identities may still have their communications routed according to contact listing in zone directories if such communication is intercepted by ordered forwarding or by password protected third party access as in the case of generic email accounts. In a zone-hosted embodiment, all communications to any user-related identity of any supported media type can be zone managed.

Figure 11:
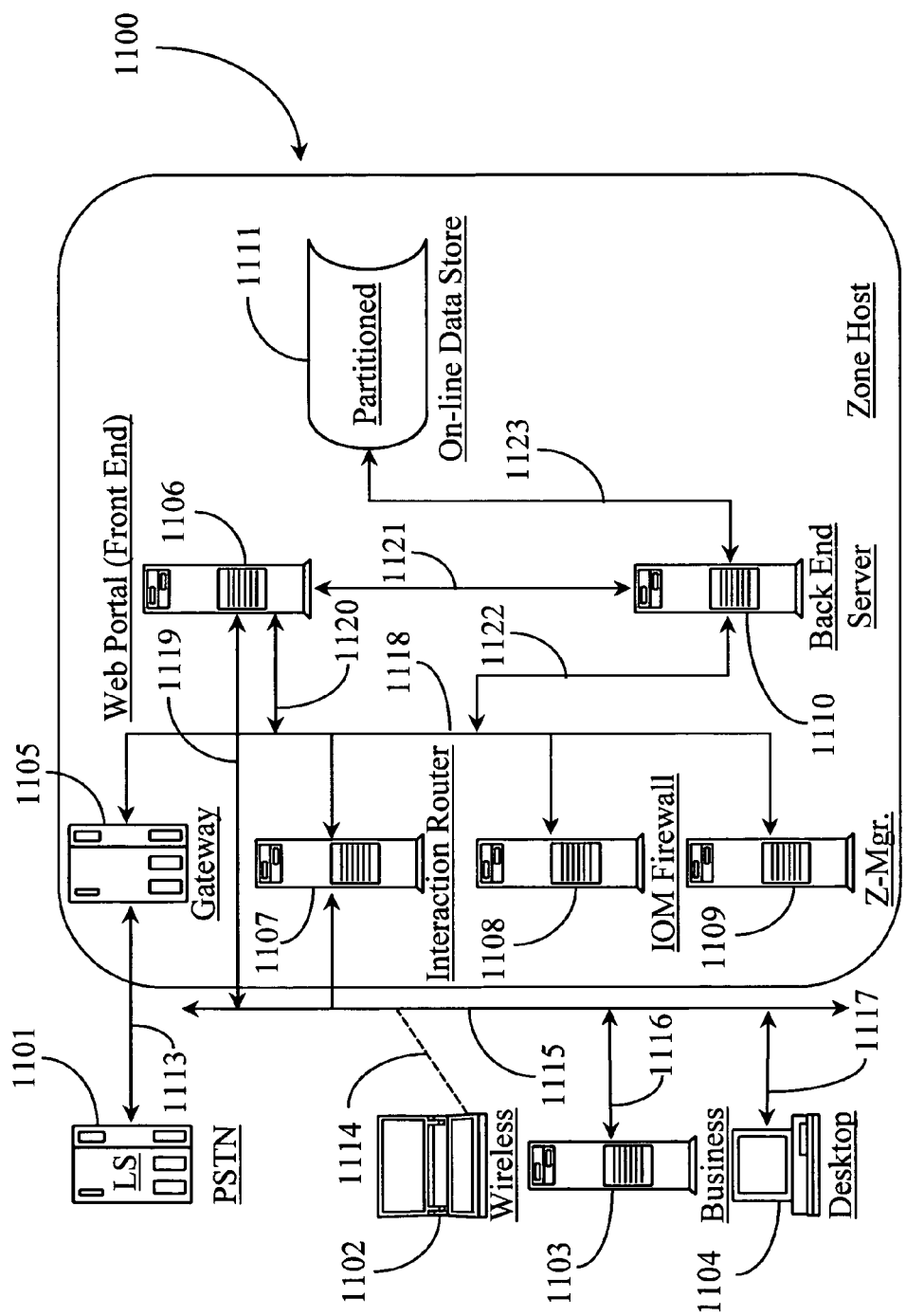
FIG. 11 is an architectural overview of a Web-based service adapted for third-party zone hosting according to an embodiment of the present invention.

FIG. 11 is an architectural overview of a Web-based service adapted for third-party zone hosting according to an embodiment of the present invention. A zone-hosting service party 1100 is illustrated in this example as a service organization that can provide third-party interaction routing, and zone management services for users on a private level or on a business level. Service provider 1100 is analogous to zone host 103 described with reference to FIG. 1 of this specification. In this example, exemplary internal equipment and exemplary connection equipment types are illustrated to show separated function.

A PSTN switch 1101 is illustrated in this example and represents any telephony switch within the PSTN network local to party 1100. The presence of telephony switch 1101 illustrates that clients may access third-party services offered by zone-host 1100 through the PSTN network and a gateway 1105 by way of a telephony trunk 1113. Gateway 1105 can be an SS-7 gateway or any other known gateway adapted to bridge telephone calls between telephone and data-packet networks. Gateway 1105 may be maintained, in one embodiment by the enterprise hosting zone services. In another embodiment, gateway 1105 is leased from a telephony service company or a network provider. PSTN switch 1101 may also direct incoming voice calls destined to clients that subscribe to zone-host services.

A laptop computer icon 1102 is illustrated in this example and represents client capability for accessing services through a wireless connection 1114 and an Internet or other WAN backbone 1115. Icon 1102 represents a wireless computer in this example, but may also represent a wireless cellular telephone capable of network browsing or any other network-capable wireless device.

A business server 1103 is illustrated in this example and represents any business-to-business (B2B) server. Server 1103 may access zone host 1100 over a network access line 1116 and network backbone 1115. Server 1103 can be an automated system that accesses zone host periodically or one that maintains a session-connected state with zone-host 1100 over a period of time. Zone host 1100 may manage interaction routing and zone management services for many individuals of a business that maintains one or more servers 1103 that enable identity-managed access and, in some cases live session interaction between clients and associates of the business and the business itself using zone host 1100 as a proxy interaction routing and zone-management entity. B2B server 1103 may also be a business-to-client (B2C) server or a client-to-client (C2C) server such as a community portal application practicing presence protocols without departing from the spirit and scope of the present invention.

A computer desktop icon 1104 is illustrated in this example and represents individual client access to zone host 1100 through a network-access line 1117 and network backbone 1115. Desktop computer 1104 represents any client or client group accessing services provided by zone host 1100 through network access methods such as digital subscriber network (DSL), dial-up methods, or other known network access methods using dedicated or shared physical lines.

Zone host 1100 maintains at least one web portal 1106 through which services may be accessed. Web portal 1106 presents client information according to zone policy enforced by IOM firewall application 1108 represented in the form of a server in this example. Portal 1106, in a preferred embodiment, is a server which may be adapted for HTML, WML, and other data presentation protocols enabling display and data access to clients operating user interfaces adapted for the purpose according to method, equipment type, and protocols used by the client.

Zone host 1100 has an interaction router 1107 adapted for the purpose of routing incoming interactions according to zone policy enforced by IOM firewall application 1108. Router 1107 is illustrated logically as a standalone piece of equipment in this example however in actual practice routing applications may be provided as dedicated applications serving specific media types and may be distributed over more than one physical node. For example, a router may be provided and dedicated to incoming email in the form of a mail service. Another routing application may be provided and dedicated to route telephony calls. VoIP calls may be handled by yet another routing application. The inventor illustrates router 1107 as a dedicated node for purpose of clearly separating and explaining routing function from other functions enabled within host 1100.

IOM firewall 1108 enforces all identity oriented routing and sorting of messages and in some embodiments, live sessions according to zone policy. A zone manager application 1109 is logically illustrated herein and is adapted to provide zone and identity creation and management services.

Portal 1106 is, in this example, connected to a back-end data server 1110 by way of a high-speed data connection

1121. Server 1110 is adapted to maintain and serve data relating to interaction and communication activity recorded for clients of host 1100. Data server 1110 has access to an on-line data store 1111 that is partitioned according to existing clients of host 1100. In one embodiment, data store 1111 is internal to server 1110 and maintains the actual data relating to communication activity for clients. In one embodiment, the functions of data store 1111, back-end server 1110 and portal 1106 are hosted in a single node. In another embodiment there may be more than one portal server as well as more than one back-end data server 1110 and data store 1111.

It is noted herein that the illustrated equipment types of this example are logical implementations only and should not be construed as requirements in form or function for the practice of the present invention. For example, data service, portal services, interaction routing, IOM firewall protection, zone management services, and network gateway services may all be implemented in one or more than one machine in a variety of combinations without departing from the spirit and scope of the present invention.

In practice of the present invention according to one embodiment, clients represented by network-capable devices such as wireless device 1102, and desktop device 1104 have direct network access to portal server 1106 by way of backbone 1115 and server access line 1119. In a preferred embodiment server 1106 is a Web portal and the operating network is the Internet network. In this case, a client operating a device such as laptop 1102 forges a wireless connection to the Internet, for example, through a wireless ISP and navigates to server 1106 and further to a particular presentation page maintained for the particular client and accessible through normal Internet address protocols such as URL and URI protocols.

Once client 1102 is in session with server 1106, he or she may access and view messages and other communiqués that have occurred since the last time the client logged into the service. A client represented by desktop computer 1104 also has direct access to portal 1106 through UI function and network navigation although in a tethered (wired) embodiment. Clients operating wireless devices and tethered devices can, in one embodiment, conduct live interactive sessions such as telephony or VoIP sessions through portal 1106 during a period of time when they are connected in session with portal 1106.

Business server 1103 may connected to portal 1106 using an automated interface adapted to automatically update messages and other activity for multiple clients whose zone structures are represented both in server 1103 and in data store 1111. In one embodiment a separate portal function may be provided and specially adapted to communicate with server 1103 using a machine-readable mark-up language like an XML-based language. In this same embodiment, live interaction may be conducted as well.

Zone host 1100 receives incoming messages and, in some embodiments, live voice calls on behalf of subscribed clients and routes all of those incoming communiqués based on zone policy set up for the subscribed clients. For example, incoming voice calls may arrive at host 1100 through gateway 1105 from anywhere in the PSTN network. Interaction router 1107 treats each voice call according to zone policy enforced by IOM firewall application 1108. Router 1107 has a logical network connection to firewall application 1108 by way of internal data network 1118 in this example.

Router 1107 consults firewall application 1108 for each incoming communiqué. Firewall application 1108 is responsible for determining identities of the incoming communiqués, more particularly the senders ID (calling party) and the destination ID (receiving party). For asynchronous calls (voice messages) that are not part of live two-way communication between parties, router 1107 routes the messages to back-end server 1110 where they may be queued in the appropriate inboxes (voice message boxes) of the identified clients according to current zone policy of the client.

Subscribers may periodically access portal server 1106 to check their voice messages and to download them to their devices. In typical fashion a client would login to server 1106 and provide authentication. After providing authentication, a portal interfacing Web page is presented to the client. The Web page has at least summary information of current and past activity conducted on behalf of the client including indication of whether voice messages are present and what zones and inboxes any existing messages belong to. The client may sample voice messages by browsing zone architecture presented in a navigable tree or by short-cut navigation to the inboxes identified as containing new messages. The client may then download all or selected voice messages to his or her duplicate zone architecture contained on his or her access device. Downloading voice messages is conducted according to current zone policy, which may include replication orders for replicating certain selected messages to particular inboxes or other folders contained on the user's device or to a folder on a selected other device connected to a network that also includes the user's device. A zone manager (Z-Mgr.) 1109 may enforce replication using a message replication application similar in function to application 202 described with reference to FIG. 2.

It is noted herein that an inbox or folder designated to receive a replicated message does not require representation by zone architecture for the client at the server side. All that is required is that the server knows the destination of the designated folder on the user device, which can be made known in a download request. When a user requests download of voice messages for example, portal server 1106 retrieves the appropriate data from server 1110 over data link 1121.

In one embodiment, a client may access portal 1106 from a PSTN-based telephone through gateway 1105. In this case gateway 1105 functions as a proxy interfacing node holding the live call and interfacing with portal 1106 over a special data link 1120 provided for the purpose. IVR technology may be used to provide a client with means for accessing specific information. Client identities for voice may include telephone extensions that vary for each zone. For wireless cellular clients, wireless markup language (WML) and other wireless data presentation languages can be used.

In one embodiment voice sessions may be conducted between clients and callers wherein the calls are routed live through portal 1106. In this case an incoming voice calls at gateway 1105 may be routed according to identity information to a telephony application operated by a subscribing client. The calls are firewall protected, as are voice messages and identities for the client may include Enum identities assigned to client voice applications or telephony peripherals. In the case of routed live sessions Portal 1106 functions as a call bridge and establishes the call connection between the caller and the client's accessing device.

Email, news letters and other message types including voice messages and live voice sessions may arrive at zone host 1100 from any network-capable device connected to network backbone 1115. Interaction router 1107 routes each message type according to zone policy enforced by firewall application 1108 as with all other communication. Messages are accessible through portal 1106 according to zone policy and live sessions may also be conducted as previously described.

One with skill in the art will recognize that router 1107 is represented logically in this example. In one embodiment there are separate media handlers for each supported media type. The media handlers in such an embodiment are dedicated handlers that are responsible for identifying particular media types of communiqués incoming and for directing routing of those using the appropriate routing applications.

Zone manager 1109 enables clients to construct and organize zones and in some cases to create user identities for the constructed zones. In one embodiment, a separate identity creation service is provided for the purpose of creating user identities for zones and any ad hoc identities for outgoing communications. A user may access a zone management Web form or page from portal server 1106. In one embodiment, zone manager 1109 is accessible without requiring portal connection. In such an embodiment, all modifications and additions of zone architecture parameters can be updated directly from server 1109 to server 1110.

In one embodiment, all incoming and outgoing communication between a client of host 1100 and other parties is routed through zone host 1100. In another embodiment clients may select a level of zone hosting that may provide routing services for only incoming communication. In still other embodiments some of client zone architecture may be serviced and managed while some of the same zone architecture is not hosted.

In this particular example of zone hosting, router application 1107 is essentially dumb meaning that it cannot enforce complex identity oriented policy across one or more media types. Firewall application 1108 outputs routing instruction to router 1107 whichever media type is involved. Primarily, firewall application 1108 is concerned with identities and how they interpolate with zone policy. However as described with reference to FIG. 9 above application 1108 can also analyze attachments, message threads, and may also check email CC and BCC identities and identities included in other recipient list types that may apply to other broadcast-capable mediums like RSS and IM.

It will be apparent to one with skill in the art that identity oriented messaging and live interaction may involve several media types supported by a particular clients with multiple identities used for each of those supported media types. In a business environment a server such as server 1103 can be adapted to retrieve messaging for multiple clients having multiple zone structures and identities. Live interaction routing is possible in both business and single user embodiments. In a preferred embodiment of the present invention zone hosting can be applied to one or more zones that are part of client zone structure and can support one, a combination of, or all of the media types and protocols described with reference to FIG. 1.

Figure 12:
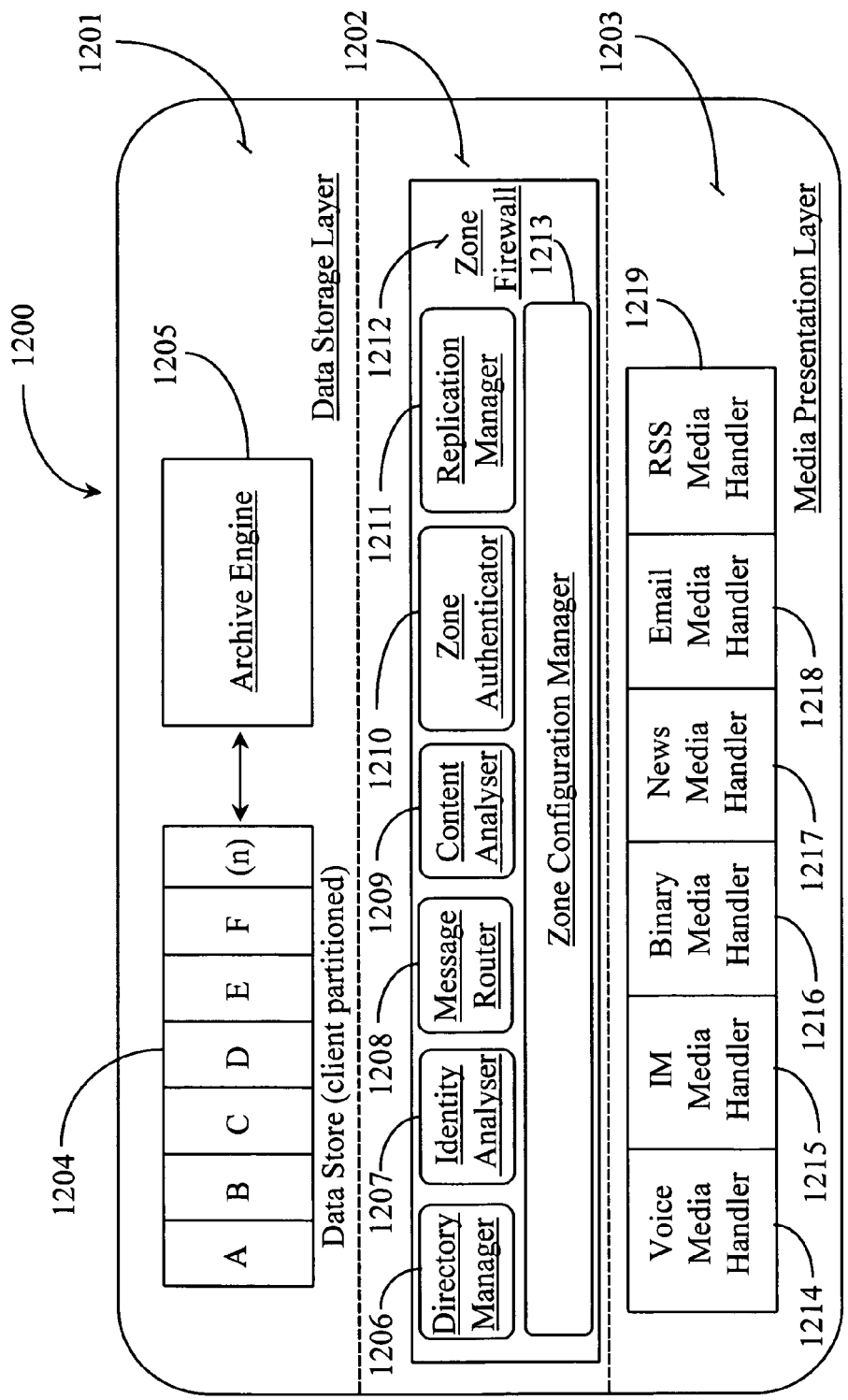
FIG. 12 is a block diagram illustrating software layers and components according to one embodiment of the present invention.

FIG. 12 is a block diagram illustrating software layers and components according to one embodiment of the present invention. In this embodiment software 1200 is illustrated in three basic software layers. These are a data storage layer 1201, a zone firewall layer 1202, and a media presentation layer 1203.

Data storage layer 1201 has a data store 1204 partitioned for clients A-(n) and an archive engine 1205 for compiling old history data for clients and storing them in an organized fashion for later access if necessary. Layer 1201 is responsible for maintenance and service of activity data for clients of the IOM service.

Layer 1202 is responsible for establishment and maintenance of zone architecture and message replication as well as identity oriented management of communication. In addition to IOM services layer 1202 also manages contact directories, white listing, black listing, and communication history tracking. In this embodiment, zone configuration manager 1213 is included in the domain of firewall application 1212. Also included within the domain of firewall application 1212 is the replication manager 1211. Firewall 1212 has, in addition, a directory management function 1206, an identity analyzing function 1207, a message routing function 1208, a content analyzing function 1209, and a zone authenticator 1210.

Media presentation layer 1203 is responsible for presenting media to client subscribers upon request and may in one embodiment serve as interceptors of messages incoming for processing. In this regard a plurality of dedicated media handlers work to identify communication that is incoming and to identify communiqués stored on behalf of any client. Media handlers provided in this example include but are not limited to a voice handler 1214, an IM handler 1215, a binary handler 1216, a news handler 1217, an email handler 1218, and an RSS feed handler 1219. As constructed in this example, application 1200 can be implemented on a single machine such as a desktop computer. In a desktop embodiment, presentation layer 1203 provides one or more UI views of activity conducted by a client according to zone policies. In a server-side hosting embodiment, layer 1203 presents a portal interface (Web page) for each subscribing client or client group.

It will be apparent to one with skill in the art that software 1200 can be provided in various configurations including some or all of the described components without departing from the spirit and scope of the present invention. Moreover, software 1200 can be implemented on a single machine or it can be distributed over more than one machine without departing from the spirit and scope of the present invention. Likewise, software 1200 may be provided as a desktop application that may vary in design and implementation from a server-based version used in a zone-hosting embodiment.

Figure 13:
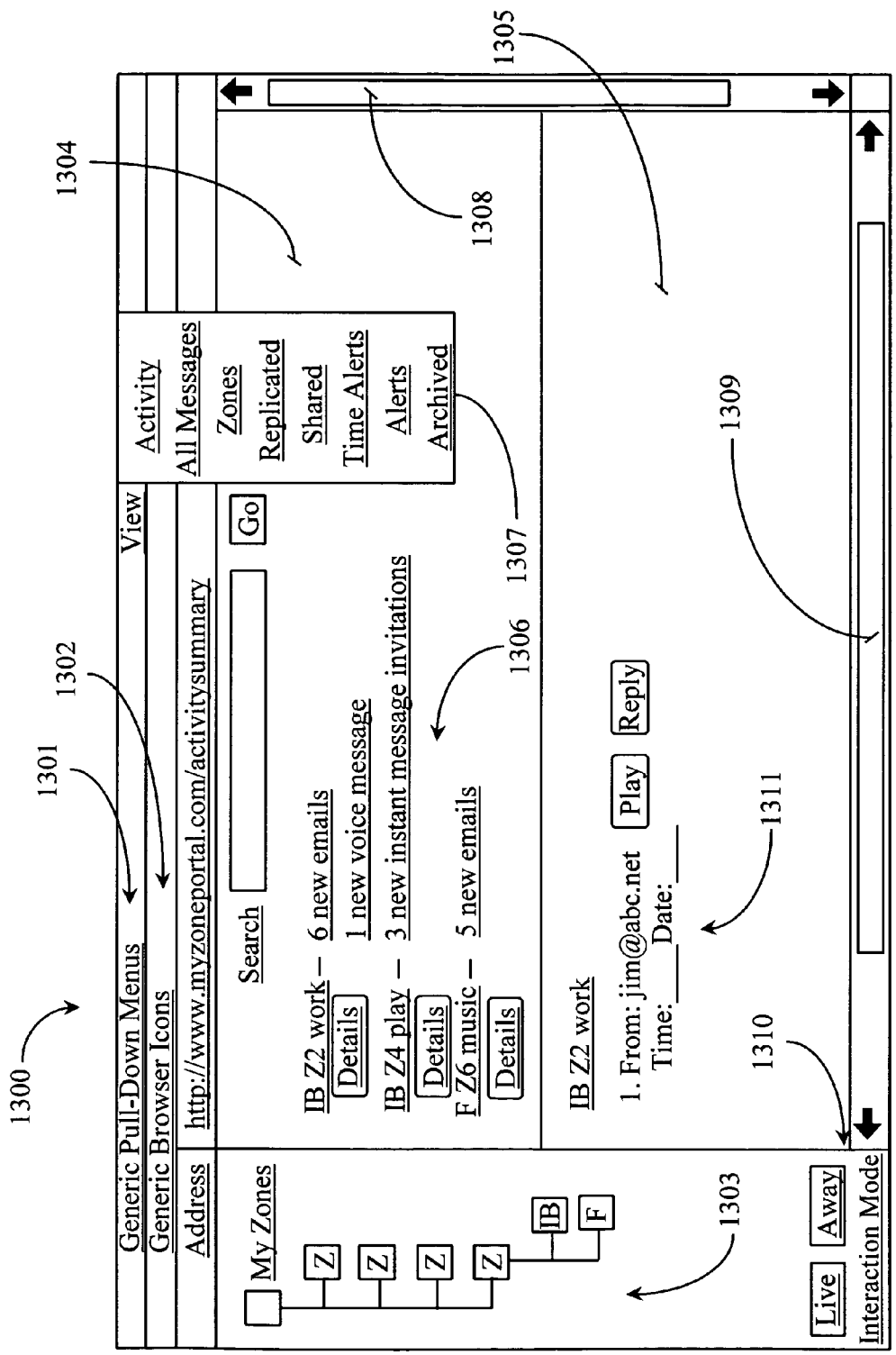
FIG. 13 is a block diagram illustrating portal interface functionality according to an embodiment of the present invention.

FIG. 13 is a block diagram illustrating portal interface functionality according to an embodiment of the present invention. A portal interface page 1300 is logically illustrated in this example to show exemplary functions that are provided to clients of a zone hosting service according to a preferred embodiment of the present invention. Interface 1300 is personalized to particular subscribed clients having access to it. Interface 1300 enables IOM management and may be provided according to several known markup language formats used to enable access and manipulation of data through various possible access devices. Some examples include the HTML-based formats and wireless access protocols (WAP) including WML.

In this example, interface 1300 is in the form of a browser frame supporting all of the generic browser pull-down menus 1301 and all of the generic browser icons 1302. Like all browser frame architectures, there is an Internet or network navigation address window or bar, which in this example reads http://www.myzoneportal.com/activitysummary illustrating the personal nature of the Web page to a client. Portal interface 1300 may be preceded in delivery to a client by an appropriate login page or procedure.

Interface or portal page 1300 has a zone navigation tree 1303 provided in a hierarchical format familiar to most operating systems. Tree 1303 enables direct navigation to inboxes and folders that may be associated with user zones that are established for the client. At the top of tree 1303 is an icon labeled My Zones. Activating this icon such as by mouse over or mouse click reveals zones, labeled Z in this example. By selecting a desired zone, inboxes (IB) and listed folders (F) are revealed.

Interface 1300 has a viewable workspace 1304 adapted, in this example, to display new activity that has occurred across all zones since the last user login. Workspace 1304 has a familiar search input window typically provided by a third-party search engine. When online a user may search the Web or prevailing network through this interface. Activity summary information 1306 is, in this example, displayed for view within workspace 1304. Activity 1306 represents a summary of all of the activity across hosted zones that has occurred since the last user login was performed as was stated above.

In this example it is shown that the current client has 6 new emails in an IB for zone 2 (Z2), which is a work zone in this case. There is also one voice message queued for the client in the same inbox. A selectable icon labeled Details is provided and associated with the information for zone 2 so that a client may immediately call up the details and any function for viewing and downloading messages.

In this example, further activity 1306 is displayed and associated to a zone 4 (Z4), which is a play zone. There are 3 new instant message invitations waiting in an IB associated with Z4. Also displayed are 5 new emails that were deposited in a folder associated to a zone 6 (Z6), which is a music zone in this example. Activity summary information 1306 can be configured to list all new activity that has occurred according to all supported media types not limited to email messages, voice messages, binary files, RSS feeds, news letters, chat invitations and other presence alerts, and so on.

Portal interface 1300 has a second viewable workspace 1305 adapted in this case to display details from the summary activity displayed in workspace 1304 through interaction with one of the displayed details icons. In this example, a user has highlighted the "one new voice message" line in summary information 1306 associated with the work zone (Z2) and activated the details icon. In the details workspace 1305 the IB and Z2 heading appears. The detailed description 1311 of the new voice message appears including identification of whom the message is from (jim@abc.net), and the time and date the message was received. In this case, a play icon and a reply icon are provided within workspace 1305 and associated with message 1311. The play icon initiates audible rendering of the message and the reply icon invokes an appropriate hosted application a user may manipulate for replying to the message. Such an application may be a version of an IMAP email interface that is hosted by the service and enhanced to allow voice messaging. In one embodiment, after sampling viewing activity summary 1306, a user may elect to synchronize the information with his or her accessing device. Afterward, a user may reply to messages and the like off-line using local applications instead of using server-based applications.

Interface 1300 has scroll functions represented logically in this example by a vertical scroll bar 1308 and a horizontal scroll bar 1309. Although it is not illustrated herein, each displayed information window or workspace may be separately scrollable (having dedicated scroll functions). Another way a user may obtain ordered views of activity is by using a traditional drop-down menu approach as is illustrated in this example by a drop-down menu 1307. In this case an activity summary view was ordered and displayed as information 1306 and upon further manipulation, 1306. However, other ordered views are possible and should not be limited to views of all messages, specified zone views, replicated activity, shared activity, timeline alerts, general alerts, and archived information.

To exemplify other possible views that can be formatted in various ways without departing from the spirit and scope of the invention, consider a zone view of a specific zone. A user may click option Zones from menu 1307 and receive an iconic representation of all of the current zones. By clicking on a detail icon associated with any listed zone, a user may receive a detailed architecture (tree portion) specific to that zone showing the inboxes and folders of the zone. Such detail may be presented for display in workspace 1305. If desired, a user may further order detail by selection of an option, provided for the purpose, for viewing activity for that zone. Selecting the option view activity may then enable the user to browse through the inbox messages and folder contents for the selected zone. Therefore, all of the function provided through navigation of tree 1303 is, in this example, replicable through other functional means such as by manipulating menu 1307. Moreover, mouse over and right clicking on options can also provide a means to drill down to detail in zone inboxes and folders.

One with skill in the art of various network-capable devices will appreciate that interface 1300 may both visually and functionally appear differently according to device type, access protocol, and supported media types without departing from the spirit and scope of the present invention. In one embodiment, for example, a user may access his or her portal page 1300 using a standard telephone and negotiate available option through such as IVR interaction.

A view of replicated activity selected from menu 1307 may bring up a workspace 1304 containing activity information similar in structure to activity information 1306 accept that new messages that were not replicated would not be displayed. Selection of the option shared may call up a workspace wherein all shared components like shared inboxes and folders are displayed. Moreover, shared contact directories can also be viewed through this option.

In one embodiment of the present invention a view for time alerts can be ordered by selection the option Time Alerts in menu 1306. In this case workspace 1304 may indicate the existence of any time sensitive activity across all zones. A user may pre-configure certain correspondence threads identified by contact and user identity, for example, as time sensitive correspondence. In this case the timeline related to the receipt of and reply to messages of thread can be displayed along with the message activity summary. In this way a user may be alerted if, for example, if a time window for responding to the latest received message is approaching or exceeding a pre-specified time allotted for response to certain types of messages, or to a threshold time window established a particular correspondence thread involving one or more contact identities. A time alert may be displayed to a user at any time whether or not a timeline view is ordered. Such alerts may appear as pop-up alerts or on an alert bar provided for the purpose.

In one embodiment of the present invention an administrative control-view option (not illustrated) may be provided for enabling an administrator to access zone architecture and apply certain service levels to specific zones or zone activities specific to zones or across multiple zones. For example, if a zone architecture reflects a hosted business environment where users might be sales agents sharing zones and/or inboxes and folders, administrative response time rules may be applied for outgoing communiqués that are in response to client requests for information or service. In such an embodiment a response rule for purchase order requests queued in an inbox in an offered products zone might be "respond to all request within 2 hours of queue time" whereas a response rule for customer service in a customer care zone might be "respond within 8 hours of queue time". An administrator may order a service view, for example, across zones to analyze how well agents are performing.

The same embodiment immediately described above can be extended to a non-business or family-oriented zone architecture having shared activity. In this case the administrator could be a parent and response rules can be applied to one or more family shared inboxes to insure that members of the family respond to certain messages in an appropriate time. For example if a grandmother sends an email to a son, it is socially important that the son respond to the grandmother in a reasonable amount of time out of respect. Likewise if a son or daughter is involved in a collaborative school project, it is important that communiqués received from peers involved in the project are addressed in a responsible time frame. There are many possibilities.

General alerts can be generated and displayed for users at any time while a user is logged in to the portal system. Alerts related to zone policy violations and other administrative alerts related to account status and so on may be considered general alerts. By selecting view alerts option in menu 1307, the user can view all zone policy and other alerts generated since the last login. A user may also order views of archived information by selecting Archived from menu 1307. Such views ordered can be zone specific views or views across all hosted zones.

Portal interface 1300 has an interaction mode option 1310 that allows a user to set interaction status according to presence information. For example, an option Live can be selected if a user wishes to accept live interaction while logged into portal page 1300. An away icon is provided to indicate presence information that the user is logged in and currently away. If a user activates the Live option, he or she can accept live calls, instant messaging, and so on through the portal interface with all interaction conforming to zone policy enforced by firewall as described further above.

In one embodiment a user may be defined as a business of multiple users or agents having multiple hosted zones and identities. Live interaction in this case may be a default state for a business having all communication routed to and from the business by proxy with incoming communication routed to appropriate user or agent inboxes and identified telephony extinctions and outgoing communications routed to destinations in a zone and identity specific manner. In the case of hosting a business, portal page 1300 can be provided in multiple instances for the agents that are receiving service. An example would be for multiple agents accessing the server simultaneously from a LAN network of connected devices. A very large business with many agents might have a separate portal server dedicated to hosting the business.

A user may elect to operate off-line or not hosted for periods of time wherein hosting services are not used. In this case it is assumed that the user has zone architecture and policy installed locally so that when next online the activity can be replicated or synchronized with the hosted architecture. In the case of live interaction, telephone numbers and extensions can be published in the telephone network at one or more local CTI switches maintained by or leased by the hosting service. IVR services and other telephone network services can be similarly provided and maintained and or provided and leased by the zone host and adapted to cooperate with the portal system so that during live interaction where hosting is performed, incoming and outgoing communications are conducted according to zone policy and identities. One such example might be a contact calling a client where the contact uses a business telephone number to reach the client. An IVR service can be used to identify the contact and purpose of the call. Automatic number identification (ANI) and destination number identification service (DNS) as well as IVR prompting can be used to properly identify the contact identity. The destination number can be assigned to one or more zone-specific user identities including telephone extensions, IP addresses, message boxes, and so on. The host then using the identity-oriented firewall performs the final destination routing to the appropriate live extension or application on the local station of the client (if live) or to the appropriate message inboxes and folders (if away).

It will be apparent to one with skill in he art that interface 1300 can have many function variations and view possibilities without departing from the spirit and scope of the present invention. Interface 1300 may be customized for a single client or a client defined by multiple users.

The methods and apparatus of the present invention provide a unique capability of managing communication and digital collection according to multiple client and contact identities, which can be personalized according to a variety of zone descriptions. The invention can be implemented with or without zone hosting capabilities and can tie virtually any communication media to zone architecture enforced by zone policy. The methods and apparatus of the present invention empower a user in constructing a social communication environment that successfully excludes undesired communication and provides convenience and security in communication management for a client or client group of individuals.

Managing Social Interaction

According to one aspect of the present invention, the inventor provides a method and apparatus for describing broad social interaction over a communications network and for managing that interaction in an identity-oriented fashion. The methods and apparatus of the present invention are described in enabling detail below.

Figure 14:
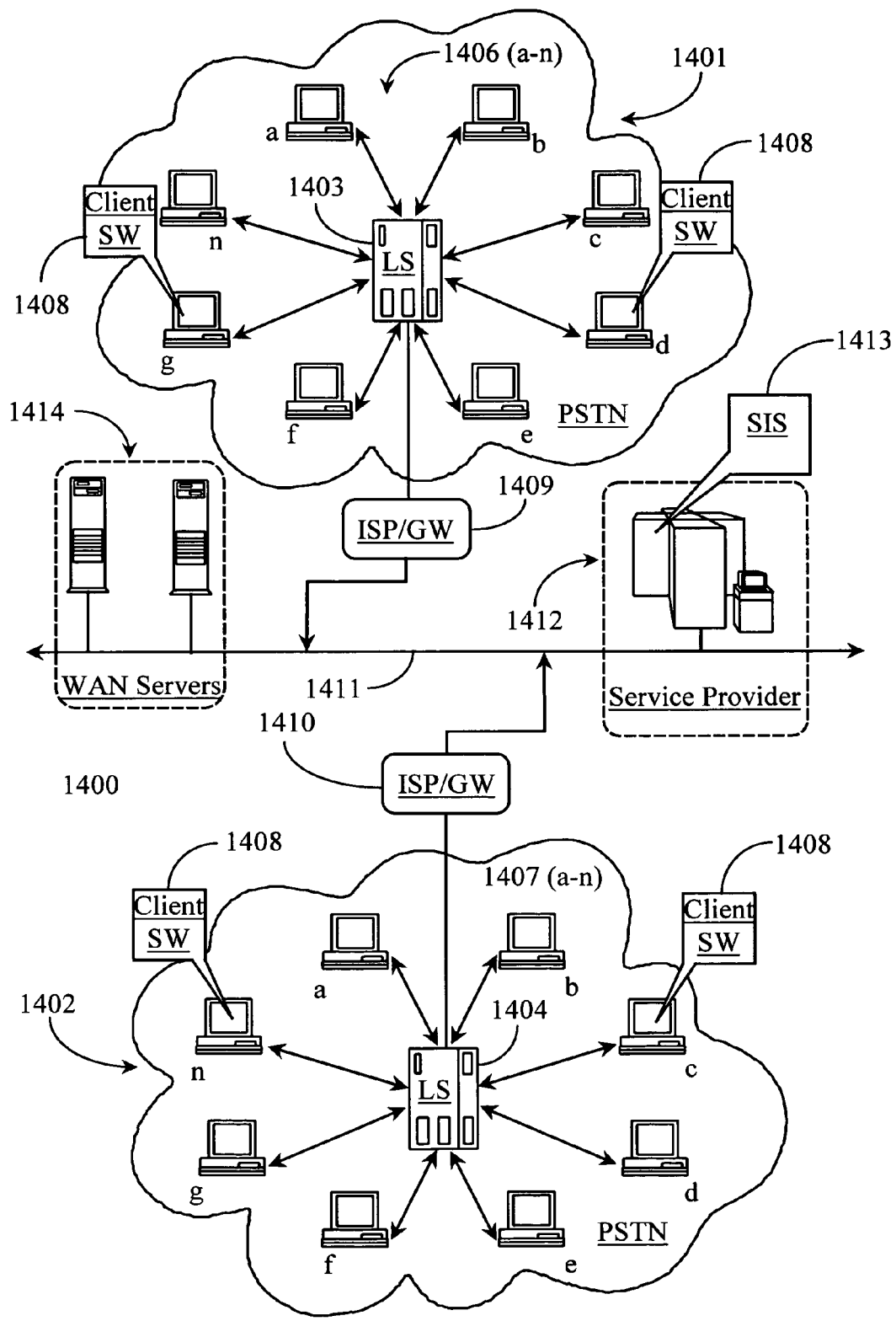
FIG. 14 is a logical overview of a network architecture wherein social interaction services are provided according to an embodiment of the present invention.

FIG. 14 is a logical overview of a network architecture wherein social interaction services are provided according to an embodiment of the present invention. In this simplified overview, the inventor illustrates two separate geographic portions of a PSTN network. These are, a PSTN network 1401 and a PSTN network 1402. PSTN 1401 and PSTN 1402 are logically separated in this example by a digital network represented herein by a digital network backbone 1411. In a preferred embodiment of the present invention backbone 1411 represents all the lines, equipment, and access points making up the well-known Internet network. However, backbone 1411 may represent an Intranet, or other WAN network. Likewise, PSTN 1401, 1402, may be a private instead of a public telephone network without departing from the spirit and scope of the present invention. Moreover, wireless digital and telephone networks may be represented in this example without departing the spirit and scope of the present invention although none is specifically illustrated herein.

Within PSTN 1401, there is a plurality of clients 1406 (*a-n*) illustrated as having network connection capability to a local telephone switch (LS) 1403. Switch 1403 represents any local switch available to clients wherein such clients may connect thereto using such as computer equipment including a telephone modem. In this case, each client 1406 (*a-n*) is represented by a computer icon. However, other modes of network communication may be represented herein without departing the spirit and scope of the present invention.

Switch 1403 has connection to an Internet service provider/Gateway (ISP/GW) 1409, which in turn has connection to network backbone 1411. Hence, each client 1406 (*a-n*) has a network connection capability from his or her respective computer nodes through switch 1403, ISP/GW 1409, to network 1411. In one embodiment, the network connection described herein is a simple dial-up Internet connection. Although it will be apparent to one with skill in the art that clients 1406 (*a-n*) may be using other network-capable devices and may be connecting to network 1411 using other methods known in the art.

Similar to PSTN 1401, PSTN 1402 has clients 1407 (*a-n*) illustrated therein and represented as computer icons wherein they each have a connection to a local switch (LS) 1404, which in turn has connection to an ISP/GW 1410, which in turn has connection to network backbone 1411.

In a preferred embodiment, network backbone 1411 represents the Internet network and may hereinafter be referred to as Internet 1411. The inventor chooses Internet 1411 as a preferred example of a WAN because of its high public-access characteristics. A service provider 1412 is illustrated within the domain of Internet 1411. Service provider 1412 is adapted to provide a variety services to clients 1406 and 1407 (*a-n*). Among other services provided, identity oriented management services are provided as described with reference to the patent application listed in the cross-reference section of this specification. Additionally, service provider 1412 provides an array of services termed social interaction services (SIS) by the inventor. Service provider 1412 may be assumed to include all of the communications equipment, including servers described with reference to the zone-hosting service party 1100 of FIG. 11. In this example, additional services are provided for facilitating social interaction among clients over a network.

Service provider 1412 has an instance of a social interaction services suite (SIS) 1413 available thereto and adapted to provide services constructed around a unique descriptive language termed social interaction markup language (SIML) by the inventor. For the purpose of this specification, SIS shall be defined as an array of services that utilize SIML to define various aspects and components used in various social interaction activities that are enabled by the descriptive language. SIML is, in a preferred embodiment, a compilation of XML-based description language components that each provide rich metadata descriptions of various aspects related to practice of social interaction among clients such as clients 1406 and 1407 (*a-n*). Social Interaction Markup Language may be based on some other type of mark-up language construct other then XML, however the inventor chooses XML constructs in a preferred embodiment because of their widespread use and adaptability to various platforms, applications, and communication protocols. More detail about the structure and components of SIML will be provided later in this specification.

Internet 1411 also includes Web servers 1414 connected thereto and adapted as typical electronic network servers that serve electronic information pages and/or provide third-party services using hyper text transport protocol (HTTP), wireless access protocol (WAP) and other well-known network protocols. Servers 1414 may represent e-mail servers, chat servers, NNTP servers, web page servers, information systems, P2P servers, VoIP servers, and virtually any other type of server that may be connected to Internet 1411 and that may provide some form of service to clients. Clients 1406 (*a-n*) within PSTN 1401, and clients 1407 within PSTN 1402, have, in this example, client software (SW) instances 1408 provided thereto.

In the present example, SW 1408 is an installable or downloadable client application and that enables clients 1406 and 1407 (*a-n*) to practice the present invention with regard to disseminating, creating and posting content using SIML and its various components in cooperation with SIS. Client application 1408 works, in this embodiment, in conjunction with SIS application 1413 to enable social interaction in various forms to be practiced in an identity-oriented fashion.

In one embodiment of the present invention, service provider 1412 may provide, for example, a collaboration service aided by SIS 1413 wherein clients among 1406 and 1407 (*a-n*) may participate, defined as a social group, using client SW 1408. Using a collaboration service as an example, SIML is leveraged to provide rich description of all of the constructs and boundaries of the group, the communication applications and protocols of the group, the subject matter for collaboration for the group, the media files or other applications used by the group for collaboration, and the identities of those clients who are defined as part of or who may be allowed to participate in the group's social interaction. SIML enables a group to dictate its own level of structure from a loosely organized group, which may even be open to public participation, to a tightly structured group inclusive of specific identities with security regimens, which may also be identity oriented, in place for access and participation.

In one embodiment of the present invention, software 1408 is an "agent" application analogous to the application "agent suite" described above with reference to FIG. 1 in the co-pending application Ser. No. 10/765,338. In this embodiment client 1408 may be presumed to contain an application for posting, an application for reading, and an application for collecting. In addition, zone management and firewall components may be integrated therein.

In another embodiment of the present invention client 1408 may be a temporary download that may be downloaded from service provider 1412. Still another embodiment, client 1408 may be a plug-in module downloaded from service provide 1412 and installed to an existing application that normally disseminates binary content such as a media player application or some other binary consumer.

Clients 1406 and clients 1407 (*a-n*) may utilize the capabilities of client 1408 in order to partake in social interaction in association with groups that are described using SIML. In addition, clients may use application 1408 in order to form loose-knit social groups among themselves for the purpose of trading of binary content, collaboration, or for the purpose of performing other types of group activities over the network. SIML components communicate of the network using the existing application layer of a network protocol stack integrating with the appropriate transport protocols in a fashion transparent to servers, routers, and other network nodes involved in a data path.

Client 1408 does not necessarily have to be dependant on SIS application 1413 in order to successfully practice the present invention. For example, using client 1408 in an embodiment of an agent application, a client may post binary content using a poster application to such as a P2P server wherein the content provided by the server is richly described using a component of SIML that is specifically adapted to provide rich description of posted binary content. Likewise, a client may use a reader portion of the application find rich content described according to SIML and can utilize to that rich description to enable enhanced content sampling and dissemination of the content. Still further, a collector portion of the application may be provided and adapted to leverage the rich summary description of content to provide a meta indexing service that organizes a large collection of binary files for access, reposting, and so on.

Service provider 1412 may provide services using SIS 1413 to enable such services. One example might be that of a search service provided to clients such as clients 1406 and 1407 (*a-n*) wherein those clients may use their application 1408 to connect to a server that may function as a proxy to locate SIML content that may be carried in third-party servers. Such a service ma be made to function in a transparent manner to the content host server. Another example of a service that may be provided by service provider 1412 might be that of a collaboration service wherein a client that wishes to form a social interaction group for project collaboration, for example, may define all SIML constructs of the group, and rules for proceeding, and may cause other invited members of the group to be notified via various communications channels for the purpose of joining the group, including, in one embodiment, receiving a version of software 1408, if required, to enable interaction.

Figure 15:
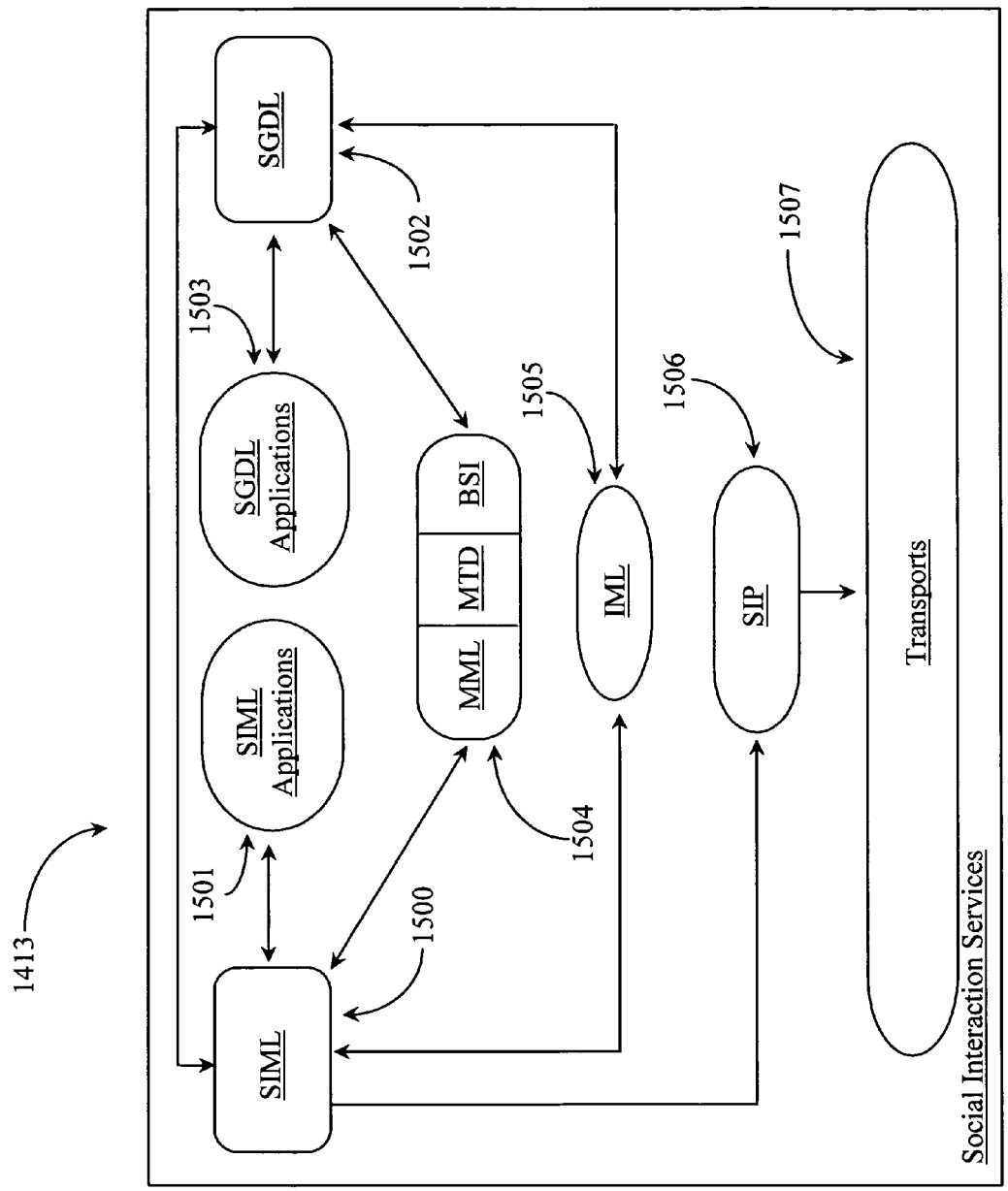
FIG. 15 is a block diagram illustrating various components of social interaction services and relationships between them according to an embodiment of the present invention.

FIG. 15 is a block diagram illustrating various components of social interaction services suite 1413 and relationships between them according to an embodiment of the present invention. SIS 1413 provides SIML capability exemplified herein by a logical module 1500 labeled SIML. SIML may be thought of logically as a grouping of interrelated XML-based components that address one or more areas of social interaction. SIML applications, exemplified herein by a logical block 1501, may include various applications that use portions of or all of the SIML components, which may also be thought of as features.

SIS 1413 enables a wide variety of problem solving and fulfillment interactions like, for example, customer support, auctions, match making, FAQ creation, electronic voting, and electronic gaming, among others. SIS allows for a large group of problem solvers to cooperatively fulfill requests of a very large social group in a manner that provides more structure without using proprietary solutions or, in many cases, software. SIS 1413 enables social interaction over existing network transport layers using standard protocols. It does not require any type of proprietary framework.

An example of an SIML application might be that of an SIML collaboration application hosted by one or more individuals and made available for others using SIML-capable software. Another one might be a social interaction group devoted to match making and constrained by identity filtering. SIML has a Social Group Description Language (SGDL) feature 1502. SGDL 1502 is adapted to provide rich description of various aspects related to a defined social group. SGDL 1502 may include a variety of SGDL applications that define specific interaction group types or classes. One example of an SGDL application might be an application that identifies and defines a particular type of social group, perhaps evolved over time from ubiquitous interaction hosted by an NNTP server. Another example of an SGDL application might be one that defines a particular corporate interaction group purposely set-up for a temporary collaboration project. It is important to note herein that every SIML application includes or references at least one SGDL application and that SIML applications may differ according to purpose and scope, as well as the types of groups serviced and extent of functionality provided. Likewise, an SGDL application may include one or more described hosts for hosting the interaction. A good example of this might be an NNTP server or servers used transparently as hosts for message posting and download between participants of the group.

Social interaction within a group includes propagation and dissemination of media between participants of the group. Therefore, a component of SIML includes a media markup language (MML) component 1504, which incorporates a media type definition (MTD) feature and may also include a binary series indexing (BSI) feature, if group interaction includes posting and dissemination of binary content.

The mentioned MTD feature provides rich description of the content subject matter of a posted series or message in an NNTP environment and may be used to access media that fits the appropriate content rules for the news server or for particular groups using the server. Using MTD, a client may quickly navigate to the BSI indexes of the series or messages that most concern him for dissemination. Normal message content, of course still exists within the server and the client may browse normal non-SIML-enhanced content as well.

Feature 1504 using MML including media type definition (MTD) provides rich description of one or more media types approved for group interaction, and instructions for calling, operating, and otherwise managing the defined media types for group interaction including sub-components (described later in this specification) for creating and managing BSI that provide rich metadata descriptions of a series of posted binary files. MML provides rich meta-description of the actual media content occupying message payloads, or content stored for download such as from an FTP server or a P2P server. A BSI is an extension of MML used for NNTP posting and subscribing activities.

An identity markup language (IML) component 1505 is provided within SIS 1413 and may be integrated into an SIML application as part of the SGDL application. IML provides a rich metadata description of identities (individuals and groups) including email addresses, IM identities, IP addresses, messaging application identifiers, telephone numbers, or other types identifiers that may be specific to an individual client or to a sub-group of clients. IML 1505 may also provide identity information about a social interaction group that may be used to differentiate such a group from another social interaction group. By using IML, clients may subscribe to content in an identity-centric way rather than in an application specific way.

SIS 1413 includes a social interaction protocol (SIP) component 1506 adapted to provide rich metadata description of specific protocols, rules of engagement, instruction sets for message posting, media handling, and interfacing with existing message handling and transport protocols. SIP includes conventions like publish, offer, fulfill, subscribe, request, invite, join, notify, vote, and list. Not all functions may be included in a particular SIML application. The exact functions available depend in part of the SGDL and transport used in message propagation. For example, a group using file transport protocol (FTP) would have different SIP features than one using NNTP.

An SIML transport component 1507 is provided as part of an SIML application and provides the interfacing mechanisms described in XML for using existing transport protocols used in TCP/IP, user datagram protocol (UDP) or other network protocols including HTTP, NNTP, RSS, WAP, IM, real transport protocol (RTP), multi-purpose Internet mail extension (MIME), SMTP, IMAP, remote copy protocol (RCP), simple object access protocol (SOAP), remote desktop protocol (RDP), universal description discovery and integration (UDDI), LDAP, and others. It is noted herein that the network transport or "messaging layer" is an existing part of network structure and is not an integral part of SIML. SIML simply utilizes the existing transport protocols available over the prevailing network for message propagation.

It will be apparent to one with skill in the art, that the various described components of SIS 1413 are integrated and work together to establish a social interaction group's presence and purpose. A group may take on any level of formality or structure that is described and provided for by the mark-up components defining the group and group application. For example, in one embodiment, there may simply be a meeting place, such as an NNTP newsgroup wherein the group is simply defined as a loose conglomerate of would-be participants that may aggregate to the server for the purpose of trading files, providing group support to one another, or some other form of activity that can be defined using a post/subscribe model common to an NNTP server. Such a group may even evolve or form to include a number of identified individuals that were simply interested in the same things and, perhaps share common goals.

In one embodiment of the present invention, groups such as the loosely formed group described above may eventually take on more and more structure as one or more members of the group take on leadership roles. For example, client using SIML-enabled software such as client SW 1408 may create SIML components for use in the groups evolving activities. For example, if most of the active participants do not want to see AVI files then an MTD constraint may be included in the group application that limits video to, perhaps mpeg only, or mpeg and windows media application (wma). There are many possibilities.

In another embodiment, an NNTP newsgroup, or several such newsgroups, may be used by a highly structured group organized outside of the NNTP environment to post and subscribe to SIML content according to the group's mandate. In this embodiment, only certain individuals requiring security authentication may be allowed to disseminate content. In an NNTP environment, SIML content may reside along with normal binary content. The content host does not have to be modified in order to practice the present invention.

As described further above, transport component 1507 includes the available instructions for leveraging transport protocols to propagate SIML content and messages. In a preferred embodiment of the present invention, SIML message content is tunneled into the application layer of the network model in a transparent manner similar to the way SOAP (Simple Object Access Protocol) is tunnelled inside the HTTP protocol on the Internet.

In a specific example of NNTP transport the SIML-BSI component is used to describe a series of multiple related files. On Usenet, the binary series is the primary focus for posting and collecting. For example, songs from a compact disc or album, pictures representing a photo shoot, sequence of related photos, or a movie that is split into RAR segments.

Posters always work in terms of posting a binary series and collectors always work in terms of sampling and downloading a binary series. The majority of binary series contain from between 10 and 100 separate files or "messages". However, there may be as many as 1000 separate files making up a binary series. In current art there is no utility for enabling posters or newsreaders to manipulate binary series content at the level of the series itself. In other words, in any NNTP server there may be as many as 1000 new posted messages per day. These posts may be viewable as a linear list of 1000 entries.

Using SIML, such a number of new posts may be reflected as a list of, perhaps 20 series records, each representing perhaps 50 separate files. A user then may see a list of 20 lines as opposed to a list of 1000 lines. A BSI then is an extension of MML that is an XML document providing rich meta description of the constructs of a series of related files. For example, if the series is a compilation of movie files (RAR segments) then the BSI can tell a user if there are any missing RAR segments. The BSI may tell a user if there are thumbnail pictures for previewing before downloading segments. The BSI may tell a user that it is best to preview certain thumbnails before marking an entire series for download.

In an NNTP environment, MTD may be used to describe the kind of content that should belong to a particular news group. A service for validation of content type can easily be provided that uses the markup to determine which content is appropriate and which is not at the server level, newsgroup level or even at an SGDL level. More detail about SIML as used in an NNTP environment will be provided later in this specification.

Figure 16:
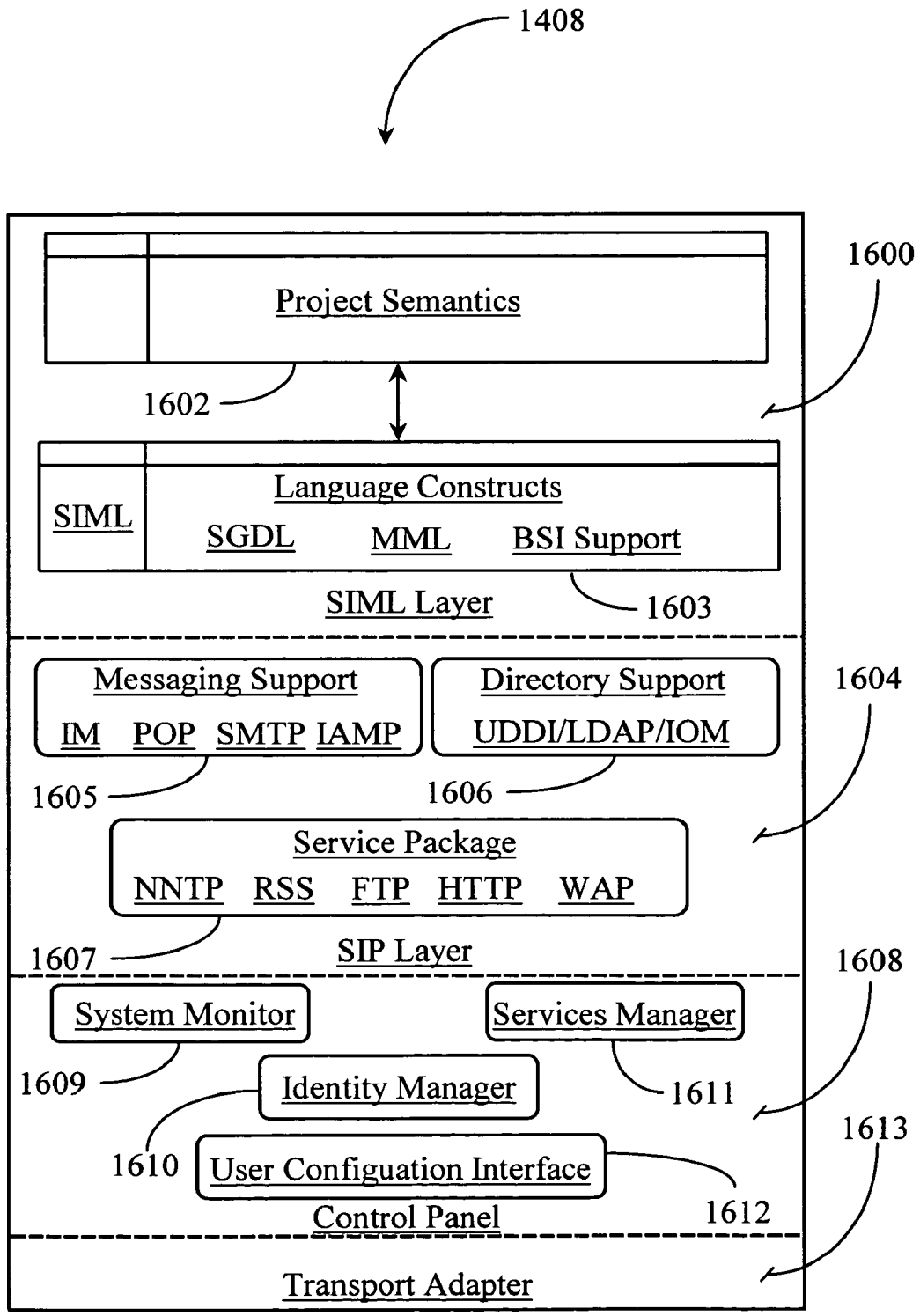
FIG. 16 is a block diagram illustrating various components and layers of the client software of FIG. 14 according to an embodiment of the present invention.

FIG. 16 is a block diagram illustrating various components and layers of client software 1408 of FIG. 14 according to an embodiment of the present invention. As was described with reference to FIG. 1, SW 1408 may be provided as a temporary download to be used in collaboration in conjunction with a service-hosted group or other structured or semi-structured groups of collaborators where SIML is used to facilitate collaboration. In one embodiment of the invention, client 1408 includes an SIML layer 1600, an SIP layer 1604, a control panel 1608, and a transport adapter 1613. In this embodiment, client 1408 may take the form of an application template wherein some of or all of the components are present depending on the particular use of a group. In one embodiment client 1408 may be a plug-in sent as a temporary container that is adapted to contain and utilize various SIML constructs in conjunction with certain media types and transport protocols.

SIML layer 1600 contains all of the required SIML language constructs 1603 for practicing the present invention such as SGDL, MML, IML, and BSI support, if applicable, for describing the group's capabilities, allowed media and content types including series description support, identity applications and so on. It is noted herein that client 1408 will have varying or differing language constructs 1603 according to specific application need. For example, if the client is dedicated for P2P collaboration and does not involve Usenet or NNTP then BSI support may not be provided. Alternatively. It may be provided but not enabled.

Layer 1600 includes, in this example, project semantics 1602. Project semantics include any XML namespaces or terms that may be needed to described specific subject matter terms that are repeatedly used or referred to in SIML message propagation between clients. Project semantics 1602 may, in one embodiment, include one or more templates, which are described in XML, but which may contain normal text where appropriate. For example, a collaborative group may be thrown together for a project of designing a bridge. Certain terms, proper names, equipment types, and so on may be created in XML for use by SIML where additional input text such as in an XML template presented as an electronic form may be propagated.

SIP layer 1604 as a messaging support module 1605 provided therein and adapted to provide specific messaging support called for by SIP protocols for an SGDL application. Module 1605 may provide support for IM, POP, SMTP, IAMP, and so on. The exact protocols supported for messaging depend on the rules for the group, if there are any specific to messaging applications allowed in SIML collaboration. In an embodiment where software client 1408 is a download that is specific to a social interaction group collaborating on a project, then module 1605 contain only the messaging support called for as part of SGDL and SIP protocols.

SIP layer 1604 has a directory support module 1606 provided therein and adapted provide directory support, for example, UDDI and LDAP. In one embodiment of the present invention directory support module 1606 provide support for an IOM white list directory listing all of the approved or current participants of the social interaction group by most prevalent identity such as e-mail for example. In this example, SIP layer 1604 has a service package 1607 provided therein and adapted to provide service over transport protocols such as an NNTP, RSS, FTP, HTTP, WAP, and other prevalent protocols. Service package 1607 is analogous to social interaction services.

Using the previous example of NNTP, it is clear that the SIP actions (user actions for communication) would be publish and subscribe in conjunction with posting messages that are posted in SIML and disseminating those messages identified as SIML messages and identified as SIML messages of a particular group. Therefore, in another environment such as email using POP and SMTP, the emails and attachments are described using SIML and are identified as SIML and associated to a social interaction group. POP and SMTP support then would allow those existing software applications to manage SIML emails separately from other emails using the same server, the emails downloaded by the same client. Further, a convention similar to BSI for NNTP may be provided for POP and SMTP to enable a user to manipulate emails and their attachments in a way separated from other standard email messages in order to sample and disseminate. To the host server and transport layer, the SIML emails are just email messages no different from any other. However to client software 1408, those SIML emails and attachment summaries are visible and the client may leverage information provided in the rich description for workflow purposes.

In an example where a user needs to find an SIML user, directory support module 1606 provides a capability for filtering out the SIML identities and groups listed in those directory servers. In one embodiment such SIML search services, classified under SIS can be provided by a host system instead of just locally on a client machine. In this way, a powerful proxy may be provided and used to find any SIML content listed in a variety of servers. More detail about searching for SIML content will be provided later in this specification.

In this example, SW 1408 has a control panel 1608 provided thereto and adapted to enable certain functions enabled by certain user configuration input. Control panel 1608 may have a displayable user configuration interface 1612 provided thereto to enable a new collaborator to, for example, specify the preferred types of installed applications he or she wishes to collaborate with. A services manager 1611 may be provided to manage the SIS services that a particular client is capable of or is configured to receive. Services manager 1611 enables the client's communication stack to accept SIML instructions for communicating using SIML generation, termed task building, by the inventor.

An identity manager 1610 enables a user to work with his or her preferred identities and to accept or reject other identities of collaborators that are also part of the group. For example, a use may want his or her identity bridgebuilder@123.net to be used as identification for all of his or her SIML emails generated or received during group collaboration and also the same identity for any SIML posting or downloading with respect to NNTP. Further, depending on his or her position and task description in relation to the rest of the group, there may be a certain workflow in place where he or she receives information from only certain ones of the group and passes the information after editing to only certain others of the group. Identity manager 1610 may be used with an identity firewall analogous to firewall application 119 with all of its functionality. In this way group collaborators may be structured in participation according to a desirable workflow managed by identity and zone rules. It is noted herein that identities used may be temporary email accounts established and used solely for SIML-based social interaction.

A system monitor 1609 is provided in control panel 1608 and is adapted to identify all of a user's installed applications for communication, messaging, and word processing. Monitor 1609, upon download and installation, may scan an operating system to identify and link to existing communications applications and other applications that may be used in collaboration such as word processing applications, subject presentation applications, graphics editing applications, and so on.

In a highly structured collaboration environment, the group may have participants that prefer to use varied applications for working in a same document. To cite an example, one collaborator may be trained in and may prefer Corel Word Perfect™ while another may be trained in and prefer Microsoft Word™. MML may therefore include instructions for document conversion for certain individuals and SW 1408 may be enhanced with certain conversion plug-ins if required to complete document conversions.

In a preferred embodiment, the instructions may be implemented on the send or posting side of communications and a proxy service can be leveraged to perform the conversion services. In another embodiment, the conversion capabilities are included with the client applications. There are many possibilities. Using MML to describe document and application capabilities and preferences may include instruction sets for task building such as download document, open document, convert document, display document. Participants of a social interaction group may collaborate using varied media types and display mechanisms. MML and SIP may include custom task preferences such as displaying a presentation, typically posted for download to a desktop, on a selected Web site using HTTP and HTML.

In one embodiment, SW 1408 does not depend on a parent application, but rather cooperates in communication with other client instances involved in a loose social group such as an evolving group of binary collectors using one or more binary news groups under NNTP transport protocol. As client readers and collectors are enhanced with SIML, they may begin to favor dissemination of SIML content in a particular news server because of the rich descriptive summaries provided to help organize content and that facilitate certain rich sampling functions.

SW 1408 has a transport adapter layer 1613 provided therein and adapted to provide SIP and interface mechanisms for embedding SIML content into the prevailing or chosen transport protocol in a seamless manner. Transport protocols such as NNTP require certain limitations for the size of a message posted to a news server for example. Therefore, part of SIP for NNTP includes language instruction for posting messages that, because of the dynamic nature of the language generation and implementation, eliminates much manual work involved in series creation and posting task management. More detail about posting and disseminating SIML content is provided later in this specification.

Figure 17:
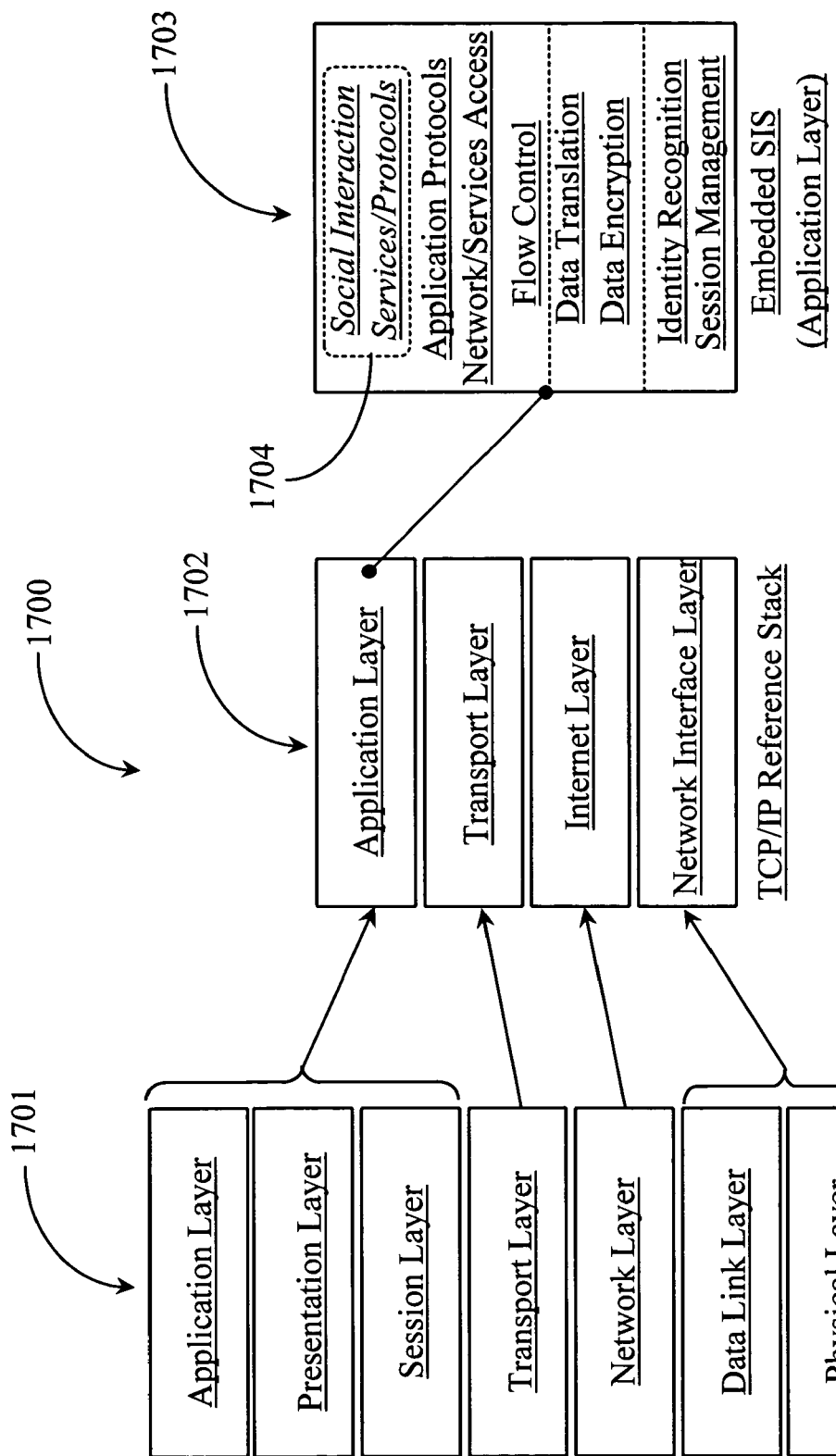
FIG. 17 is a block diagram illustrating integration of social interaction services and protocols into an existing network model according to an embodiment of the present invention.

FIG. 17 is a block diagram 1700 illustrating integration of social interaction services and protocols into an existing network model according to an embodiment of the present invention. Illustrated in this example is a standard open systems integration (OSI) reference model 1701 that lists the standard 7 functional layers that control network communication. The separate layers are well known and documented in the art and therefore shall not be described in great detail individually. Model 1701, from bottom up includes a physical layer and a data link layer that defines equipment, line connections, interfaces, and lower level machine-to-machine interaction.

The network layer and transport layer control the network protocols and transport protocols used to carry data. The session layer, presentation layer, and application layer define the higher-level services and protocols used to conduct networking sessions and applications.

OSI model 1701 is compared in this example, directly to a standard TCP/IP reference communication stack 1702 that comprises essentially 4 network layers. These are from bottom up, a network interface layer that incorporates the first two layers of the OSI model; an Internet layer that incorporates the functions of the network layer for Internet communication; a transport layer equating to the transport layer of the OSI model; and an application layer that incorporates the functionality of the three top layers described in OSI model 1701. Therefore, the application layer of stack 1702 handles session management, presentation management, and application management.

The application layer of TCP/IP reference stack 1702 further broken down the right as application layer 1703. In a preferred embodiment of the present invention, social interaction services are embedded in application layer 1703. Reading from bottom to top, application layer 1703 functions to provide identity recognition and session management; data translation and data encryption; flow control; application protocols and network/services/access protocols. In a preferred embodiment, social interaction services/protocols (embedded SIS) 1704 are embedded essentially on top of the application layer.

Figure 18A:
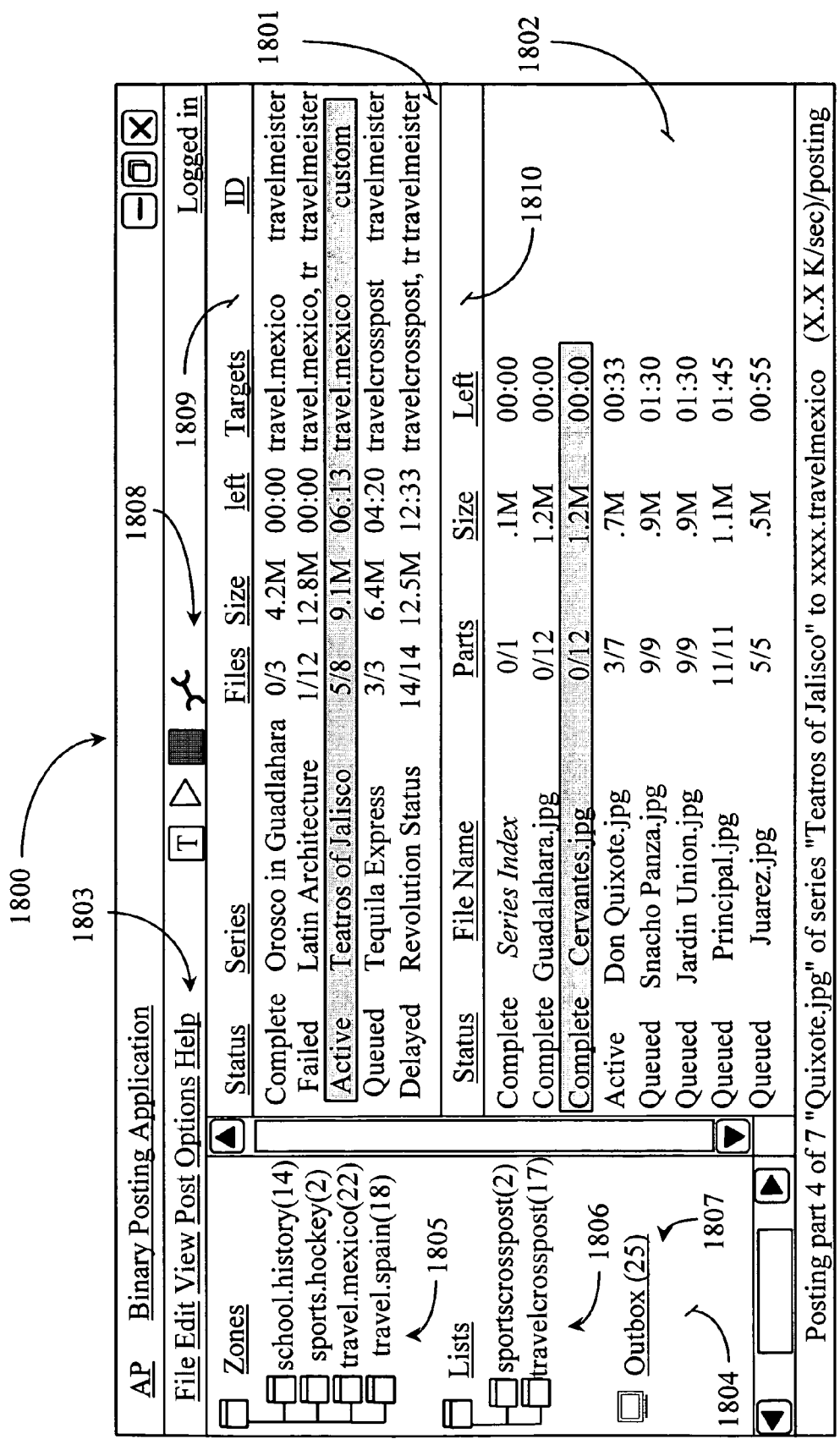
FIG. 18A is an exemplary screenshot illustrating a binary posting interface according to an embodiment of the present invention.

FIG. 18A is an exemplary screenshot 1800 illustrating a binary posting interface according to an embodiment of the present invention. According to one embodiment of the present invention, SIML is practiced in conjunction with binary posting over NNTP. In this example, screenshot 1800 represents a binary posting application, also termed a Agent Poster by the inventor.

In one embodiment of the present invention, screenshot 1800 is a displayable user-interface that is part of software 1408 described with reference to FIG. 14 above. Screenshot 1800 displays an array of drop-down menus 1803 that may be considered standard options for any posting application. These are file, edit, view, post, options, and help.

Screenshot 1800 has two main scrollable windows (scroll bars not illustrated), a window 1801 and a window 1802, which are adapted to show status of posting operations being conducted. More particularly, window 1801 illustrates current posting status of several binary series. Window 1802 illustrates a more detailed view of specific elements of one of the series listed in window 1801 showing the current status of each element related to the act of posting.

Screen shot 1800 also has a scrollable navigation window 1804 provided and adapted to display a user's zones and series elements available for viewing or posting (1805). Tree 1805 may, for example, display a zone specifically dedicated to posting and collecting binary series elements. In this example, tree 1805 shows a folder school.history, sports.hockey, travel.mexico, and travel.spain. The exemplary titles are not relevant to the present invention, but illustrate just one example of how series elements may be organized for posting, viewing, re-posting, and so on. The numbers to the right of he titles may express a number of series (groups of files comprising a series), or a number of series elements comprising a series, which in this case would be reflected in the titles. For example, school.history may be a series having 14 series elements. Likewise, school.history may be a zone containing 14 different series, each containing one or more series elements.

Window 1804 is also adapted in this example to display one or more lists 1806 of posting destinations (server addresses for posting). There are 2 displayed lists in this example, sportscrosspost list containing 2 servers, and travel crosspost containing 17 servers. In one embodiment zones in tree 1805 represent social interaction groups that a client belongs to or participates with and the numbers to the right of each listed group reflect the number of binary series either created or downloaded and stored for that group.

Window 1804 also displays a posting outbox 1807 that illustrates a total of 25 queued elements waiting for posting. Although not illustrated in this example, an inbox may also be accessible from window 1804. Such an inbox may be a zone inbox similar to that described further above with reference to Ser. No. 10/765,338 listed in cross-reference.

In this example, selecting a series for posting adds the series to an outbox and causes current visibility of the selected series in window 1801. In this case posting is automatic once all of the proper attributes have been entered as will be shown further below. Window 1804 may be thought of as an explorer pane with which to locate and select series for posting. Window 1801 may be thought of as a series pane and window 1802 may be thought of as a file pane.

Tool icons 1808 may be provided in the toolbar for user convenience without departing from the spirit and scope of the present invention. For example, icons 1808 include a task initiation icon (T); a start button; a stop button; and a tools button. Window 1801 has a title bar 1809 provided thereto and adapted to organize each series attribute for viewing and manipulation. In the first column under status are the result status indications of complete, failed, active, queued, and delayed. In a second column to the right, are the series names that have been posted or are in the process. In a next column to the right, the number of elements (files) of each series is illustrated. For example, for the series "Orosco in Guadalahara" the posting status is complete and there are three series elements posted. The 0 reflects that there are no files left to post/and the 3 is the total number of files that comprise the series. It is noted herein that a series index (BSI) is one of the elements to be posted for each series so a series containing 4 files may comprise one BSI and three jpegs.

A next column to the right described the total size of all of the files in a series. A next column to the right shows estimated time left to complete a post. A next column to the right lists the primary posting target server or servers. The last column to the right provides the identification of the poster or user posting the series.

In one embodiment in order to view activity of a particular series with relation to its individual elements, a user simply selects one of the series listed in window 1801 to display the related details in window 1802. In this particular example, the user has selected the series "Teatros of Jalisco" for the purpose of viewing more detail.

In window 1802 there are columns provided for showing status results. The first column to the left illustrates the current posting result of each series element of the series selected for view in window 1801. A next column to the right illustrates the file name for each series element. A next column to the right illustrates the current status of file parts or element parts posted and the total number of parts comprising one series element or file. A next column to the right provides a size indication of the total size of the file. A final column illustrates the estimated time left for a file or series element to completely post.

In this example, the series index, or BSI of Teatros of Jalisco is completely posted, has only one file part of size 0.1 megabyte with no time left to post. A next file or series element is the first picture of the series, "Guadalahara.jpg" and is completely posted, 0 of 12 parts left to post. The file is 1.2M with 0 time left to post. The next picture of the series is also completely posted. The third picture of the series, "Don Quixote.jpg." is actively being posted and has three parts of 7 parts left to post. The total file size is 0.7M and there is an estimated 33 seconds left before all parts of the file post. The remaining files listed in window 1802 are queued for posting.

In a preferred embodiment of the invention the task of describing a series for rich sampling and enhanced dissemination is performed in a mostly automated fashion using SIML. Attributes that are readily available such as file size, resolution factor, pixel count, number of files, and so on are automatically described in the BSI, which may be completely expressed in MML constructs. A client may perform additional description and may also provide instruction to potential collectors using an MML generation tool that may be adapted to convert typed text into XML-based mark-up. For example, a user identity can be typed in and then expressed in identity markup language (IML). Instructions or suggestions such as sample files 3, 7, and 8 in the series before deciding to download the series may be typed and generated as part of the BSI index. A SIML-enhanced reader or collector application may automatically interpret the mark-up and as part of thumbnail presentation protocol, may display only the suggested thumbs for review to a client that may be sampling the series.

In a preferred embodiment additional markup is provided which may be used within a BSI such as a classification markup that can identify which portions of a series are for containing information, for example NFO files; content sampling, for example, proofsheets, thumbnails, or movie trailers; content (actual picture or movie content); and for utilities like part recovery and checksum data. Also in a preferred embodiment, identity of author and author-inserted information (identity description language-IDL) may provide author identity, copyright notice, and reference or direct lining to a micro-payment system or some other security-enhanced payment system or method for enabling users of content to pay appropriately for the content.

Much of the SIML may be transparent to the client including functional mark-up instruction for launching a particular viewer installed on a client's system. In one embodiment, viewer plug-ins or even SIML interpreters may be provided as part of a series wherein the BSI contains the instructions and location of the plug-in viewer component that may be downloaded and then used to sample or view the rest of the SIML series.

It will be apparent to one with skill in the art that any particular news server may contain standard NNTP messages along with SIML messages. In a preferred embodiment, the provision of rich meta description and enhanced sampling features provided for those who practice SIML collection will cause a migration of those client's formerly using non-SIML enhanced software to embrace SIML capabilities. Using an SIML-enhanced poster, a client may use mostly drag and drop techniques to post binary series and have most if not all of the BSI automatically generated. The messages post using the same NNTP protocols that handle prior-art posting.

In a preferred embodiment, an SIML-enhanced collector or reader may, very quickly, download all of the BSI indexes for any new series that have been posted since the last time the user has logged into the server. Because the BSI is an XML document in a preferred embodiment, the collector can use the XML-BSI indexes to quickly locate and sample files that have been richly described. Likewise, a client may architect various content filters, which when applied will filter the BSI markup for the preferred constraints of the client such as subject matter, resolution, missing parts conditions, identity of author, and the like.

Figure 18B:
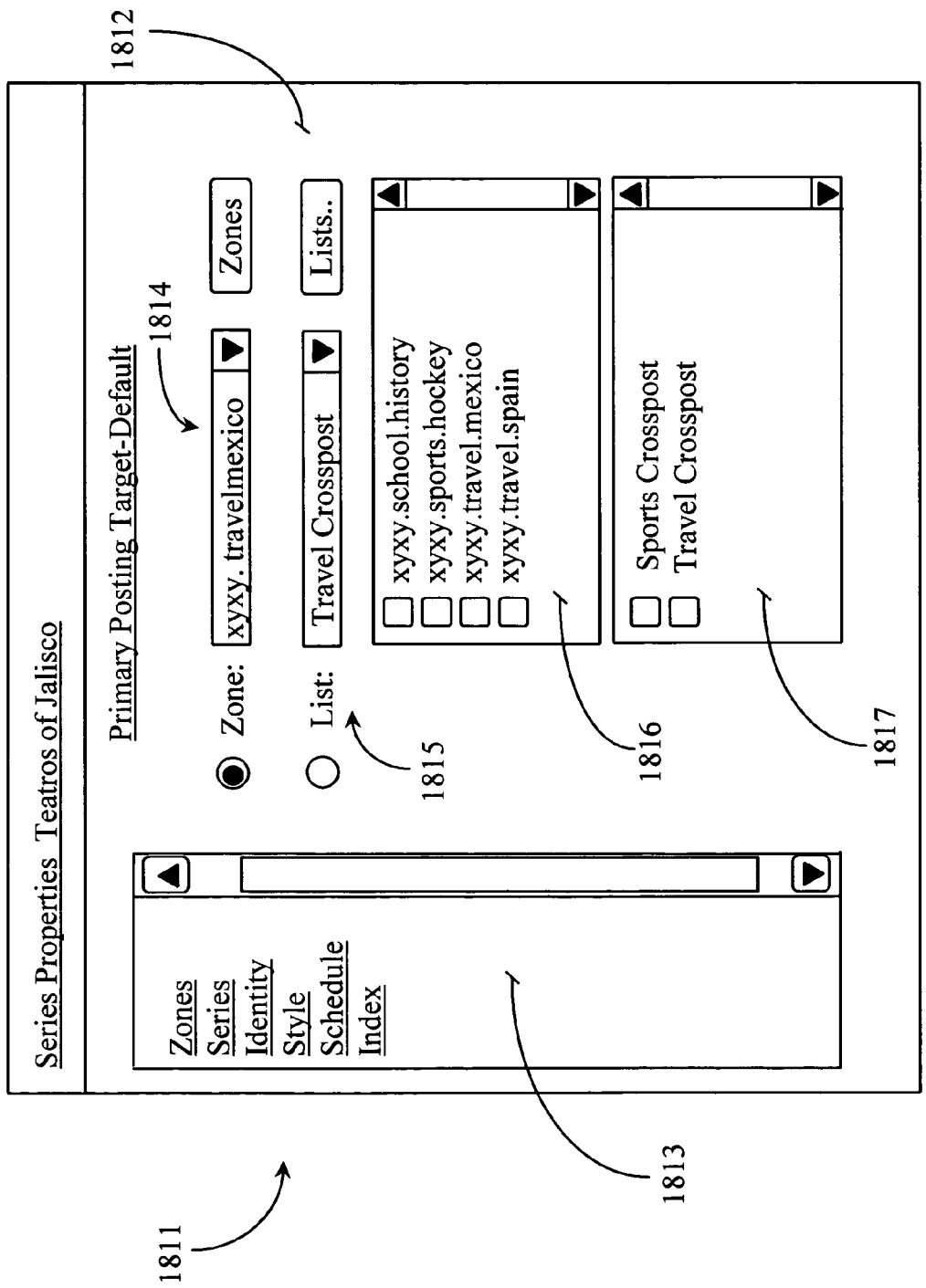
FIG. 18B is an exemplary screenshot illustrating a posting configuration interface according to an embodiment of the present invention.

FIG. 18B is an exemplary screenshot 1811 illustrating a posting configuration interface according to an embodiment of the present invention. Screen shot 1811 is a properties configuration screen that, in a preferred embodiment ay be accessed from screen 1800 of FIG. 18A. Screen 1811 illustrates a number of selectable options presented within a scrollable window or explorer pane 1813 illustrated at left in the screen. Screen 1811 also has a main work area window 1812. The components listed in window 1813, which have configurable properties, are zones, series, identity, style, schedule, and index. All of the just-described components must be defined in order to post a successful series. The XML constructs including task wrappers and protocol extensions are generated immediately after a user selects the required attributes and conditions for a post transaction.

The first component zones is highlighted in this example (dotted rectangle) and defines, in this case, user-defined segregated zones as described with reference to Ser. No. 10/765,338 listed in the cross-reference section of this specification. In this embodiment of NNTP posting, the zones may indicate genres of binary activity. Each zone may have a separate identity that is attributed to the zone owner. In one embodiment there is a primary posting target by default associated with each zone, or the target most used for posting files from a particular zone. However a user may change default status of posting targets and may configure a list of targets as a default target as well.

In configuring a post from a neutral point (not already operating from a zone) or from another zone the client wishes to switch from, a client may select a zone (to post from) from a drop-down menu 1814. In one embodiment, a drop down menu such as 1814 may not list all zones, but only zones that the client commonly uses during posting and collecting activities and thus are visible in menu 1814. An interactive button labeled Zones . . . to the right of menu 1814 may be invoked to open a scrollable window 1816 adapted to list all or a client's established zones. A client may, in one embodiment, select a zone from the larger list. In a typical application, the particular binary files a user wishes to post are accessible only from the selected zone unless they are shared over more than one zone. In this case, the client has selected a zone xyxy.travel.mexico.

In one embodiment, a zone may be indicative of a social interaction group that the user is a member of or otherwise participating in. In this example, a client operating from the zone xyxy.travel.mexico is going to post a series from that zone. In one case, the primary client identity (zone identity) may be, by default of operating from within the zone, used as the posting identity. In another embodiment, the client may have other identities associated with the zone that may be permanent or temporary identities. A client may also obtain a new identity fro use in a zone if desired.

A drop-down menu 1815 is provided within screen 1812 and contains cross-posting destination options. In this case the user may select cross-posting functionality by marking the interactive field next to and o the left of menu 1815. Similar to menu 1814 above, a interactive icon labeled Lists . . . is provided next to and to the right of menu 1815, which is adapted in a preferred embodiment to display all of the cross-posting destinations available in a scrollable window 1817. In this case, there are 2 available cross-posting targets. These are sports crosspost and travel crosspost. Therefore, travelcrosspost may either be selected by the user from list 1817 or it may appear as a default target. In one embodiment, an additional toggle (not illustrated) may be provided to enable a user to select "cross posting or normal posting.

In one embodiment of the present invention, zones may be hosted by a third-party service provider such as zone host 1100 described with reference to FIG. 11 of Ser. No. 10/765,338. In this embodiment, a client may be part of a group that shares a single zone educated to facilitating all messaging and other communications activity conducted by group participants. In the case of posting and subscribing however, group participants are typically configured to directly connect to the appropriate news servers and may bypass any proxy unless third-party services are subscribed to by any of the participants.

It is noted herein that it is not specifically required that a client post and collect binaries from identity managed zones like those described with reference to FIG. 2 of Ser. No. 10/765,338 in order to successfully practice posting and collecting using SIML. However, the identity-managed zone architecture provides a more feasible, reliable and secure way to practice posting and collecting using SIML. For example, a client attempting to post a series in error ma be notified by the zone manager or firewall application that content, identity, or other attributes are not appropriate for the current zone the client is operating from and may suggest the appropriate zone from which to post or to download to. XML-based constructs may be used to direct internal zone management and identity filtering so that even a client novice to the world of binary posting can operate with efficiency in an error free manner.

It will be apparent to one with skill in the art that screen 1811 may have a different architecture or layout than the specific example illustrates without departing from the spirit and scope of the present invention. The arrangement of the windows, format of data displayed and location of the described icons is exemplary only.

Figure 18C:
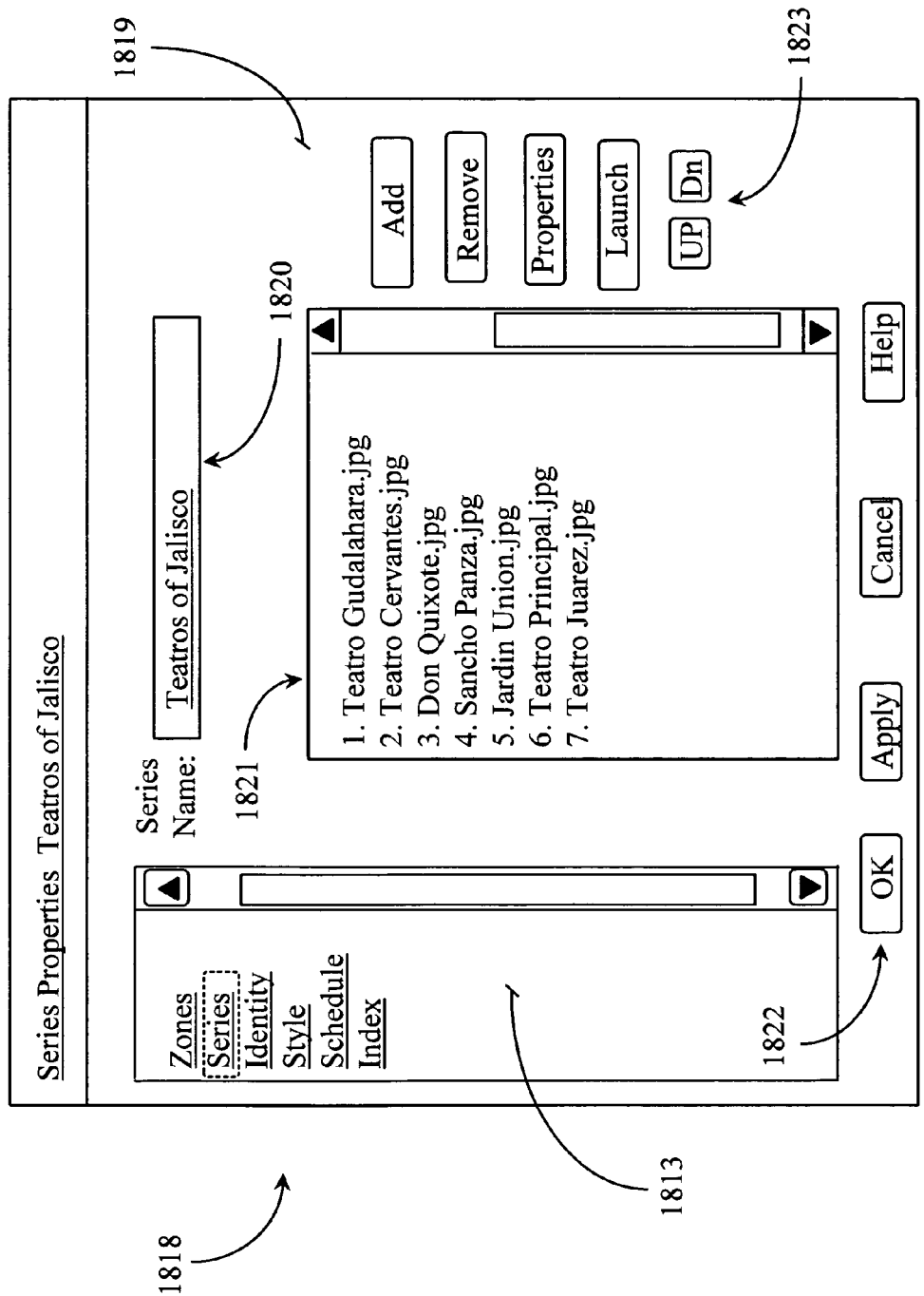
FIG. 18C is an exemplary screenshot illustrating contents of a posting according to an embodiment of the present invention.

FIG. 18C is an exemplary screenshot 1818 illustrating contents of a binary post assembled for posting according to an embodiment of the present invention. Screen 1818 is displayed through interaction with screen 1811 of FIG. 18B by selecting series. Window 1813 is common to both screens 1811 and 1818. In this example a client has selected series shown highlighted in window 1813 to view series properties. Any binary series may be assembled from scratch or edited in the case of an existing series through interaction from screen 1818. Screen 1818 has a main work window 1819. Work window 1819 has a title bar 1820 for inputting the name of a new series or the name of an existing series that was previously posted. In this case the current series displayed is "Teatros of Jalisco" accessible from the zone xyxy.travel.mexico. Work window 1819 has a scrollable window 1821 displayed thereon and adapted to list al of the current files that make up the series for post. In this case there are 7 listed jpegs.

An array of interactive options 1823 is provided to enable a client to edit the elements of a series. For example, an option for adding one or more series elements or files is provided. Selecting add from options 1823 may cause the file or zones structure to appear in navigable form such that a client may navigate to a file location containing a file or files that may be added to the series by performing a drag and drop operation from window to window. Likewise, there is an option in array 1823 for removing one or more files from a series.

Option array 1823 has a properties option for drilling down to further detail with respect to a series element. For example, a client may select an item from window 1821 and then hit the properties button to see how many parts of each file were created. Other elements or attributes of a jpeg., for example, maybe viewable and, in some cases, editable through the properties option.

Option array 1823 has a launch option assuming every thing is entered into the configuration interface and the series is ready for posting. An upload (UP) and download (DN) option is provided in option array 1823, selection of which depends upon the location of media files, or of a completed series of files, perhaps for reposting. Media files may, in one embodiment be posted directly from a peripheral device such as a digital camera through a zone that supports the external connection and recognizes the device storage drive containing the media files. In this case uploading files is appropriate. In another embodiment a client may wish to download a series located on another computer on a network for the purpose of re-posting the series. In this case download is appropriate. A file or series import option may be provided in place of the option for download.

An array of action options 1822 is provided and is in this example located under window 1821. Action options in array 1822 include Ok, Apply, Cancel, and Help. These options are self-explanatory. It is noted herein that a BSI is not illustrated as a series element in this example because the BSI is generated, in a preferred embodiment, after all of the attributes and files are in place and accepted by the client. However, in an embodiment wherein an existing series will be edited or modified and re-posted, a BSI may be displayed as an existing series element, which would be automatically updated when a client finalizes any changes.

It will be apparent to one with skill in the art that screen 1818 may be presented in an alternate arrangement with respect to component location without departing from the spirit and scope of the invention. This example follows that of the example of FIG. 18B and is considered exemplary of one example screen. In one embodiment, a further scrollable window may be caused to replace window 1821 upon selecting one or more elements from window 1821 and then selecting properties from option array 1823. This window may display the individual file parts and other attributes such as the data weight of those parts and so on.

Figure 18D:
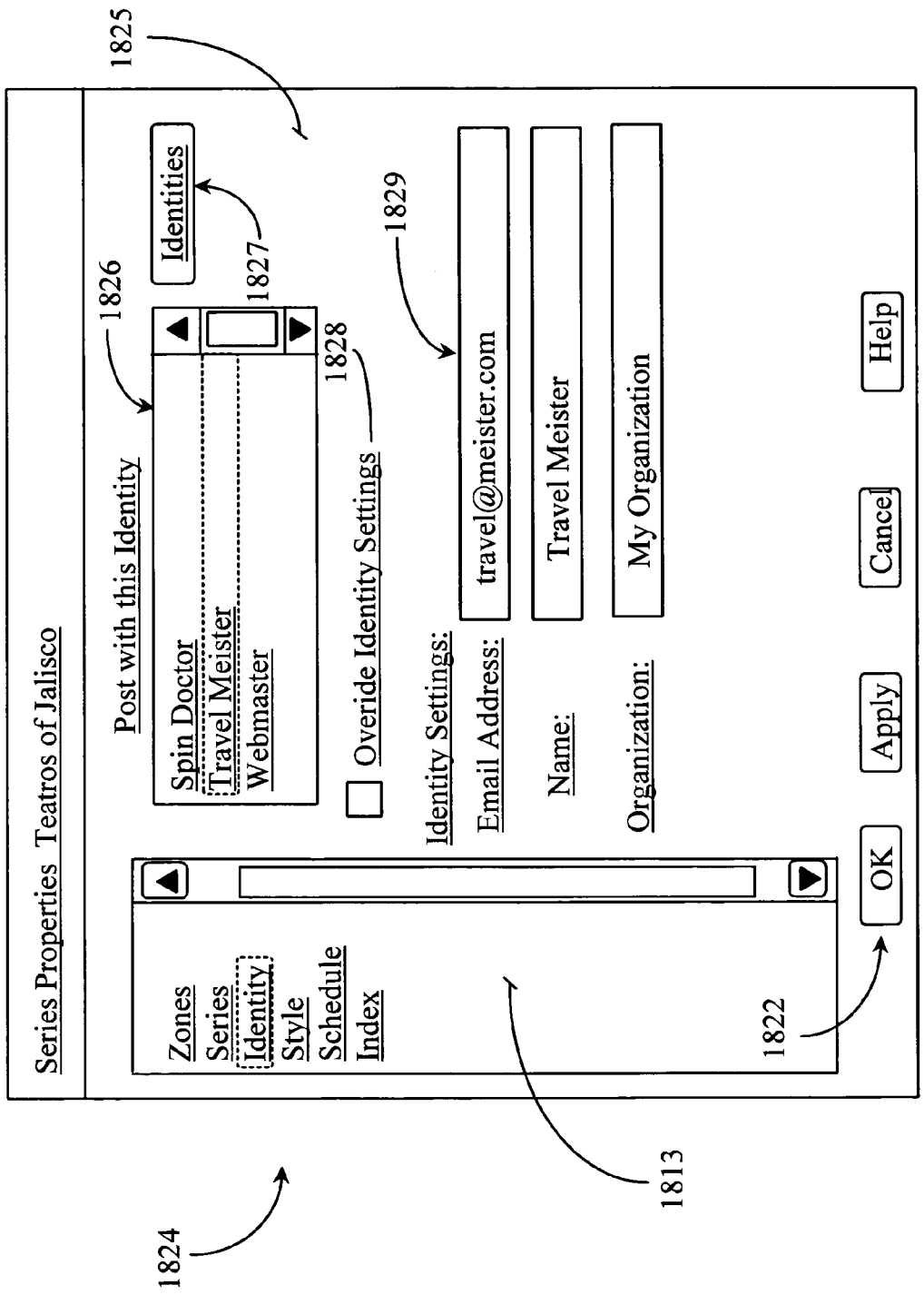
FIG. 18D is an exemplary screenshot illustrating identity configuration in conjunction with a posting according to an embodiment of the present invention.

FIG. 18D is an exemplary screenshot 1824 illustrating identity configuration in conjunction with a post configuration according to an embodiment of the present invention. Screen 1824 like the other screen mentioned above has navigation window 1813 displayed. In this example the identity properties associated with a posting are accessed. Screen 1824 has a work window 1825 containing various options for applying an identity to a posting of a binary series. Work window 1825 has a scrollable list window 1826 that displays a list of available identities that may be applicable to this particular posting. These identities are news-group participant handles created for the purpose of letting others know in a non-ambiguous way, the author of the posting. An interactive button 1827 labeled Identities is provided and, in this case, located to the right of window 1826. Button 1827, when activated may provide additional identity selection options that may not be visible in list window 1826.

In one embodiment of the present invention, selecting button 1827 may launch an identity creation service provided by a third party, through which new temporary identities may be established. Such as service is described further above with reference to FIG. 4 of Ser. No. 10/765,338. If the posting is conducted from an identity-managed zone, then only the identities approved for that zone may be available. An override option 1828 is provided within work window 1825 and is adapted to enable a client to override default identity options effectively enabling the client to switch zones or post with a non-zone specific identity.

For each identity, an identity settings display 1829 is provided for listing at least an email address that may be associated with a posting, the name or handle of the poster, and the organization or, in some cases, social interaction group identity that the client is posting to. If for example, the client is posting to a loosely formed group, then identification of the group may be defined including the content and other identities using SGDL. An identity-oriented (IOM) firewall may provide security for the poster if he or she belongs to many groups and posts from different zones posting different media content. Similar to identity managed communication and messaging, identity managed posting and collecting is also practical.

Depending upon the level of structure and security defined for any social interaction group the participant has business with, identities may be temporary, semi-permanent or permanent. For example, a permanent email address is not required for posting to a news server. However, if the news server is being commandeered for collaboration by a security regimented group, then permanent email may be appropriate depending on level of trust afforded to the other participants of the group. In the case of a structured collaboration project, workflow may also play a part in which identities are chosen for posting and collecting and for any associated messaging. Identity settings 1829 may include additional forms of identity specific to other media types or form of communication including telephone number, IP address, IM identity, file sharing number (i.e. ICQ™) and others.

Identities may be analyzed and authenticated for a group of social interactors whether operating in a posting and collection model, a messaging model, or a fill collaboration model, by using, in addition to shared directory authentication, other trust metrics that may be configured as rules and incorporated into an SGDL application. Additional techniques may include use of Bayesian filtering or neural network analysis or even analysis of prior contact and/or activity histories of an identity with any of the interactors of a group of interactors who is already trusted.

In some embodiments, "join" invitations may be automatically sent by a "hosted" SGDL application to an identity that may be considered for inclusion into an IML description of a social interaction group based on knowledge of informal interactions attributed to the identity with already-trusted group interactors. Such knowledge may include knowledge of skill set, quality reputation of work or product, reliability of interface capabilities, and so on. An application-decision to invite an identity into a trusted group may entirely depend on a set of existing rules set up for the group that may determine whether an identity qualifies for group induction based loosely or strictly on what that identity may contribute to the group purpose and goals. For example, if a loosely formed group of trusted and identified interactors is sharing binaries of wildlife, and it is found through informal interaction history analysis, perhaps of email, that an identity from one of the interactors email contact lists possesses many rare wildlife photos and is a member of National Geographic Magazine, then the SGDL application may generate an email or IM invite to the identity to ask if he or she wishes to be a part of a group of trusted members that share wildlife binaries and commentaries.

The level of structure and cooperation of interactors defined for a social interaction group can vary widely and can evolve from loose organization to more structured organization. Mechanisms such as shared directories, inboxes, hosted services, rules, identity firewall, as well as access permissions to other communication-activity histories of group members for recruiting new interactors into a group may be present to any degree or may not be present at all without departing from the spirit and scope of the present invention.

Figure 18E:
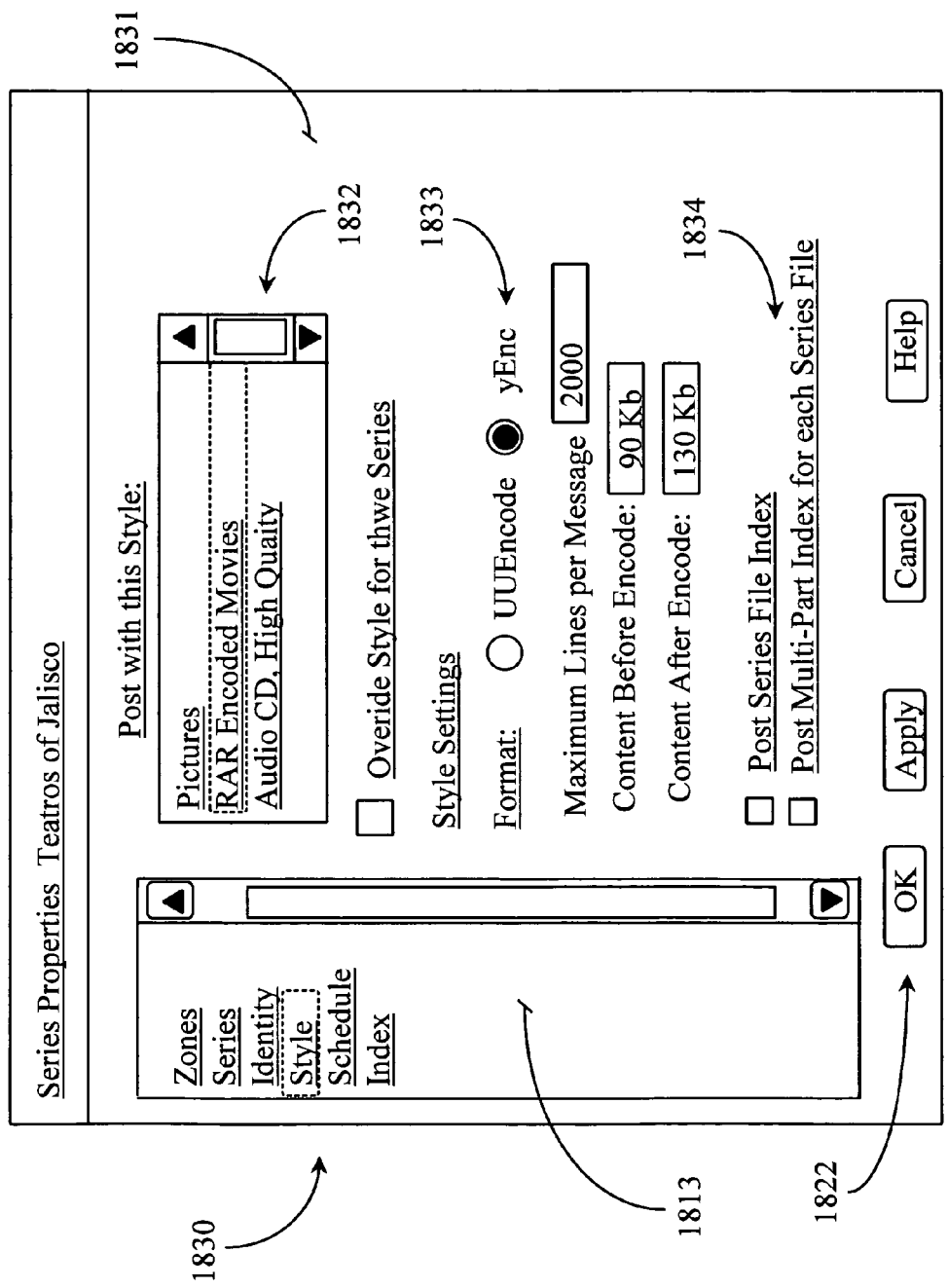
FIG. 18E is an exemplary screenshot illustrating style mechanics of posting according to an embodiment the present invention.

FIG. 18E is an exemplary screenshot 1830 illustrating style mechanics of posting according to an embodiment the present invention. Like the other screens described above, screen 1830 has navigation window 1813 and option array 1822 displayed. In window 1813, the option style is highlighted providing access to properties of posting style. Screen 1830 has a work window 1831 that supports a variety of options for selecting the posting style attributes of a series post. Work window 1831 has a scrollable list window 1832 that lists media style options for posting. For example, if a post has pictures then the option pictures would be automatically selected for the file type (picture) of the series elements. Similarly if the post is a movie that is large, then RAR encoding would be used to break the file into smaller RAR segments. If the posting is audio then the audio style is selected. Series elements may also be applications or text documents containing graphics without departing from the spirit and scope of the present invention. It may be that each style has some configurable properties such as, perhaps compression format for picture (bmp, jpeg. giff, html). Similarly for audio, differing compression codecs may be applied such as mono 8-bit, stereo 32-bit, etc. These settings typically do not have to be changed from one media type style to another for binary posting because the software automatically recognizes the files added to a series posting. However, finer settings generic to each media type such as mpeg vs. AVI or jpeg. vs. tiff can be manually changed as preferences for posting.

Immediately below settings window 1832, there is an option for overriding the default style settings if a client wishes to construct special or custom settings for style (advanced users). An encoding option array 1833 is provided for a client to select a type of encoding scheme from the choices Uuencode or yEnc, which are common encoding schemes for message encoding over NNTP. In this case the option for yEnc is selected. The encoding dictates maximum lines per message, in this case 2000. There are content display fields that display the message size before and after encoding. In this case each posted message is 90 KB before encoding and 130 KB after encoding using yEnc.

An option array 1834 is provided in workspace 1831. Option array 1834 provides an option for posting a binary file index (BFI) with the series (one BFI for all messages of a series element), or an option for posting a multi-part BFI index (one index for each message posted immediately before the message). By default using SIML, a single BSI is automatically generated and posted that richly describes each message of the series and which messages indicate one series element such as a picture element. A BFI is, in one embodiment, an extension of a BSI and is also automatically generated. A BSI, for example, is posted as file 0 of a series. A BFI for a series element is posted as section 0 of a file. A multipart BFI is posted one per message. If BFIs are posted they are described or referenced in the BSI of the series.

Referring now back to navigation window 1813 there are two final options, which may cause new windows to pop up. These are a scheduling option used if a posting is to be performed according to a schedule as opposed to a "post now" option. An index option is provided for enabling a client to view, and perhaps, edit the XML-based index (BSI) for the posting. In one embodiment of the present invention, default property preferences may be configured for each binary media type to be posted such that future postings, by default, are posted according to the established preferences.

Figure 19:
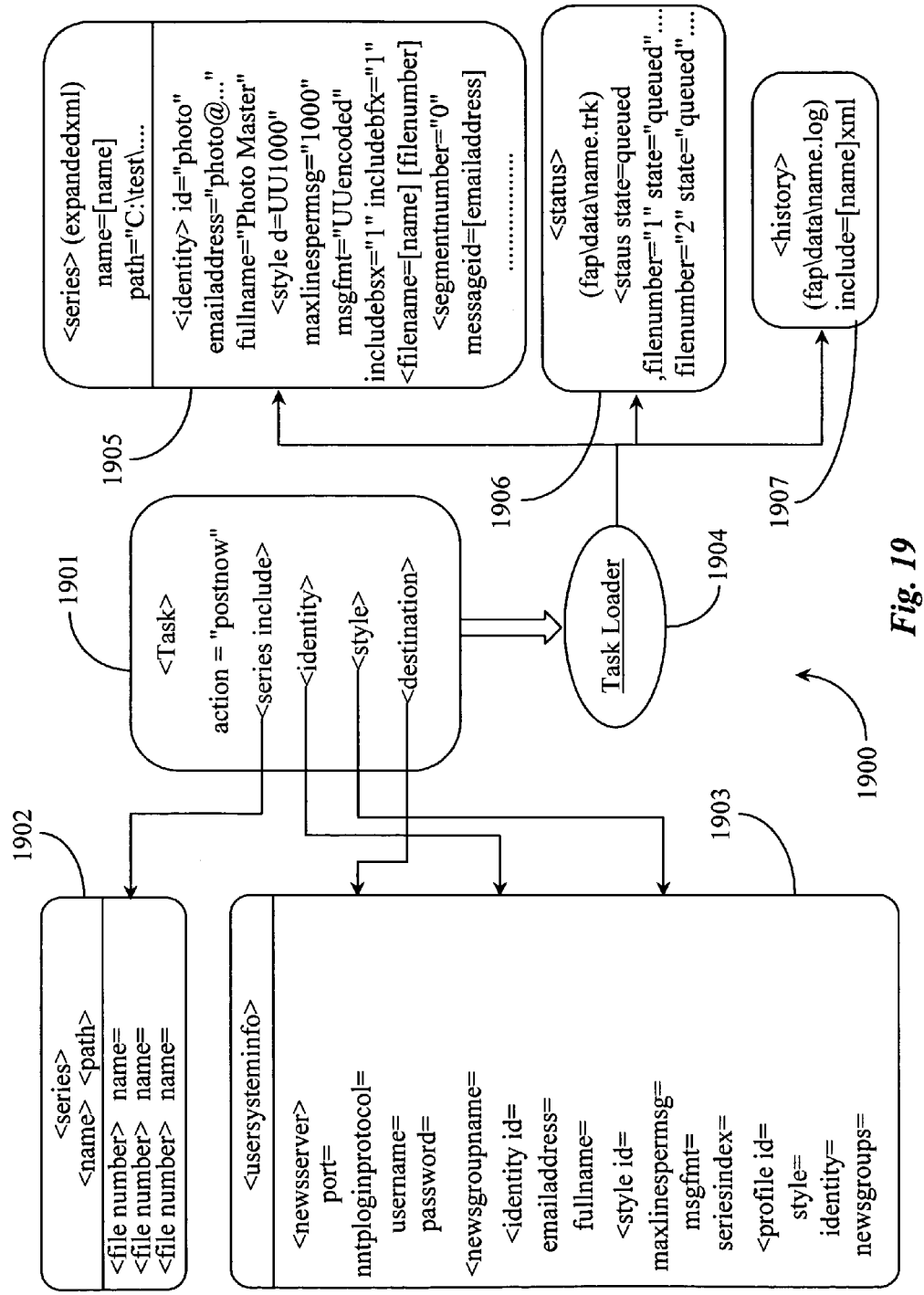
FIG. 19 is a block diagram illustrating a process of task loading associated with binary posting according to an embodiment of the present invention.

FIG. 19 is a block diagram 1900 illustrating a process of task loading associated with binary posting according to an embodiment of the present invention. According to a preferred embodiment of the invention, binary posting application 1800 described above with reference to FIG. 18A has two primary components for enabling posting of a binary series. First, the application creates a task from XML information describing the elements of the task and loads the task into a task manager component, described later, that expands the task instruction and generates and dispatches the message index for NNTP message posting.

In this example, a series information file 1902 is generated as an XML document and contains the name and file path of all of the files to be posted with the series. The poster also generates an XML document 1903 describing all of the required user and system information required to post the series. A task building process assembles the XML into an XML task document that further includes the scheduling information for the posting, either post now or according to pre-defined schedule.

XML document 1903 contains the target news server, port, NNTP login protocol, user name and password for logging in. Document 1903 also contains the name of the news group hosting the posting, a user identity or post handle, email address of the poster, full name (handle) of the user, the posting style identification, including the maximum lines per message, the message format, and the method for posting the series index. The document includes profile identification (media type), the style (encoding scheme) each file identity (photo, movie segment, etc.) and a list of newsgroups to also receive the post if more than one, for example in cross posting.

Task 1901, once assembled is ready for loading for posting by a task loader/manager 1904. Task manager 1904 generates a single expanded XML document 1904 containing all of the required information from 1902 and 1903. A tracking file 1906 is generated for the purpose of tracking posting status for part of series elements and series elements as they are queued for post and as they are successfully, or not successfully posted. The tracking file is an XML document that may be displayed in real time on a GUI. Task manager 1904 also produces a history log file 1907 for the purpose of documenting the content and status of a post as it is initiated and progresses.

It will be apparent to one with skill in the art that the XML examples in files represented in this example may not show the actual namespaces associated with data or all of the XML line data. This is due to constraints in drawing space. An example of such XML-based files generated and manipulated for posting is reproduced below.

General Preferences (User and System Information)

AP defines user and system information using an XML document. It includes the news server, newsgroups, identities (email addresses), and style (message formatting and size settings) that potentially are used and reused for all postings. From this repository the user will select a newsgroup, identity and style when creating a posting task. There are five elements that can be defined in the preferences file: newsserver, newsgroup, identity, style, and profiles. An exemplary user and system information XML file is reproduced below:

```
<usersysteminfo>
    <newsserver newsserver="news.4ax.com" port="119"
        nntploginprotocol="Simple" username="poster"
        password="6EAB83AD475"/>
    <newsgroup name="alt.binaries.test, alt.binaries.test.yenc"/>
    <identity id="test" emailaddress="test@mailinator.com"
        fullname="The Tester"/>
    <identity id="photo" emailaddress="photo@mailinator.com"
        fullname="Photo Master"/>
    <style id="UU1000" maxlinespermessage="1000"
format="UUEncoded"
        seriesindex="1" fileindex="1"/>
    <style id="YENC2010" maxlinespermessage="2010" format="yEnc"
        seriesindex ="1" fileindex ="1"/>
    <profile id="photo" style="UU1000" identity="photo",
        newsgroups="alt.binaries.test"/>
</usersysteminfo>
```

The user system information file is the root element analogous to file 1902 above, that contains all of the required user and system information as described above and may contain no attributes. The news server element describes the news server or servers that are being posted to, the port identification (119 for NNTP) and any log-in information required to forge a connection or connections.

The news group element describes the group or groups will be posted to. This value can include many different groups for a single posting. News groups may be described in a list with each group separated by a comma, or if more than one, they may be described as separate elements n the file as follows:

```
<newsgroup name="alt.binaries.test"/>
<newsgroup name="alt.binaries.test.yenc"/>
```

The identity element fills the email from field that will be used when posting. Defining identities makes it easy to switch between email addresses depending on how a client wishes to be viewed for each of his or her postings.

<identity id="test" emailaddress="test@mailinator.com" fullname="The Tester"/> would be interpreted as The Tester test@mailinator.com.

The style element determines how the series is sent to a news server. Because news groups often have rules about content and rules about how messages are posted, the style element, in a preferred embodiment, attempt to comply with the formats of each server. The style element also determines whether BFI indexing is used. For SIML posting, a BSI is generated by default.

An exemplary representation of a series document is reproduced below:

```
<series name="Yosemite" path="C:\DemoData">
    <file number="1" name="HalfDome.jpg">
    <file number="2" name="NevadaFalls.jpg">
    <file number="3" name="Valley.jpg">
</series>
```

An exemplary task document analogous to document 1901 is reproduced below:

```
<task action="postnow">
    <series include="c:\DemoData\Yosemite.xml">
    <newsgroup name="alt.binaries.test"/>
    <identity emailaddress="photo@mailinator.com" fullname="Photo
Master"/>
    <style maxlinespermessage="1000" format="UUEncoded"
seriesindex="1" fileindex="1"/>
</task>
```

The post action element attribute specifies what that task will do (either post now or post at a specified time). The series element references the actual series document using an include attribute. It is the file name where the series XML document (1902) can be found. The newsgroup, identity and style can be fully expanded or reference elements by id that are defined in the usersysteminfo file analogous to file 1903.

One with skill in the art will recognize that there are a number of ways to organize a posting task using XML without departing from the spirit and scope of the present invention. For example, a profile may be specified, in one embodiment, by referencing the id of a profile defined in the usersysteminfo document. The task will use all the attributes of that profile for posting. Alternatively, it is possible to specify an identity, and style by id and those elements will be expanded. The order of processing may be specified such that elements defined at the most immediate level may override included elements. For example, the newsgroup element in <task> may override any newsgroup element specified in the series file yosemite.xml from the example above. This provides an enhancement for resolving any potential conflicts. The following examples exemplify the different possibilities described:

```
Task using profile
<task action="postnow">
    <series include="c:\DemoData\Yosemite.xml">
    <profile id="photo"/>
</task>
Task with identity and style specified as an id
<task action="postnow">
    <series include="c:\DemoData\Yosemite.xml">
    <identity id="photo"/>
    <newsgroup name="alt.binaries.test"/>
    <style id="UU1000"/>
</task>
```

Here's a detailed description of the task element and attributes.

```
<task>
```

Task is a root element that defines a AP task. The task element must include a series element and some combination of elements that specify the identity (only 1 allowed), newsgroup (can have multiple), and style (only 1 allowed) to use to post the series. The post action has two options, postnow-post at the next opportunity, and postat-post at a specified time. If posting at a specified time, an ISO 8601 (CCYY-MM-DDThh:mm:ss.sss) is provided with the formatted date and time specifying when the task should start.

When a task document analogous to task document 1901 is loaded for posting, the series and task information is expanded. More particularly, AP retrieves the series, the identity, and the style, and expands the series XML document into a working series/task X document 1905. This document is equivalent to the series index. In a preferred embodiment, this is done so that changes to the general preferences will not affect series as they are posted. Once a series is posted, the file ordering and division into sections becomes fixed. This is essential to ensure that each part can be properly retrieved and reposted if necessary. The expanded task/series document 1905 is the document that AP uses for processing. It is equivalent to the series index that AP will post for newsreaders to retrieve the series. This document represents a standard for series processing. In a preferred embodiment, the format for this document is intended to be a standard, able to be retrieved by any newsreader; produced by any task/series builder and processed by any news poster.

BSI

In a preferred embodiment of the present invention a BSI is posted with a series in order to enhance series retrieval and file viewing. The <style> attribute seriesindex determines whether an index will be posted for the series. The series index contains all the information necessary to retrieve and repost the series. An SIML-enhanced newsreader can recognize these BSI indexes and use the information contained therein to retrieve an individual file or section of a file.

In one embodiment, an expanded BSI may look like the following:

```
<series name="Yosemite" path="C:\DemoData">
    <identity id="photo"/>
    <style maxlinespermessage="1000" format="UUEncoded"
        seriesindex="1" fileindex="1"/>
    <newsgroup name="alt.binaries.test"/>
    <file name="HalfDome.jpg" number="1">
        <section number="0" messageid="190e@4ax.com"
            subject="Yosemite [1/3] bfi - HalfDome.jpg (0/2)" />
        <section number="1" messageid="430a@4ax.com"
            subject="Yosemite [1/3] - HalfDome.jpg (1/2)"/>
        <section number="2" messageid=9d22@4ax.com
            subject="Yosemite [1/3] - HalfDome.jpg (2/2)"/>
    </file>
    <file name="NevadaFalls.jpg" number="2">
        <section number="0" messageid=a4ce@4ax.com
            subject="Yosemite [2/3] bfi - NevadaFalls.jpg
(0/1)"/>
        <section number="1" messageid="8536@4ax.com"
            subject="Yosemite [2/3] - NevadaFalls.jpg (1/1)"/>
    </file>
    <file name="Valley.jpg" number="3">
        <section number="0" messageid="8e17@4ax.com"
            subject="Yosemite [3/3] bfi - Valley.jpg (0/2)" />
        <section number="1" messageid="87f1@4ax.com"
            subject="Yosemite [3/3] - Valley.jpg (1/2)"/>
        <section number="2" messageid="84a3@4ax.com"
            subject="Yosemite [3/3] - Valley.jpg (2/2)"/>
    </file>
    <index PostAsAttachment="1">
        <section number="1" messageid="839c@4ax.com"
            subject="Yosemite [0/3] bsi - index.bsi (1/1)"/>
    </index>
</series>
```

In this example, the file includes the identity, style and newsgroup specified by the task document. In addition, the file sections have each been identified. The BSI further includes the style information to ensure file sections are reposted as they were originally posted.

Figure 20:
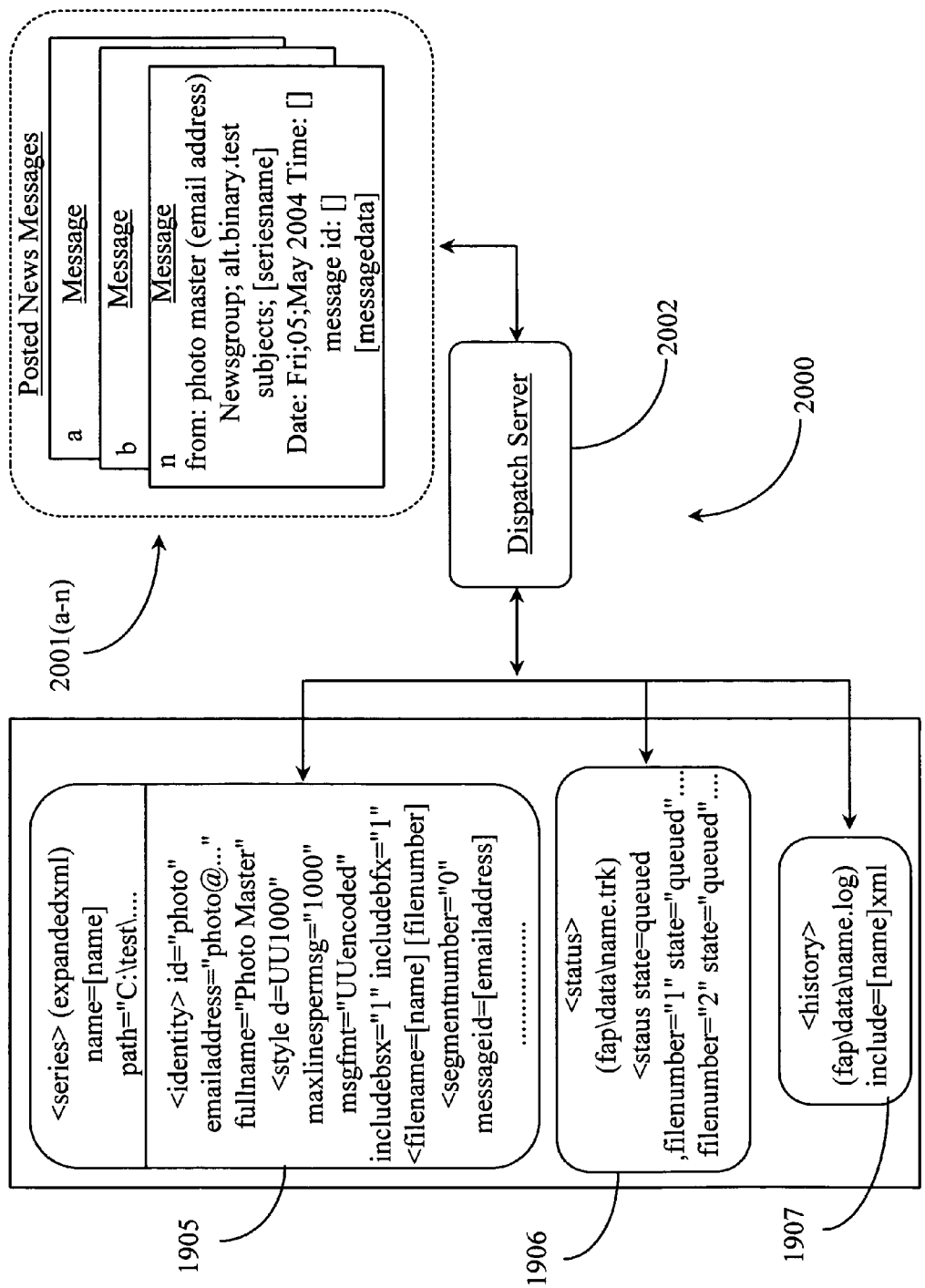
FIG. 20 is a block diagram illustrating a process of dispatching a posting according to an embodiment of the present invention.

FIG. 20 is a block diagram 2000 illustrating a process of dispatching a post according to an embodiment of the present invention. In this example, document 1905 produced by the task loader or builder described with reference to FIG. 19 above is published to one or more news groups of a server or servers by a task manager dispatch server 2002. A large file must be broken up into messages when posted because of news server restrictions on file size. In a BSI, the sections required for each series file are defined; including the message-id used when it is posted and the subject. The subject is also provides another way to identify a message. The format for the subject is very specific. It is always the series name followed by the file specification expressed in the format [1/3] optionally followed by any series encoding indicators, followed by a dash then followed by the filename and the file section specification (1/2), and optionally followed by file encoding information (Uuencode, yEnc). File and section numbers starts at 1. BSI and BFI files numbered 0 are used for informational purposes, such as indexing. A basic syntax is as follows:

seriesname [x/y]-filename (n/m)
For example,
Yosemite [1/3]-HalfDome.jpg (1/2)
Yosemite [0/3]bsi-yosemite.bsi (1/1)

This is the series index for the Yosemite series, it is posted as file 0 in the set of 3 files (the 0 file is used to represent information about the series, but is not part of the series directly). The name of the binary series index file is yosemite.bsi and this message is the first section of 1 total section. The bsi indicator designates that the message contains the binary series index.

In one embodiment of the invention, a series index or BSI may be posted to a group separate from the one files are posted to. In this embodiment the BSI may contain a newsgroup sub-element reference. This may be practiced if a newsgroup has a special sub-group that may be reserved for BSI posting. In theory, the sub-group could contain all of the series BSIs and the main group could contain all of the binary files. This serves as one possible example that may allow quick sampling of binaries without requiring download of all of the headers.

If a BFI (binary file index) is used the syntax may be expressed as Yosemite [1/3]bfi-HalfDome.jpg (0/2). This is the file index for the first file in the Yosemite series. The file itself, from an example above is called HalfDome.jpg, the BFI does not have a separate name since it is attached to the actual binary file by naming convention. The binary file (HalfDome.jpg) because of its size is broken into 2 file sections. The BFI message is section 1.

In a preferred embodiment, dispatch server 2002 breaks up the post into several messages 2001 (a-n). Depending on the content and encoding scheme, there ay be any number of messages posted that collectively represent a binary series. Each message contains at least a from identifier, a newsgroup identifier, the series name, date and time of post, a message identifier, and the message data.

Dispatch server 2002 in the act of posting, continually updates status file 1906 and history file 1907. A client may view active status of one or more than one posting action. The BSI of a series makes re-posting a series much more efficient over current art practice.

Each file of a series may, if desired, contain a BFI, which may be an extension of the series BSI. This is not specifically required to practice the present invention but may be implemented for quick identification of multiple sections making up a single series element or file. However, a single BSI may serve the same purpose.

As posting is underway, the AP actively marks the sections that are successfully posted and updates the information to file 1906. A current status XML may look like:

```
<status include="c:\DemoData\Yosemite.xml" state="Posting">
  <file number="1" state="Completed" r
       result="240 article queued for posting"
       datetime="2004-03-03T17:31:47.625" sectionstate="CCC"/>
  <file number="2" state="Posting" sectionstate ="PQ" />
  <file number="3" state="Queued" sectionstate ="QQQ"/>
  <index state="Queued" sectionstate ="NQ"/>
</series>
```

History logging is also performed by AP to record posting activity results including news server responses and errors. An updated history file 1907 may look like:

```
<history include="c:\DemoData\Yosemite.xml"/>
<post file="1" section="0" datetime="2004-03-03T17:31:47"
    messageid=" b4ee@4ax.com"
    subject="Yosemite [1/3] - HalfDome.jpg (0/2)"
    result="240 article queued for posting"/>
<post file="1" section="1" datetime="2004-03-03T17:31:48"
    messageid="bb20@4ax.com"
    subject="Yosemite [1/3] - HalfDome.jpg (1/2)"
    result="240 article queued for posting"/>
```

```
<post file="1" section="2" datetime="2004-03-03T17:31:49"
    messageid="9d22@4ax.com"
    subject="Yosemite [1/3] - HalfDome.jpg (2/2)"
    result="240 article queued for posting"/>
</history>
```

Figure 21:
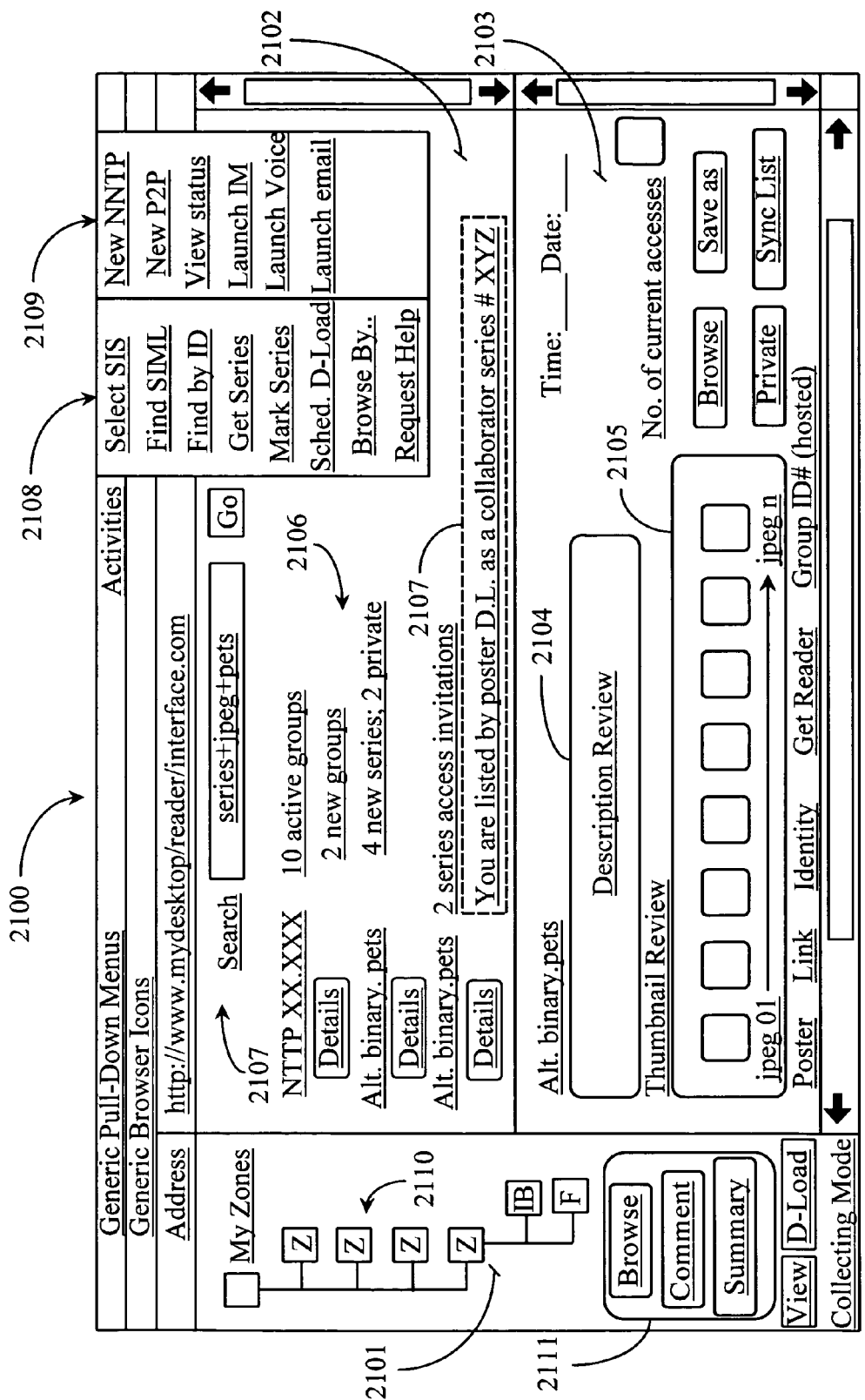
FIG. 21 is an exemplary screenshot illustrating a reader/collector interface according to an embodiment of the present invention.

FIG. 21 is an exemplary screenshot 2100 illustrating a reader/collector client interface according to one embodiment of the present invention. Screen 2100 may be provided in a graphics form that uses or borrows Internet browser function, look, and feel. Therefore, an address bar is illustrated in this example as well as generic pull down menus and generic browser icons that normally grace a browser interface.

In one embodiment of the present invention, there are two separate, but integrated interfaces, one for news reading and other communications, and one for binary collecting. However in this example, both regimens can be practiced through a same interface by switching modes from reader to collector and back.

It is important to note herein that interface 2100 encompasses all of the functions described in conjunction with the agent reader described with reference to Ser. No. 10/765,338 and is further enhanced in this embodiment with the ability to sample binaries using SIML interpretation of XML-based BSIs. Screen 2100 is also enhanced to link to third party SIS services for aid in quickly finding and disseminating target binary series, collaboration projects, and for identifying loosely formed social interaction groups, at least from NNTP news servers.

In one embodiment, screen 2100 has an explorer type navigation window 2101 provided thereto and adapted to display a hierarchical navigation tree 2110 of a client's work zones, labeled My Zones. Each zone may contain at least one inbox (IB) and one or more folders (F) for storing content such as news, binaries, and so on. As was described with reference to Ser. No. 10/765,338, a client may operate from within a zone that is firewall protected and segregated from other zones. For example, if a user navigates to and selects a pet zone then all of his or her collected pet-related content, subscriptions, identities and contacts are visible and the user may practice communications through that zone having access to zone approved contacts and identities.

Screen 2100 has a top viewing window 2102 provided thereon and a lower viewing pane 2103 provided thereon. Window 2102 is adapted to provide current results resulting from an SIML content search as might be enabled from within the application when connected to a particular news server, or as may be provide through a third party service proxy adapted to search for SIML content from a number of designated servers on behalf of a client. A search function 2107 is provided within window 2102 and is adapted to enable user input in the form of keyword search criteria such as, for example, series+jpeg+pets. Results may be displayed in window 2102 in a variety of formats without departing from the spirit and scope of the present invention.

In one embodiment the results are a summary 2106 of what is found within an NNTP server (NNTPXX.XXX) listed as containing 10 active groups related to pets that allow posting of binary series. The summary mentions that two of the groups are new to the server since the last time the client logged into that server or since the last search action performed for that server. Windows 2102 and 2103 are scrollable and may list more search results than are viewable within the immediate window areas.

The summary 2106 has a details button located under the server and group information. Selecting the details button may provide more granular details such as those listed in window 2103. Of the 10 active groups, at least one of those groups listed, Alt.binary.pets, has 4 new series posted, two of which are designated as private only for certain participants that, perhaps form a loose social interaction group that has focused only on certain pet series types. Using SIML, a client may find those other posters and consumers that are also using SIML. Likewise, BSIs may be searched to determine if there are any new updates in the server that match the client's input search criteria. In one embodiment a client may elect to view all SIML content in a server without using any specific search terms.

Summary information 2106 shows further that in the group Alt. Binary.pets there are two series access invitations (SIP action invite) for the two private series of the 4 listed new postings. Therefore, the client may access all 4 of the series posted, two of which are public and require no log-in or authentication and two of which are private and may require the client to log-in providing a password to sample or to download the series. A message block 2107 is illustrated within window 2102 and is adapted to display messages found in BSI or BFI descriptions. In this case, the message tells the client that he or she is listed by a poster identified as (D.L.), as a collaborator for one of the new private series identified as series XYZ. A client may quickly find and posting that references the client identity in a BSI or BFI description.

A poster may identify other SIML users by identifying those users by handle. The identities are expressed in the form of IML. Any reader capable of interpreting SIML can browse BSIs and detect if his or her identity is included in the BSI of a series or even in a BFI for a series element. In this way a loosely formed collaboration group may collaborate on a number of posted series wherein series elements of a series are designated for certain identities and certain other series elements are designated for certain other identities. Moreover, using AP, a poster may set up notifications to notify collaborators of new posts using channel other than NNTP such as IM, email, RSS, or even voice alerts over IP.

A navigation block 2111 in provided, in this embodiment, within navigation window 2101 and is adapted to enable a client, while in collection mode, to browse BSIs, post comments related to any sampled content, and to view summary descriptions and thumbnails of a series. Additional interactive choices include View (display) and D-Load (download) content.

As a result of client input, a series listed in window 2102 is being viewed or sampled in window 2103. This may be accomplished from navigation window 2101 using block 2111, or by simply clicking on a Details option provided under the news group name or next to a series indication, or by expanding a tree control in block 2101 or 2102. For a series sampling, a text display block 2104 is provided for presenting text description of the series elements. Block 2104 contains natural text rendered from XML using and XML style sheet. A thumbnail review block 2105 is similarly provided in window 2103 and is adapted to display the thumbnails in order of BSI description, enabling the client to review any of those before deciding to download the associated jpegs in the series.

Other pertinent information is also made available to the client sampling a series such as the time and date of the original posting of the series, and the number of current accesses made to the series. In a very large series, a client may browse series thumbnails without accessing every one. For example, a client may review every third or every fifth thumbnail to reduce scrolling requirements. A save-as button is provided within window 2103 and is adapted to enable a client to save a sampling without fully reviewing it so that the item may be reviewed later off-line, or whenever desired.

An interactive button labeled Private is provided within window 2103 and may be adapted according to one embodiment, for causing display of just the posted series that are private in nature and require some authentication for sampling and download. A client may view all private series listed, or just those that list the client as an approved collaborator. A Sync List option button is provided within window 2103 and is adapted to enable a client to synchronize his or her list of approved identities for an SIML group or project with a most current list of identities that may be provided in a BSI of a new posting. In this way, as a social interaction group grows in number, every client that is a part of that activity can have access to all of the other members input and comments.

In a preferred embodiment of the present invention, the collector component of application 2100 re-uses the binary series indexes and series file indexes, if available, as a unique SIML indexing mechanism for organizing all of a client's downloaded binaries for quick sampling and access. As a client's binary collection grows, he or she may use the collector mode to sample his or her own collection for series to re-post or to simply view the binaries stored. In one embodiment the collector component of application 2100 may contain an optimizer mechanism (not illustrated) for incorporating or merging many XML documents into a single BSI, which describes a user's entire collection or a social group's collection such as all the songs by an artist or all the episodes of a television series, including different versions of a same series or element. Such a merged BSI may comprise partially of index information downloaded and compared with existing information previously downloaded for redundancy, and new information created automatically through addition to the collection from a local file or folder. A client may also, in one embodiment, manually script to a BSI index describing his or her local collection of binaries.

In one embodiment a local BSI for describing a user collection of binaries may also be optimized to provide filtering for identity and content wherein if a user downloads a BSI describing a series and the BSI information already exists in the local or collector BSI then it would be understood that the material is already in the user collection. Filtering for identity may also be employed from the point of a user's collection by way of dissemination of the authors for example from the collection BSI and enabling sampling of new content only of those particular authors or a selected portion thereof. The mechanism may be provided as a client/server component within the collector component.

If a client uses the poster to re-post a binary then the collector can retrieve the binary series in the exact same format as originally posted. If a client desires he or she may enter and modify the series elements using the properties windows described with reference to FIGS. 18A-E to make changes in elements, description, and so on. The BSI and BFI indexes for the new posting will automatically describe the new changes or modifications to the series. A parser and XML generator is part of client software and creates BSI and IML as a user creates the text and selects appropriate identities for posting and so on.

An array of interactive links is provided below thumbnail block 2105 and is adapted to enable a client to link to or get certain components or information. These links, from left to right are Poster, Link, Identity, Get Reader, and Group ID #. The link Poster enables a client to immediately switch from collecting or reading mode to posting mode. In one embodiment the poster is a separate interface that can run along-side the collector/reader interface 2100. In another embodiment the poster, collector, and reader are all separate interfaces and the link poster acts as a toggle between the three interfaces. In a variation to this embodiment, all three interfaces can be invoked to run in a same main window divided in workspace to accommodate all three components.

The next option "Link" provides a convenient way to map to any navigable component that may be displayed during collection or reading. By selecting a text rendition of a URL or navigable identity parameter, the client may launch a new window, for example, bring up a Web site or a new window of a communication application for calling, IM interaction, Chat interaction, email, and so on. The option Identity enables a client to see a list of all applicable identities attributed to a posting or a series element.

The option Get Reader may be used to call up the reader application. If for example, the client is working in collecting or posting mode. The option for Group ID# enables a client to identify social interaction groups by identity number for the purpose of sampling group content.

In addition to the described options drop-down activity menus 2108 and 2109 are provided within screen 2100 and are adapted to provide varied functions. For example, in menu 2108, an option select SIS is provided for selecting an offered social interaction service that may be provided by a third party and configuring the selected service for use. One example of an SIS might be a identity creation service for creating identities for the client in IML. A next option down in menu 2108 provides a service for finding SIML content in a server. The next option down enables SIML content to be found according to ID used as search criteria. Options Get Series and Mark Series are self-descriptive. Get series is a download function similar to the interactive button D-Load in window 2101. Mark series enables a client to mark a sampled or un-sampled series for later download adding the identified series to a download list or to a sampling list.

A next option down in menu 2108 is a Scheduled down load option for scheduling a series download or sampling at some later time. A browse by option is provided within menu 2108 and enables a client to browse SIML postings by a variety of criteria such as identity, group ID, subject likeness, media type, music genre, author (music), album title or movie title (music, movies) and so on. The option Request Help takes a user to one or more interactive help options like live chat with an agent; a faq; service provider technical pages; or interactive trouble shooting wizards.

Menu 2109 includes an option New NNTP for switching to, or configuring another news server or servers to browse or download content from. A next option down includes the former functionality for P2P servers. A next option down enables a client to view status for posting or for downloading. The last three options are provided and configure for launching other applications like IM, Voice, or email.

It will be apparent to one with skill in the art that the functions and arrangements of work areas in screen 2100 may vary in relation to method of integration of applications without departing from the spirit and scope of the present invention. As well, some functions may be duplicated in different areas for user convenience without departing from the spirit and scope of the present invention.

In one embodiment, screen 2100 can support functions of posting, reading and collection by managing workspace within the screen interface. In another embodiment separate screen are invoked when toggling from posting, for example, to binary collection and so on. There are many possibilities.

It will also be apparent to one with skill in the art that, SIML posting, collection and reading is not limited to NNTP as a transport. Posting and collecting can be practiced over HTTP with reference to P2P servers, FTP servers, message boards, auction sites, and other such venues without departing from the spirit and scope of the present invention. Third-party services may be developed that, by proxy, connect a client to servers hosting SIML content wherein the client may use a version of application 2100, or application 1800 to post content and browse, find and disseminate posted content in an identity-centric rather than in an application-centric manner. The example of NNTP binary posting and collecting should not be considered as a limitation of the present invention to any single transport protocol.

Figure 22:
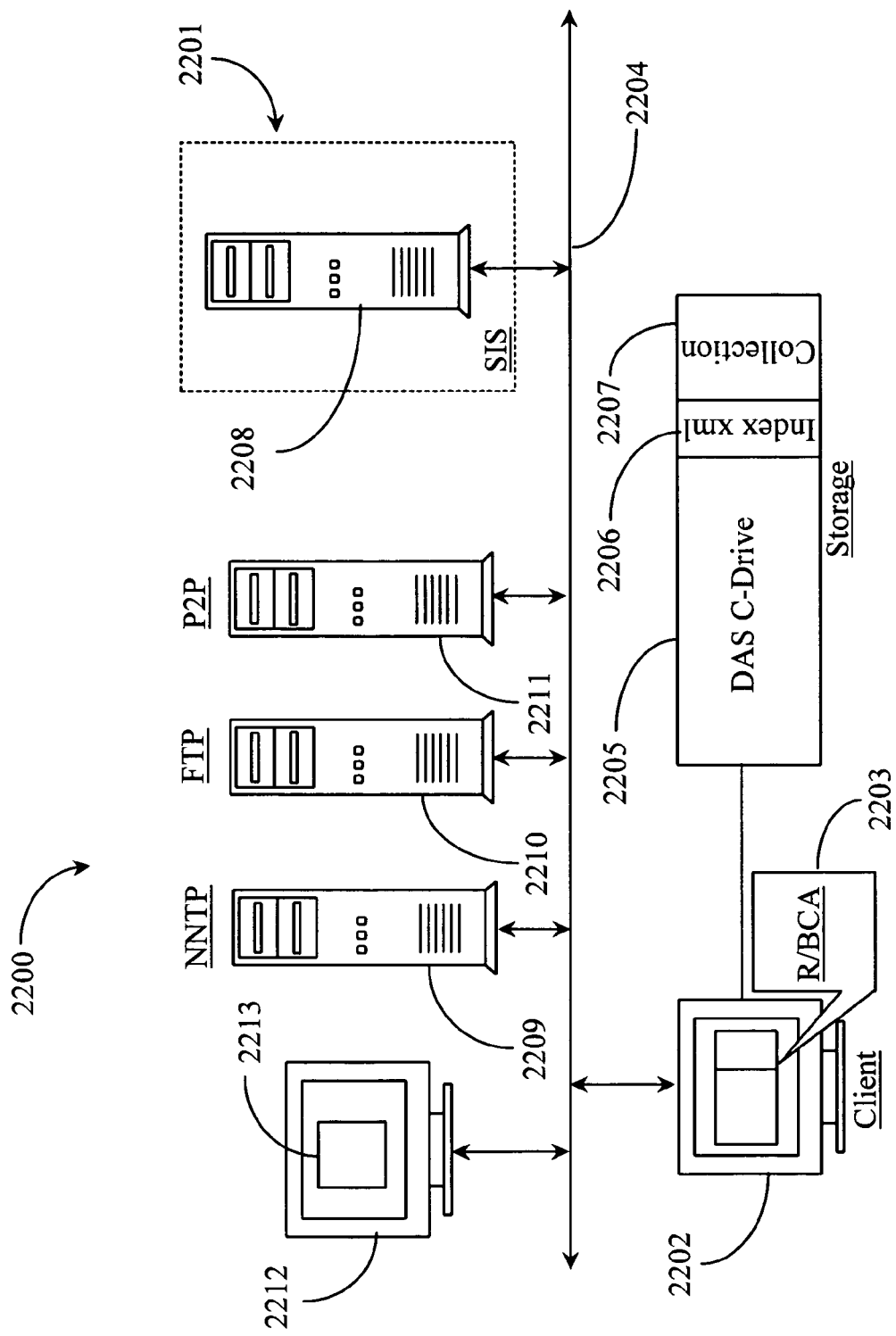
FIG. 22 is simple architectural overview illustrating a client practicing binary digital collection according to an embodiment of the present invention.

FIG. 22 is simple architectural overview 2200 illustrating a client practicing binary digital collection according to an embodiment of the present invention. Overview 2200 illustrates a WAN network and connected equipment, the network represented in this example by a WAN backbone 2204. Network 2204 may, in one embodiment, be the well-known Internet network, an Intranet network, or some other WAN or sub-network having connection to a larger WAN network.

A plurality of network servers, referenced herein as an NNTP server 2209, an FTP server 2210, and a P2P server 2211, is illustrated as having connection to network 2204. A SIS service provider 2201 is illustrated in this example and also has connection to network 2204. An SIS server 2208 is illustrated within service provider 2201. A network client 2212 is illustrated in this example and has connection to network 2204. Further client 2212 is running some application that may have relation to P2P server 2211 such as a file sharing folder whereby binary content is made available for sharing over a P2P network, the files referenced within P2P server 2211.

A client 2202 is illustrated herein as having connection to network 2204 and is illustrated as having an instance of a reader/binary collecting application 2203 installed and running on the client's PC. Application 2203 is analogous in some embodiments to application interface 2100 described above. Typically client 2202 has a connected direct-access-storage (DAS) C-Drive system 2205 available for normal computing. DAS C-drive 2205 may be assumed to be an internal storage, but may be external in some cases.

Using application 2203, client 2202 may access network 2204 and interact with servers 2209, 2210, 2211, and/or with client 2212 either directly, or through a proxy provided by SIS service provider 2201, which is analogous to host 1412 described further above.

In one application, client 2202 accesses provider 2201 and launches a request to find SIML content describing binary files that exist in NNTP server 2209. Using input from client 2202, SIS server 2208 may access server 2209 using standard protocols and search the contents of server 2209 for any SIML content fitting the client search criteria input at the request. Using the collector or collecting mode of application 2203, client 2202 may sample and/or download binary content identified by SIS server 2208. Server 2208 may fist access any BSIs that fit the clients input criteria and return a list of those to the client machine. Client 2202 may then sample through the list and may mark any interesting series for download.

At the point of download, the collector function takes the BSIs of the series being downloaded and creates an index described in XML using a dedicated space (2206,2207) partitioned from DAS 2205. The collector also partitions, in a preferred embodiment, a collection storage space 2207 for storing the user's binaries. Clusters within space 2207 coincide with BSI index 2206 so that any binary series stored in space 2207 maps by address to an appropriate BSI of index 2206. Space 2207 may be made up of one or more user zones each containing at least an inbox, an outbox, and folders that may be specific to subject matter, group identity, client identity, and so on. In this example, when a client retrieves a series from an NNTP newsgroup or other configurable source either directly, or through SIS provided 2201, the binary files comprising the series are stored by the collector component and mapped directly to the appropriate BSI, previously downloaded and stored in index xml space 2206, perhaps during sampling.

The BSI is used to organize the series and series elements. The memory address locations of the stored files, which were not part of the original BSI as retrieved from the network are added to the BSI replacing the previous mapping schema for the posted files. The downloaded binaries are in one embodiment stored in the same message format (if NNTP) that they were posted to enable efficient reposting. In another embodiment, the file segments of series elements are assembled in storage to form each complete binary file but the BSI retains memory of the posting format.

In one embodiment of the present invention a format very similar to a BSI is used to describe content location an attributes of media that may be available for download through a media download service. In this case P2P server 2211 represents a third-party service that links clients 2212 and 2202 together for music sharing. Client 2212 may be enhanced with SIML software that may be used to generate and send an MML description of one or more songs, for example, that are available within the client's share folder for access. If client 2202 is seeking music from the service operating P2P server 2211, then application 2203 may be used to connect to server 2211 and look for audio files associated with SIML description files.

In the above case, P2P server 2211 may not recognize SIML description associated with an audio reference to a song listed as accessible in a number of client share folders. However, collector 2203 can find the SIML content and can get rich description of the offering including a quality sampling or snippet, perhaps, before downloading the song. Client 2212 would have a version of client software (Poster) that is SIML-capable and could choose to advertise his or her shareable collection using rich MML and IML description. In this way a music sharing group may loosely form in the P2P network that may share music of a certain genre or quality.

SIML may also be practiced in conjunction with the file transport protocol (FTP) standard. In this case the mechanism is the same as described above in that a reader or collector may be used to browse the FTP server for stored SIML content. A structure similar to the BSI construct may be used to organize the SIML content and map to the actual downloadable media provided in the server. Collaborators using FTP as part of their workflow may use SIML to structure content for upload to FTP server 2210, for example, and may provide rich description of content and may provide thumbnail, audio, and text sampling of content. For example, an SIML-enhanced document stored in FTP server 2210 may be summarized into a paragraph or two of the most important points covered in the document. An SIML enhanced reader may download the summary and the client may view the summary before deciding to download the document. In case of a series of documents, the client may, by sampling the summary SIML, decide if he or she may retrieve some but not necessarily all of the material.

In one embodiment of the present invention, service host 2201 may provide an SIML content search service that is much more robust than would be possible of a single client machine. Using a powerful server, (2208), host 2201 may search many servers simultaneously for SIML content on behalf of client 2202 and according to criteria input by the client. In one embodiment, server 2208 may use conventional search database building techniques similar to other search service providers where SIML-based content from all over the Internet may be located, identified, and referenced. In all cases, SIML sampling, group identification, subject identification, identity provision, and instructions for participation (in case of social interaction group) may be accessible to any client with an SIML-enhanced reader.

One with skill in the art of software that may read and generate XML will appreciate that any XML-based reader can identify XML content though the content defines SIML. Users who stumble across SIML content may be offered an option to participate by accepting a simple downloaded plug-in that enable the client to post and disseminate content in cooperation with other SIML users.

Figure 23:
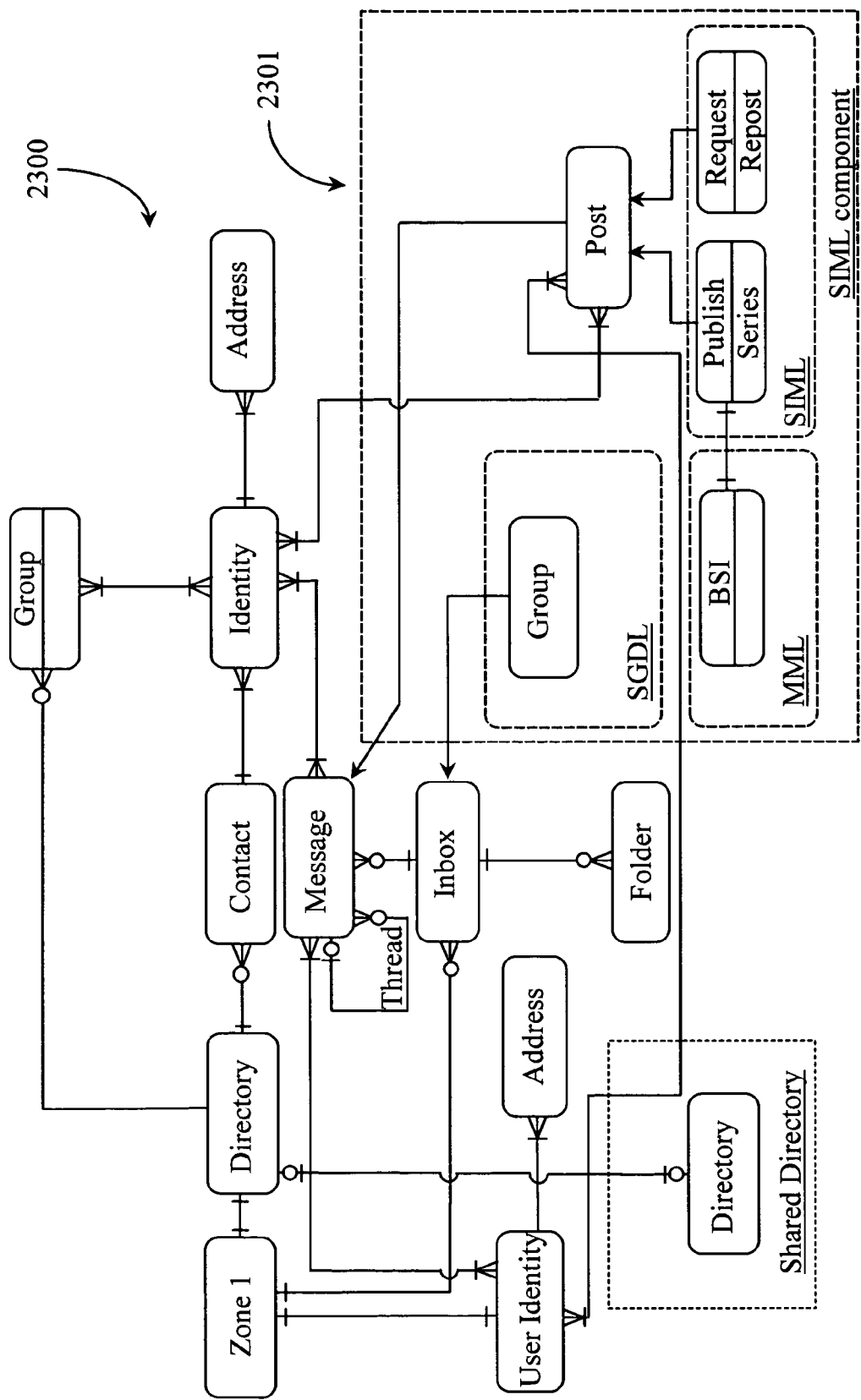
FIG. 23 is a relationship diagram illustrating relationships between social interaction markup language components exemplified in a posting example according to an embodiment of the present invention.

FIG. 23 is a relationship diagram 2300 illustrating relationships between social interaction markup language components exemplified in a posting example according to an embodiment of the present invention. Diagram 2300 is similar in much respect to diagram 300 described with reference to FIG. 3 of Ser. No. 10/765,338 except for the collection module portion, which is replaced in this example with an SIML NNTP posting component 2301 that exemplifies the relationship between SIP and IOM zone and inbox structure and its relevancy to identity oriented management.

SIML component 2301 can be another type of SIML example other than a binary posting example over NNTP without departing from the spirit and scope of the present invention. For example, an SIML P2P collection example, or an SIML email collaboration example may be represented instead as a possible component of IOM. The inventor illustrates an NNTP example as just one possible application that may be integrated with IOM zone architecture and which may be hosted by zone hosting services.

SIML component 2301 describes the functions of publish/series and request/repost as SIML capabilities over NNTP where both functions generate a post. Publish/Series encompasses organizing a series of binary files to be published as an NNTP post. Request/Repost is a posted message that asks a poster to repost a binary series that may have been previously posted but is currently unavailable or a request for posting a certain number of binaries that are known to exist but were not immediately available to the requester at the time of the request. In this case, both actions result in a Post, which can be described as one or a thread or series of related messages.

Publish/Series has a BSI, which is an extension of MML. Each binary file segment that makes up a binary file of a Post may have a BFI (an extension of BSI), although none is required.

Post has a "from" identity (user, author) and a contact identity, which may be a server/group identity listed as a contact in a directory. The group identity may be that of a social interaction group using SIML to communicate. Similarly, a message or messages making up a Post may, in one embodiment, also list the contact and user identities. In another embodiment all identities are referenced in the BSI but not necessarily in each message because each message has a message identity and can be associated by the BSI with the appropriate identities.

In one embodiment, messages comprising one or more posts using SIML may be posted to an NNTP server then collected to IOM inbox shared by a social interaction group described using SGDL. In this case, the inbox may be hosted by a third-party service that monitors the posting activity and wherein each group member may access the inbox from any SIML-enabled machine and view content addressed to him or her. In another embodiment, individuals download messages into own inboxes but the messages downloaded are those posted by others of an SGDL-defined group, the individuals also members of the group. In this case the group may be a loosely defined, un-mediated social interaction group operating over Usenet.

It will be apparent to one with skill in the art that SIML can be integrated wholly with an IOM zone architecture without departing from the spirit and scope of the present invention. Moreover IOM zone architecture provides a useful environment for SIML messaging wherein identities can be a primary factor in finding and disseminating content in a fashion that enables content and activity segregation, workflow management, and enhanced work efficiency related to task performance. For example, the ability to sample content to learn appropriateness, relevancy, and criticality of offered content before actually taking any of the content reduces much effort in binary collection and message download or acceptance in general.

In one embodiment, SIML may be integrated with any presence protocol wherein in addition to content and message sampling, parallel communication channels may be opened to further enhance communication between authors and collectors in a publish and subscribe environment, or between collaborators working on a project via simple messaging protocols. There are many possible applications, some of which were already described.

Figure 24:
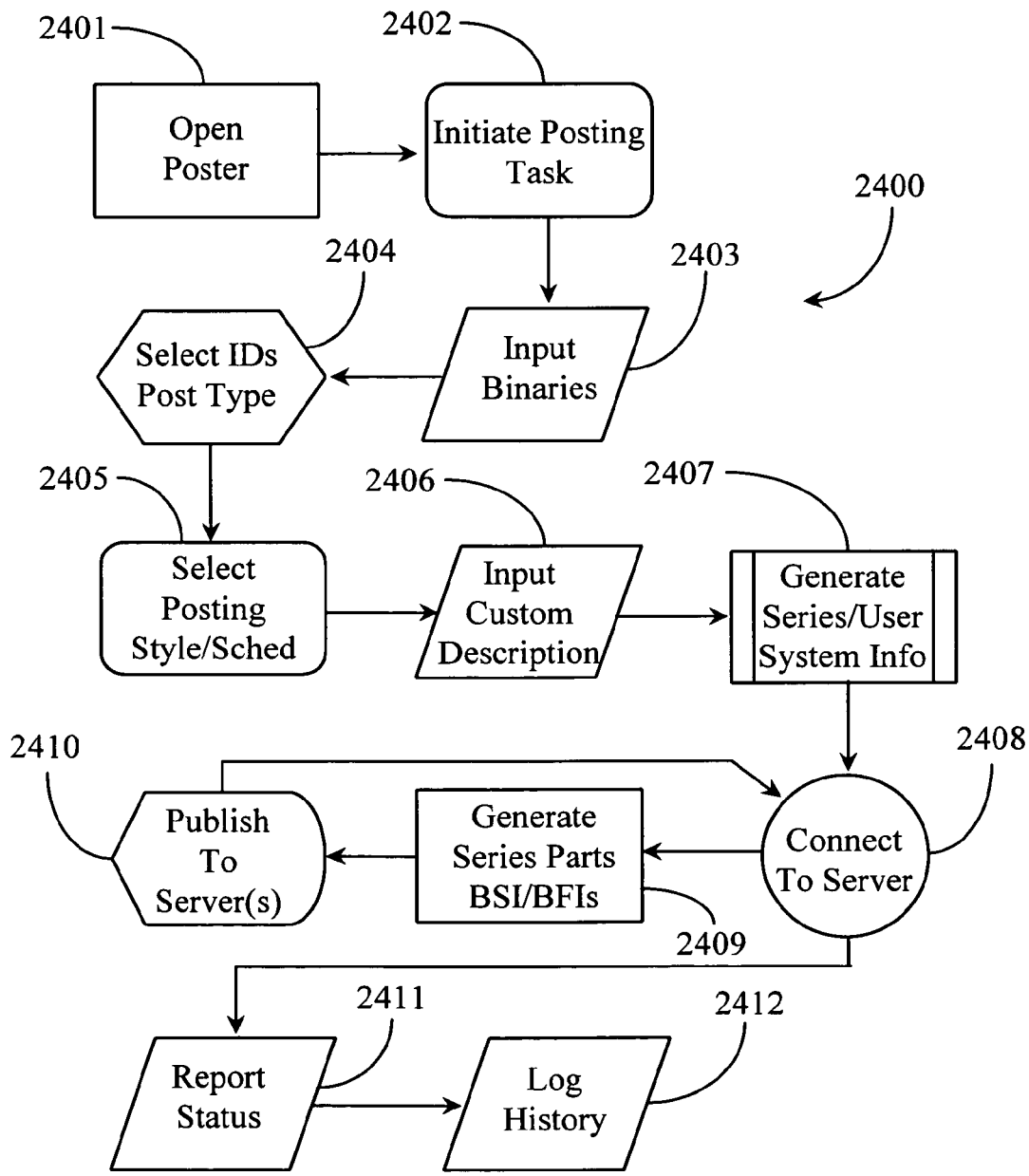
FIG. 24 is a process flow chart 2400 illustrating a process for posting a binary series according to an embodiment of the present invention.

FIG. 24 is a process flow chart 2400 illustrating a process for posting a binary series according to an embodiment of the present invention. At step 2401 a client opens a poster application analogous to interface 1800 of FIG. 18A. At step 2402, working within the application, the client initiates or begins a task for posting a series. This action may, in one embodiment, bring up a window for dragging and dropping binaries into a posting assembly workspace. In another embodiment, the user may simply identify the path of each file to be published by typing the path in or by browsing to the file location and mapping the location.

At step 2403, the client inputs binary files that will make up the series for posting. A client may, at this time select the posting order of the series elements, name or re-name elements and so on. At step 2404, the client may select identities for posting. This step may include confirming a default posting destination and author identity or a client may select or configure a new destination identity and author identity. Identities include servers, newsgroups, and author identities. Also in this step, a posting type of single post or cross-post may be selected.

At step 2405 a client selects the posting style and schedule for posting. The style attributes are partially deduced automatically by virtue of the inserted binary file attributes, which are automatically detected. Encoding may be set to a default and may just require a confirmation. Formatting for message size (lines per message) may also be automatically configured automatically. At this step a client may also elect BSI and BFI posting options. By default a BSI is always generated with an SIML posting.

At step 2406, the client may input any custom description for alerting readers of important parts of the series or series elements including adding any opinions, comments, or other information tidbits that the client or author wants consumers to have access to before downloading the series such as the classification reference further above. Such information may be directed for embedding into the BSI once generated or into BFIs of binary files if desired. A text entry window and an association function to the whole series (BSI) or series elements (BFI) may be provided so that text entry may be properly associated with the series or individual series elements. The software may use provide XML fields to contain the BSI or BFI comments input manually. Most of the series and element descriptions, however are automatically generated where the information is pre-known by the system such as file size, pixel count, image size, resolution, file name, genre, date originated, state of post (original or repost) and so on.

In one embodiment, a user may create standard or generic comments using macros and apply such comments using a keystroke technique. An example of one such comment may be "This picture really rocks" or "I recommend selecting these photos for sampling". The macros may be applied by first highlighting the elements in the series workspace to which they will apply and then performing the appropriate keystroke. For manual entry comments that are relevant to the series or to an element of the series, the client may highlight an element then select an option "add comments" to apply the comment to the series or element description.

At step 2407, the client initiates the task builder component, which generates the information about the series and the user system information into the required XML documents for posting. An icon such as "Post" may be activated for this purpose. The task builder provides the series information document and the user system information document, both of which combined provide all of the required information to post the series.

At step 2408, the application connects to the server or server list for posting the series. Step 2408 may occur simultaneously with step 2407 in one embodiment. In another embodiment, a user may already be connected to the appropriate server or to a jumping off point (intermediary server) and step 2408 may not be required in the specific order illustrated.

At step 2409, a task manager/dispatcher generates the messages for posting including the BSI and BFIs if ordered, and breaks the files into the appropriate size and order for posting as messages (news server). All of the instructions for posting are executed in this step. At step 2409, the task manager may also start a status file and a history file expressed in XML for the purpose of providing real-time status displayed in a client interface and logging the posting result history respectively. At step 2410, the post is published (sent) to the appropriate destination server(s). The server response and activity status is reported back to the client through the connection at step 2411 in real time as the task is on-going. Also in step 2412, the history of the posting results is being logged and is available to the client if the client desires to view it.

It will be apparent to one with skill in he art that the exact order and content of the steps described in process 2400 may vary according to embodiment without departing from the spirit and scope of the present invention. For example in one embodiment, a client may elect not to add comments at step 2406. In another embodiment, a user may accept default selections instead of inputting or selecting identities or style attributes.

In one embodiment, the BSI and BFI data are the first files that a consumer receives before actually downloading any content. These files provide information that is separate from the messages containing actual binary payloads and may be sampled and rejected without retrieving any binary file data. Likewise, the BSI may be saved without retrieving binary data and can be used by a consumer to later retrieve the associated binary data even if a user as logged off of a server in the interim. In another embodiment, the BSIs may be downloaded with the binary files if no sampling is desired before download.

The BSI may be provided in the form of an interactive link in addition to providing the series description such that when the link is activated, the file provides the instruction to the navigation component for re-linking to the series and starting the download. This may be performed in a similar manner as clicking on a history HTML to connect on-line and link back to that page in the server.

In a preferred embodiment of the present invention, BSIs are searchable and can be found using conventional keyword search criteria to obtain BSIs relating to such as subject matter, author, genre, posting date, series element count, media type, and other criteria. The only requirement is that the search criteria is either found in the BSI or associated to the BSI by a third party. BSIs are in a preferred embodiment, searchable from the servers they reside in directly, or are searchable from a separate server compiled by a search provider using known techniques. There are many possibilities.

The method of posting described in process 2400 is that of posting a binary series to a news server or servers. That however should not be construed as a limitation in the practice of the present invention. Similar processes as process 2400 varying somewhat in step description and order may be provided for posting information to message boards, auction sites, FTP servers, P2P services, and other venues.

In accordance with the many and varied embodiments described in this specification, the methods and apparatus of the claimed invention should be afforded the broadest interpretation. The methods and apparatus of the invention should be limited only by the following claims.

What is claimed is:

1. A system comprising:
    one or more computer processors;
    one or more memories coupled to the computer processors; and
    instructions executable by the one or more computer processors from a non-transitory machine-readable medium, the instructions configured to prepare and send a message by:
        receiving a selection, from a user, of a communication application from a plurality of communication applications executable by the one or more computer processors;
        receiving selected or authored social interaction content from the user, the content coded in a Social Interaction Language comprising discrete components coded each in a markup language, including a first component enabling the user to limit the message to a specific set of interactors forming a social interaction group, and a second component imposing a social interaction protocol (SIP) for interaction, the SIP providing rules that identify metadata description of specific protocols allowed for messaging within the group, rules of engagement between interactors of the group, and instruction sets for individual ones of message posting, media handling, and interfacing with existing message handling and transport protocols;
        embedding the selected or authored social interaction content in a message prepared in the selected communication application; and
        transmitting the message with the embedded social interaction content over a network compatible with the communication application; and
    wherein the instructions further comprise instructions configured to cause the one or more computer processors to receive and manage a message by:
        receiving an incoming message transmitted over connected network by a communication application among a plurality of communication applications executable on the one or more computer processors, the incoming message including embedded content in the social interaction language; and
        managing interaction with the incoming message according to the first and second components of the social interaction language.

2. The system of claim 1 wherein the message sent further comprises consumable information, and the managing interaction with incoming messages comprises retrieval and use of the consumable information.

3. The system of claim 2 wherein consumable information is identified as associated with specific subject matter, and the managing interaction with incoming messages discriminates according to the specific subject matter association in retrieving, storing and using the consumable information.

4. The system of claim 3 wherein the specific subject matter association is one or more of work, community, business, family, literature, travel, sports, faith, music, political, or pets.

5. The system of claim 2 wherein consumable information is identified as associated with identity of interactors, and the managing interaction with incoming messages discriminates according to the association with interactor identity in retrieving, storing and using the consumable information.

6. The system of claim 2 wherein the managing interaction with incoming messages comprises a network newsreader having a collector component.

7. The system of claim 2 wherein the consumable information comprises one or more of photographs, video files, audio files, or text documents.

8. The system of claim 2 wherein the consumable information is published via one or more network transport protocols including but not limited to network-news transport protocol (NNTP), file transport protocol (FTP), really simple syndication (RSS), universal discovery description and integration (UDDI), lightweight directory access protocol (LDAP), multipurpose internet mail extensions (MIME), post office protocol (POP), simple mail transport protocol (SMTP), Internet mail access protocol (IMAP), session initiation protocol (SIP), text messaging services (TMS), and hypertext transport protocol (HTTP).

9. The system of claim 2 wherein the managing interaction with incoming messages limits consumption of consumable information to specific interactors.

10. The system of claim 1 wherein messages transmitted and received are processed at least in part by an intermediary network-connected server through which messages pass.

* * * * *